United States Patent
Torrey et al.

(10) Patent No.: US 11,728,608 B2
(45) Date of Patent: Aug. 15, 2023

(54) LONG REACH CABLE CUTTING TOOL INCLUDING DUAL ACTION HYDRAULIC PISTON ASSEMBLY AND RELEASABLE CONNECTIONS

(71) Applicant: HUBBELL INCORPORATED, Shelton, CT (US)

(72) Inventors: Cameron Michael-Daniel Torrey, Lancaster, NH (US); Robert Michael Poirier, Bedford, NH (US); Michael Anthony Guarrera, Amherst, NH (US); Luke John Desmarais, Milan, NH (US); Thomas Romeo Faucher, Manchester, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 1111 days.

(21) Appl. No.: 16/428,252

(22) Filed: May 31, 2019

(65) Prior Publication Data
US 2020/0006907 A1 Jan. 2, 2020

Related U.S. Application Data

(60) Provisional application No. 62/692,983, filed on Jul. 2, 2018.

(51) Int. Cl.
*B23D 15/14* (2006.01)
*H01R 43/042* (2006.01)
(Continued)

(52) U.S. Cl.
CPC ......... *H01R 43/0421* (2013.01); *B23D 15/14* (2013.01); *B25F 5/005* (2013.01);
(Continued)

(58) Field of Classification Search
CPC ............ H01R 43/0421; H01R 43/0427; H01R 43/0428; B23D 15/14; B23D 21/06; B25F 5/005
See application file for complete search history.

(56) References Cited

U.S. PATENT DOCUMENTS

2003/0074796 A1* 4/2003 Lewis .................... B23D 15/14
30/92
2015/0283693 A1 10/2015 Chiasson et al.

FOREIGN PATENT DOCUMENTS

JP 2020075318 A * 5/2020

OTHER PUBLICATIONS

A. Ghenadi and L. Babire, "Aspects on dynamic processes in hydraulically driven automatic tools changing devices" Proceedings of IEEE International Conference on Intelligent Engineering Systems, 1997, pp. 361-363. (Year: 1997).*

* cited by examiner

*Primary Examiner* — A. Dexter Tugbang
(74) *Attorney, Agent, or Firm* — Dilworth IP, LLC

(57) ABSTRACT

A long reach cable cutting tool includes a handle, a motor electrically connectable to a battery, a trigger electrically connected to the motor to provide power from the battery to the motor when the trigger is activated, a pump connected to the motor, the pump is activated to displace a first fluid, a hydraulic actuating system connected to the hydraulic pump, the hydraulic actuating system is movable by the displacement of the first fluid to displace a second fluid, a pole having a first end and a second end, the pole connected to the handle at the first end, and a tool head connected to the pole at the second end, the tool head including a tool head hydraulic actuator hydraulically connected to the hydraulic actuating system, the tool head hydraulic actuator is mov- (Continued)

able by the displacement of the second fluid to cause relative movement of the actuator with respect to the tool head.

23 Claims, 71 Drawing Sheets

(51) Int. Cl.
 *B25F 5/00* (2006.01)
 *B23D 21/06* (2006.01)
(52) U.S. Cl.
 CPC ......... *H01R 43/0427* (2013.01); *B23D 21/06* (2013.01); *H01R 43/0428* (2013.01)

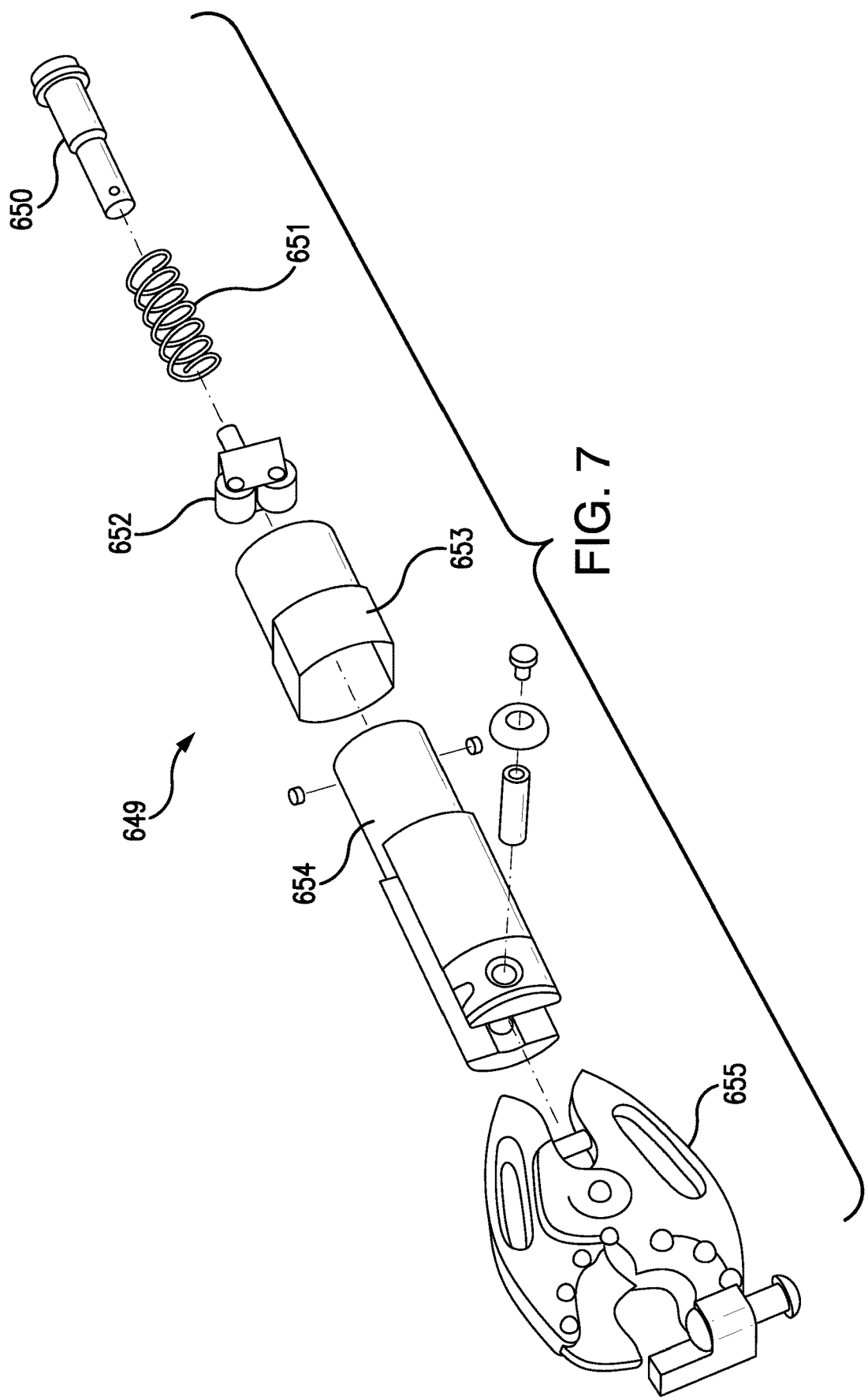

LONG REACH CABLE CUTTING TOOL INCLUDING DUAL ACTION HYDRAULIC PISTON ASSEMBLY AND RELEASABLE CONNECTIONS

FIELD OF THE INVENTION

The invention relates to a long reach cable cutting tool, and more specifically to a long reach cutting tool with a dual action hydraulic mechanism.

BACKGROUND

Many electrical utilities employ overhead metal conductor cables for the distribution of electricity. For example, Aluminum or copper conductor cables may be used. One type of commonly used conductor is ACSR cable, which includes a bare, steel cable core, comprising of one or more steel strands, encompassed by a series of aluminum cable, all ranging in count, diameter, and material properties. Depending on the size and construction of the cables, varying degrees of force are needed to produce a crimp or cut.

Many tools exist to crimp, cut, and/or perform other functions associated with installation and maintenance of the electrical cables. One such tool is disclosed in U.S. Patent Application Pub. No. US 2015/0283693 to Chiasson, et al., the entire contents of which are incorporated herein by reference. Chiasson discloses a cutter tool capable of cutting electrical cables up to 556 ACSR. Known existing tools for cutting cables are mechanically actuated, relatively slow, and ergonomically challenging.

Long reach cable cutting tools are utilized to safely cut high voltage utility cables, without first disconnecting the power being supplied to the cables. Existing long reach cable cutting tools are manually actuated, relatively slow to actuate, and ergonomically challenging to function when cutting the larger range of cables (>556ACSR). Accordingly, there is a need for a relatively more versatile long reach cable cutting tool that provides portability, extended reach, and fast, reliable, and ergonomically friendly conductor manipulation.

The present invention solves these and other problems in the prior art.

SUMMARY

The present invention relates to battery powered hydraulic tools and, more particularly, to a tool which provides a quicker tool stroke and greater cutting capacity than today's current existing options. One application for the long reach cable cutting tool according to the present disclosure is in the field of tools capable of safely cutting relatively large diameter, live or potentially live electrical cables.

According to an embodiment, a long reach cable cutting tool includes a handle, a motor positioned within the handle and electrically connectable to a battery, and a trigger positioned about the handle and electrically connected to the motor to provide power from the battery to the motor when the trigger is activated. A pump is positioned within the handle and connected to the motor, and the pump is activated to displace a first fluid. A hydraulic actuating system is positioned within the handle and connected to the hydraulic pump, the hydraulic actuating system being movable by the displacement of the first fluid to displace a second fluid. The long reach cable cutting tool also includes a pole having a first end and a second end, the pole connected to the handle at the first end, and a tool head connected to the pole at the second end, the tool head including a tool head hydraulic actuator hydraulically connected to the hydraulic actuating system. The tool head hydraulic actuator is movable by the displacement of the second fluid to cause movement of the actuator relative to the tool head.

In some embodiments, the hydraulic actuating system is a dual action hydraulic piston assembly, including a closed cylinder having first and second inlet ports on a first end and an outlet port on a second end, a conduit fixed to and extending into the cylinder and connected to the first inlet port, an inner ram having an inner cavity slidably mated with an outer surface of the conduit, an outer ram having an inner surface slidably mated with an outer surface of the inner ram and an outer surface slidably mated with an inner surface of the cylinder, wherein, in a fully retracted state, a proximate end of the inner ram and a proximate end of the outer ram are positioned adjacent to the first end of the cylinder, and the distal end of the inner ram and the distal end of the outer ram are positioned a distance from the second end of the cylinder defining a second fluid space. The inner ram and outer ram are movable by the first fluid being displaced into the inner cavity via the conduit to provide displacement through the outlet port of a second fluid contained in the second fluid space at a first flow rate and a first pressure. The outer ram is movable by the first fluid being displaced via the second inlet port, into a first fluid space between the first end of the closed cylinder and the proximate ends of the inner and outer rams, to provide displacement through the outlet port of a second fluid contained in the second fluid space at a second flow rate less than the first flow rate and a second pressure greater than the first pressure.

In some embodiments, the outer ram is movable by the first fluid displaced into the first fluid space via the second inlet port, at a second advance rate that is at least three times or at least four times that of a first advance rate that the inner ram and outer ram is movable by the first fluid displaced into the inner cavity via the conduit.

According to another embodiment, a dual action hydraulic piston assembly includes a cylinder having first end and a second end opposite the first end and defining an inner diameter, the cylinder including a first inlet port located at the first end, a second fluid inlet port located at the first end, and a fluid outlet port located at the second end, the first and second inlet ports for receiving a first fluid. The dual action hydraulic piston assembly also includes a conduit having an outer diameter and connected to the first inlet port, an inner ram, and an outer ram. The inner ram has an open distal end and a closed proximate end and defining an outer diameter, the inner ram defining a fluid cavity extending inward from the open distal end, the fluid cavity having an inner diameter substantially equal to and greater than the outer diameter of the conduit, the conduit extending into the fluid cavity, the inner ram slidably connected to an outer surface of the conduit, and an outer ram stop extending outward from and around the inner ram about the distal end. The outer ram has an open distal end and an open proximate end and defining an inner diameter, the inner diameter of the outer ram substantially equal to and greater than the outer diameter of the inner ram, the outer ram slidably connected to an outer surface of the inner ram, the outer ram defining an inner ram stop about the distal end and matable with the outer ram stop, a length of the outer ram along a longitudinal axis being less than a length of the inner ram along the longitudinal axis.

In some embodiments, the dual action hydraulic piston assembly includes a spring circumscribing an outer surface of the inner ram, the spring acting between the inner ram and the outer ram, the spring having a first end adjacent to a distal end of the outer ram and a second end adjacent to a distal end of the inner ram. In some embodiments, the inner ram includes a retainer mounted at its distal end receiving the second end of the spring, the retainer having a diameter greater than a diameter of the distal end of the inner ram. In some embodiments, the retainer has a plurality of grooves to allow fluid to flow around the retainer.

According to yet another embodiment, a dual action hydraulic piston assembly includes a closed cylinder having first and second inlet ports on a first end and an outlet port on a second end, a conduit fixed to and extending into the cylinder and connected to the first inlet port, an inner ram defining an inner cavity slidably mated with an outer surface of the conduit, and an outer ram defining an inner surface slidably mated with an outer surface of the inner ram and an outer surface slidably mated with an inner surface of the cylinder. In a fully retracted state a proximate end of the inner ram and a proximate end of the outer ram are positioned about the first end of the cylinder, and the distal end of the inner ram and the distal end of the outer ram are positioned a distance from the second end of the cylinder defining a second fluid space. The inner ram and outer ram are movable by a first fluid displaced into the inner cavity via the conduit to provide displacement through the outlet port of a second fluid contained in the second fluid space at a first flow rate and a first pressure. The outer ram is movable by the first fluid displaced via the second inlet port, into a first fluid space, to provide displacement through the outlet port of a second fluid contained in the second fluid space at a second flow rate less than the first flow rate and a second pressure greater than the first pressure.

In some embodiments, the second inlet port is positioned radially outboard of the first inlet port in communication with a first fluid space. In some embodiments, the dual action hydraulic piston assembly includes a spring circumscribing an outer surface of the inner ram, the spring acting between the inner ram and the outer ram, the spring having a first end adjacent to the distal end of the outer ram and a second end adjacent to the distal end of the inner ram.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 7 is a perspective and exploded view of an alternative tool head for a long reach cable cutting tool;

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

A long reach cable cutting tool is disclosed herein. Reference will now be made in detail to the illustrative embodiments of the present disclosure, which are illustrated in the accompanying figures.

Figure 1:
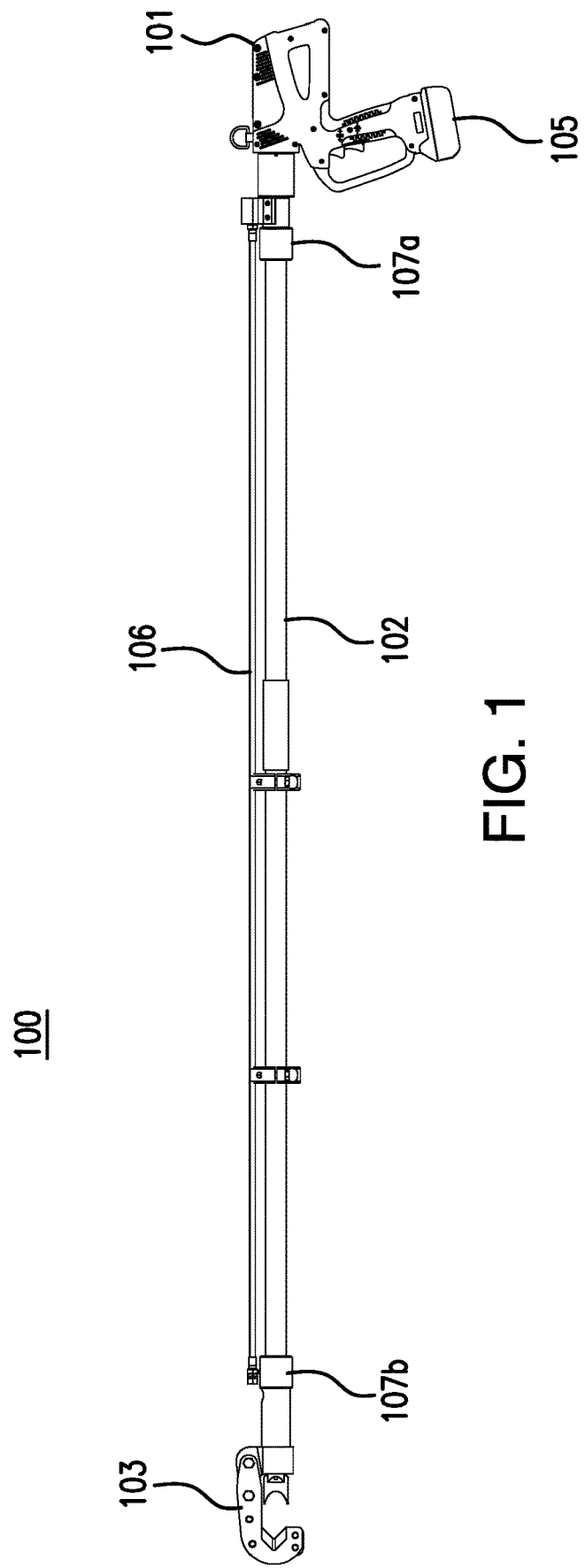
FIG. 1 is a perspective view of a long reach cable cutting tool according to the present disclosure.

As shown in FIG. 1, a long reach cable cutting tool 100 includes a handle 101, a pole 102, and a tool head 103. The handle 101 is preferably a pistol-type handle, but other designs are contemplated, for example a linear-type handle disclosed in Pub. No. US 2015/0283693. The pole 102 is comprised of a non-conductive material such as fiberglass at least partially filled with foam. The tool head 103 is described herein as a cutting tool, but as will be understood, other tool heads are contemplated, for example a crimping tool head can be included on the tool as the tool head and operated by the system described herein. One example of a cutter tool head is the Burndy PATCUT954 cutting head.

Figure 2:
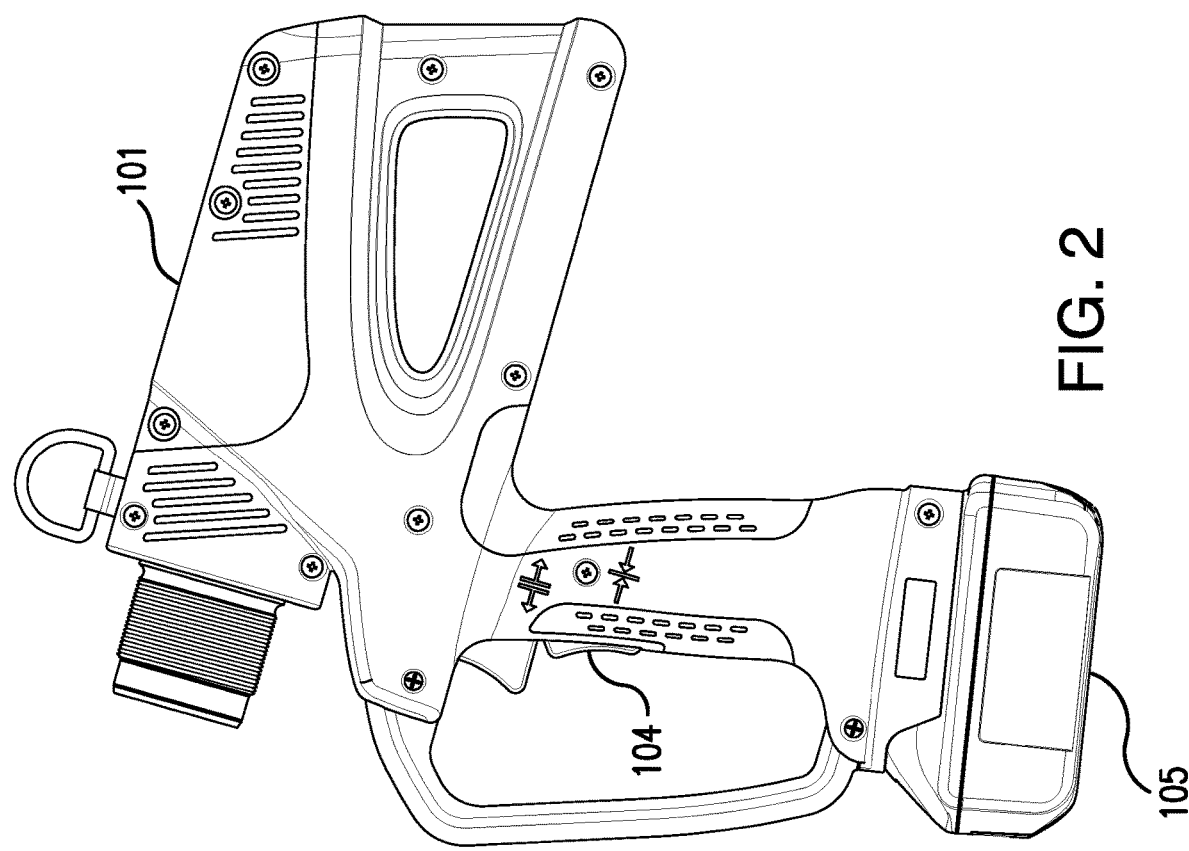
FIG. 2 is a perspective view of a handle of a long reach cable cutting tool according to the present disclosure.
Figure 3:
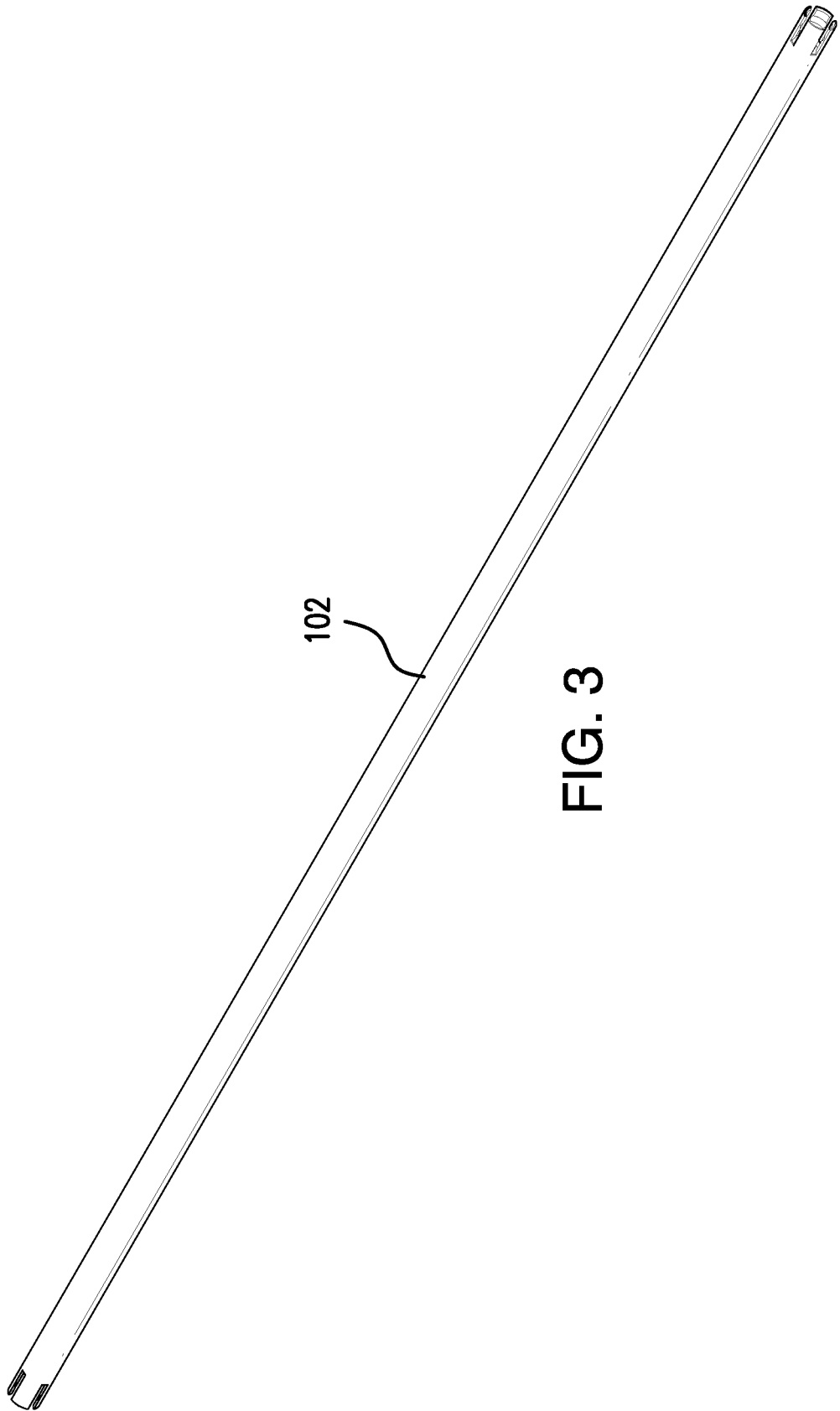
FIG. 3 is a perspective view of a pole of a long reach cable cutting tool according to the present disclosure.

As shown in FIG. 2, the handle 101 includes a trigger or actuator switch 104. In some embodiments, as shown, the handle 101 further includes a second trigger to reset the tool 100 and/or release the hydraulic fluid after actuation. A battery 105 is mechanically connectable to the handle 101.

In one embodiment, and as will be described in greater detail below, the handle 101 and the tool head 103 are releasably connected to the pole 102 via connectors 107a and 107b, respectively. Although described herein as utilizing the connectors 107a/107b to releasably connect the pole 102 to the handle 101 and/or the tool head 103, other connectors and connecting systems are contemplated for either or both connections. Permanent connections are also contemplated.

Figure 4:
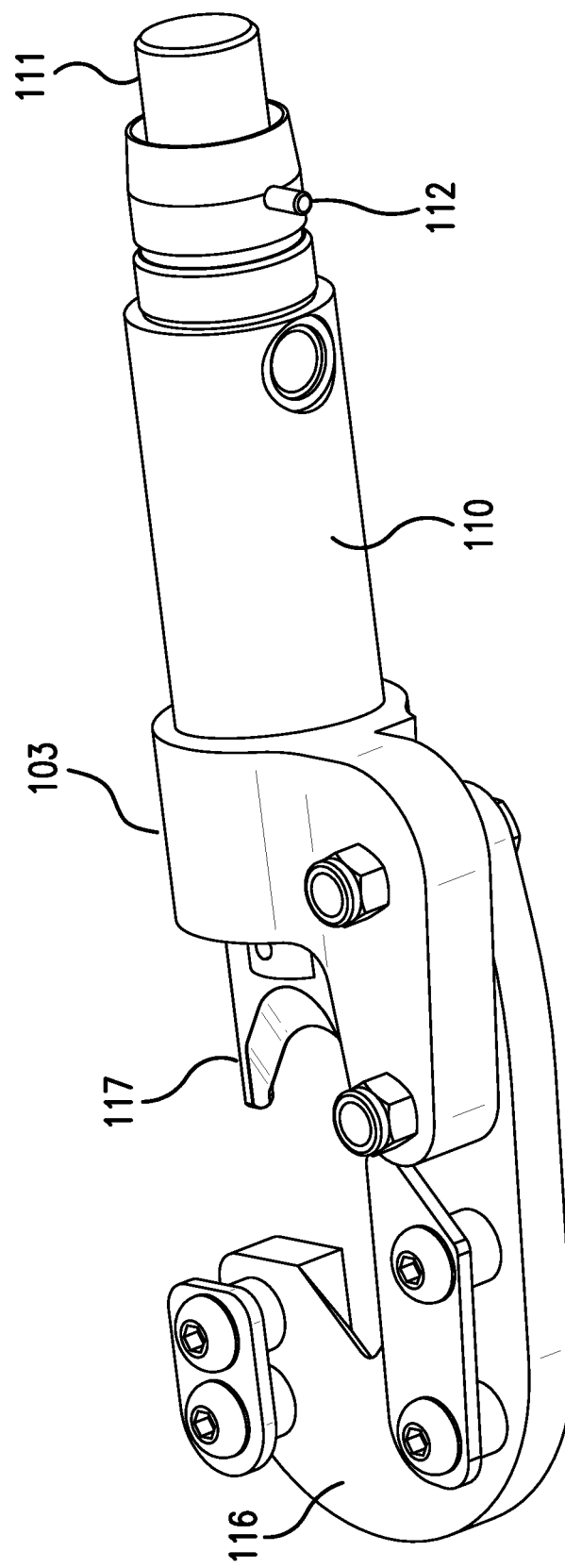
FIG. 4 is a perspective view of a tool head of a long reach cable cutting tool according to the present disclosure.

FIG. 4 illustrates an exemplary embodiment of the tool head 103. The tool head 103 includes a housing 110 with a connector portion 111 on its proximal end for releasably engaging with the connector 107b. The housing 110 includes a hydraulic fluid connector 112 for receiving hydraulic fluid from the hose a 106. There is a fixed cutter 116 and a movable cutter 117 which advances towards the fixed cutter 116 when the trigger 104 is activated.

Within the housing is a return spring (not shown) that retracts or assists with retracting the movable cutter 117 after use. Unlike prior art designs, the return spring is extended in tension when the tool head 103 is actuated and retracts to move the movable cutter 117 back to its rest position. Parameters of the return spring according to a preferred embodiment are shown in Table 1.

TABLE 1

| Return Spring Parameters | | |
|---|---|---|
| $L_{free}$ | 4 | in |
| $L_i$ | 4.437 | in |
| $L_{MAX}$ | 7.062 | in |
| total Stretch | 3.062 | in |
| $k_{spring}$ | 23 | lbf/in |
| $F_{sp-preload}$ | 10.051 | lbf |
| $F_{sp-MAX}$ | 70.426 | lbf |

Figure 5:
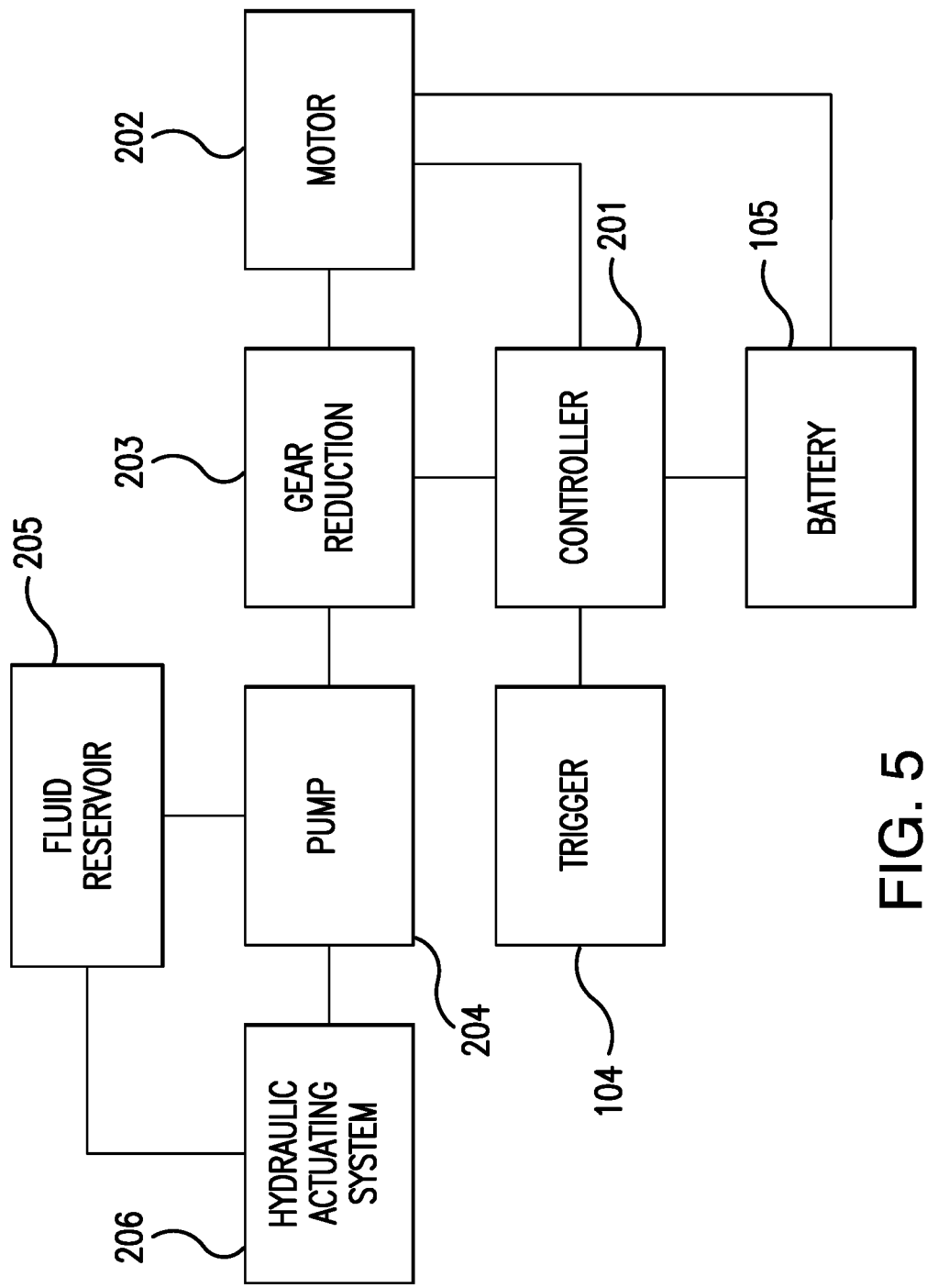
FIG. 5 is a block diagram illustrating components at or about a handle of the long reach cable cutting tool according to the present disclosure.

FIG. 5 is a block diagram illustrating components at or about the handle 101. Contained within the handle 101, the tool 100 also includes a controller 201, a motor 202, a gear reduction assembly 203, a pump 204, a fluid reservoir 205 containing a first fluid, and a hydraulic actuating system 206. In alternate embodiments, the tool 100 could comprise additional or alternative components.

The hydraulic actuating system 206 is movable by displacement of the first fluid via the pump. A hydraulic hose 106 connects hydraulic actuating system 206 contained in handle 101 to hydraulic components of tool head 103 to provide a fluid path for displacement of a second fluid created by hydraulic actuating system 206 to tool head 103. The hose 106 is preferably comprised of a non-conductive material.

The battery 105 is electrically connected to the controller 201 and the motor 202 when battery is mechanically connected to the handle 101. The motor 202 receives operating signals from the controller 201 to turn on and off, vary speed, etc. The trigger 104 is connected to the controller 201. The trigger 104 can be a variable resistance-type actuator or a simple on/off switch; other trigger types are contemplated. The controller 201 receives signals from the trigger 104 to control the motor 202. Although described herein as including a controller to provide control of the motor 202, the trigger 104 can be directly connected to the motor 202 to provide direct control thereto.

The motor 202 is coupled to the controller 201 and the battery 105. The controller 201 preferably comprises a printed circuit board. However, in alternate embodiments, any suitable type of controller could be provided. The motor 202 is controlled by the controller 201. The motor 202 is adapted to operate at a nominal voltage corresponding to the voltage of the battery 105. For example, if the battery 105 is adapted to output a voltage of about 18 volts, then the motor 202 would be adapted to operate at a nominal voltage of about 18 volts. In the exemplary embodiment shown, the battery 105 is an 18 V DC battery. The motor 202 preferably comprises a RS-775WC-8514 motor manufactured by Mabuchi Motor Co., Ltd. of Chiba-ken, Japan. However, in alternate embodiments, any suitable type of motor adapted to operate above a 16 V nominal voltage could be used. The output shaft of the motor 202 is connected to the pump 204 by a gear reduction or gearbox 203. Any suitable type of gear reduction assembly could be provided.

The motor 202 is adapted to function with an operating voltage between 6-20 volts. Under a no-load condition, such a motor 202 can operate at 19,500 rpm with a current of about 2.7 amps. At maximum efficiency, the motor 202 can operate at 17,040 rpm with a current of about 18.7 amps, a torque of about 153 mN-m (1560 g-cm), and an output of about 273 W.

The motor 202 and gear reduction 203 are connected to the pump 204. The pump 204 provides displacement of a first fluid from the fluid reservoir 205 to the hydraulic actuating system 206. The tool 100 is preferably adapted to operate at a maximum hydraulic pressure of about 8,000-10,000 psi. However, in alternate embodiments, the tool could be adapted to operate at any suitable type of maximum hydraulic pressure, such as 6000 psi or 16,000 psi.

One example of the parameters for a preferred embodiment are shown in Table 2.

TABLE 2

| Motor/Input Parameters | | |
|---|---|---|
| Pump Diameter | 0.31 | in |
| Stroke | 0.088 | in/rev |
| Pump Area | 0.08 | in^2 |
| # of Pumps | 1 | |
| Displacement/rev | 0.01 | in^3/rev |
| Motor Input Speed | 6000 | rev/min |
| Motor Input torque | 19.91 | in-lbf |
| Gearbox Output Speed | 428.57 | Rev/min |
| Gearbox Output Torque | 278.8 | in-lbf |
| Total Ram Stroke | 3.06 | in |
| Full Advance Vol | 5.41 | in^3 |
| # strokes to fill | 407.33 | rev |
| time to fill | 7.03 | s |

As shown in Table 2, and described in more detail below, the time to fill and therefore actuate the tool is approximately seven seconds which provides a substantial advantage over the prior art tools which can take one minute or more.

When the pump 204 is activated, it displaces a first fluid contained in the fluid reservoir 205, positioned adjacent, surrounding, or otherwise operably connected to the pump 204. When the pump 204 displaces the first fluid it moves a hydraulic actuating system 206. In an exemplary embodiment, the hydraulic actuating system 206 is a dual action hydraulic piston assembly 900, described in greater detail below. Any ram-type hydraulic actuator that includes a ram that is slidably positioned in a cylinder will produce the needed displacement of the first fluid, but without the beneficial effects of the dual action hydraulic piston assembly 900 described herein. In alternative embodiments, other actuators may be used. Displacement of the ram by the first fluid causes displacement of a second fluid. As will be shown, the ram can be in contact with the first fluid on a first side and the second fluid on a second side, although other types of operable connections may be used or designed. In certain embodiments, the first fluid and the second fluid are separated or isolated from one another. A seal can be formed between the first fluid and the second fluid, for example by the ram and/or through one or more sealing elements positioned adjacent thereto. In an exemplary embodiment, the second fluid is a non-conductive fluid.

In an exemplary embodiment, the second fluid is moved by the hydraulic actuating system 206 through the hose 106. The hose 106 extends from the handle 101 of the tool 100 to the tool head 103 of the tool 100. Various connections or couplings can be used to connect the hose 106 to the handle 101 and the tool head 103. The hose 106 is shown positioned outside of the pole 102.

Movement of the second fluid by the hydraulic actuating system 206 causes movement of a second actuator, for example a second ram, within the tool head 103. Movement of the second actuator can cause movement or actuation of the tool head 103, for example to perform a crimping or cutting operation. The end of the second ram can be permanently or releasably connected to the tool head, for example by a fastener such as a pin, a twist lock, a threaded, or other suitable connection.

Figure 6:
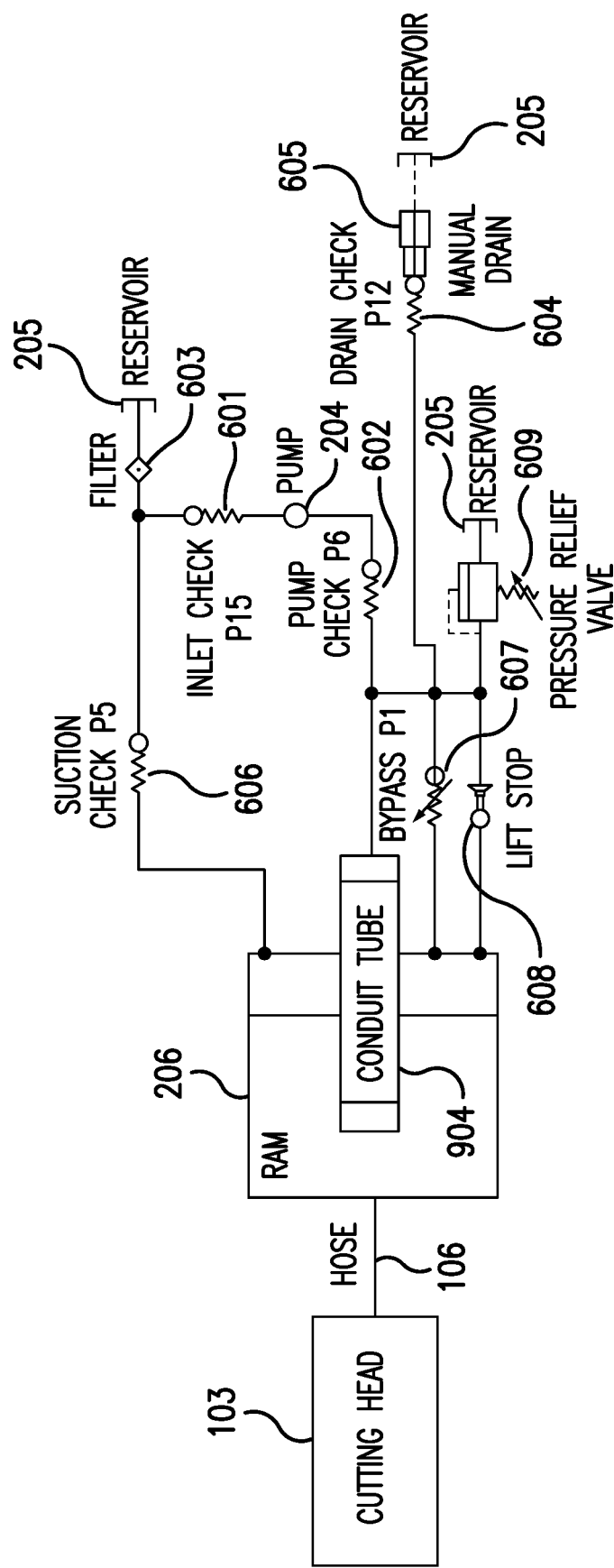
FIG. 6 is a schematic diagram illustrating a hydraulic system contained within a handle of a long reach cable cutting tool according to the present disclosure.

FIG. 6 illustrates a hydraulic system schematic according to exemplary embodiment and FIGS. 32-35 illustrate cross sectional views of the hydraulic system according to exemplary embodiment. The hydraulic system includes the reservoir 205 and the pump 204, in fluid communication with the reservoir 205. An inlet check valve 601 is provided between the reservoir 205 and the pump 204 to prevent unwanted backflow into the reservoir 205. A pump check valve 602 is provided between the pump 204 and the hydraulic actuating system 206 to prevent the pressure within the actuating system from returning to the pump while it is displacing fluid (for example, on an inlet stroke, where it is filling it's bore for the next pump stroke).

A bypass check valve 607 is calibrated to control the flow path and ultimately the rate of displacement provided from hydraulic actuating system 206 and the first fluid, to the second fluid and ultimately the cutting or crimping head 103.

The pump 204 displaces the first fluid from the reservoir 205 to create pressure and induce linear motion of the hydraulic actuating system 206. The linear movement of the hydraulic actuating system 206 displaces the second fluid through hose 106. Displacement of the second fluid causes movement of the second actuator in the tool head 103 to cause actuation or operation of the tool.

The system can also include a filter 603 positioned at an outlet of the reservoir 205 to filter the first fluid.

The rate of motion of the hydraulic actuating system 206 is controlled naturally by bypass check 607, which is calibrated to open at a specific pressure differential between the volume of fluid within the hydraulic actuating system 206, and the pressure provided by the pump 204. When the pressure in the hydraulic actuating system 206 and the spring load of bypass check 607 is greater than that provided by the pump 204, the bypass check does not open, and the fluid displacement generated by the pump 204 is instead channeled through the conduit tube 904 (to the first inlet port), and applies a load equivalent to the pressure generated by the fluid displacement of the pump 204. This displacement advances the ram of the hydraulic actuating system 206, displacing the second fluid through the hose 106, to the cutting head 103, where the ram and cutting blade advance towards the cable being cut.

Additionally, when the ram within the hydraulic actuating system 206 is advanced by applying pressure through the conduit tube 904 (and into conduit 901 shown in FIGS. 32-35), a negative pressure is developed within the larger section of the bore, which opens suction check 606, allowing fluid to enter the bore of the cylinder until the difference in pressure is equalized between the cylinder and the reservoir 205.

When the pressure in the hydraulic actuating system 206 increases to a value that is less than that being generated by the pump 204, with respect the value the bypass check 607 has been calibrated too—i.e. the cutting blade of cutting head 103 contacts the cable it is cutting, and resistive load is increased—bypass check 607 opens, and the fluid displaced by the pump 204 is forced into larger section of ram (into the fluid space 1101 via second outlet port 905) as well as the conduit tube 904. Suction check 606 will operate as necessary in this scenario, or not at all, depending on the pressure differentials within the entire system.

The system can also include a drain 604 and a relief valve 609. The drain 604 can be actuated by a user depressing a switch, trigger, or other device which applies a mechanical load to drain pin 605, which unseats the ball of drain check 605, creating an open path from the hydraulic actuating system 206 back to the reservoir 205, allowing the cutting head 103, second hydraulic fluid, first hydraulic fluid, and hydraulic actuating system 206 to return to their initial resting positions/minimal energy levels.

The relief valve 609 can also be configured to drain the first fluid if a pressure limit is reached or exceeded, or if a cycle is completed.

A lift stop 608 is provided to contain a check ball from impacting or otherwise damaging components, limit the action of the check ball during function, but allow the entire drain system to remain connected to the hydraulic actuating system 206. This ensures the system does not develop any unwanted pressure differentials internally that are not being alleviated when either the mechanical drain 604 or pressure relief valve 609 open/function.

Another embodiment of a tool head 649 is illustrated in FIG. 7. The tool head 649 includes a cutting or crimping portion 655. The tool head 649 further includes a second chamber that receives the actuator 650 and a return spring 651. The return spring 651 biases the actuator 650 to an initial position, for example away from the tool head 103. The actuator 650 extends into an adaptor 653 that is connected to the tool head 103 and to a yoke 654. A roller 652 can be positioned in the adaptor 653 to guide the movement of the actuator 650. The tool head 103 is positioned in the yoke 654 and/or connected to the yoke 654. In an exemplary embodiment, the tool head 103 can be releasably connected to the yoke 654.

In operation, a user activates the trigger 104, actuating the pump 204. The pump 204 displaces the first fluid, moving the hydraulic actuating system 206. Movement of the hydraulic actuating system 206 causes movement of the second fluid through the hose 106. Movement of the second fluid causes movement of the actuator 650 which causes operation of the tool head 103, for example closing the jaws to perform a cutting or crimping operation. After the operation is performed, the first fluid can be drained back into the reservoir 205, either automatically or by the user pressing the trigger 104 to engage the drain actuator 604. Draining the first fluid allows the spring 651 to bias the hydraulic actuating system 206 and the tool head 103 into the initial positions.

In an exemplary embodiment the second fluid is non-conductive. Moreover, the hose 106 and the pole 102 can be non-conductive, therefore electrically isolating the user end from the tool head 103. Isolating the first fluid and the second fluid also helps prevent the first fluid from being contaminated with metal particles over time as the tool 100 is cycled. This helps increase the useful life of the tool 100 as the metal particles can damage the operation of the pump 204.

Figure 8A:
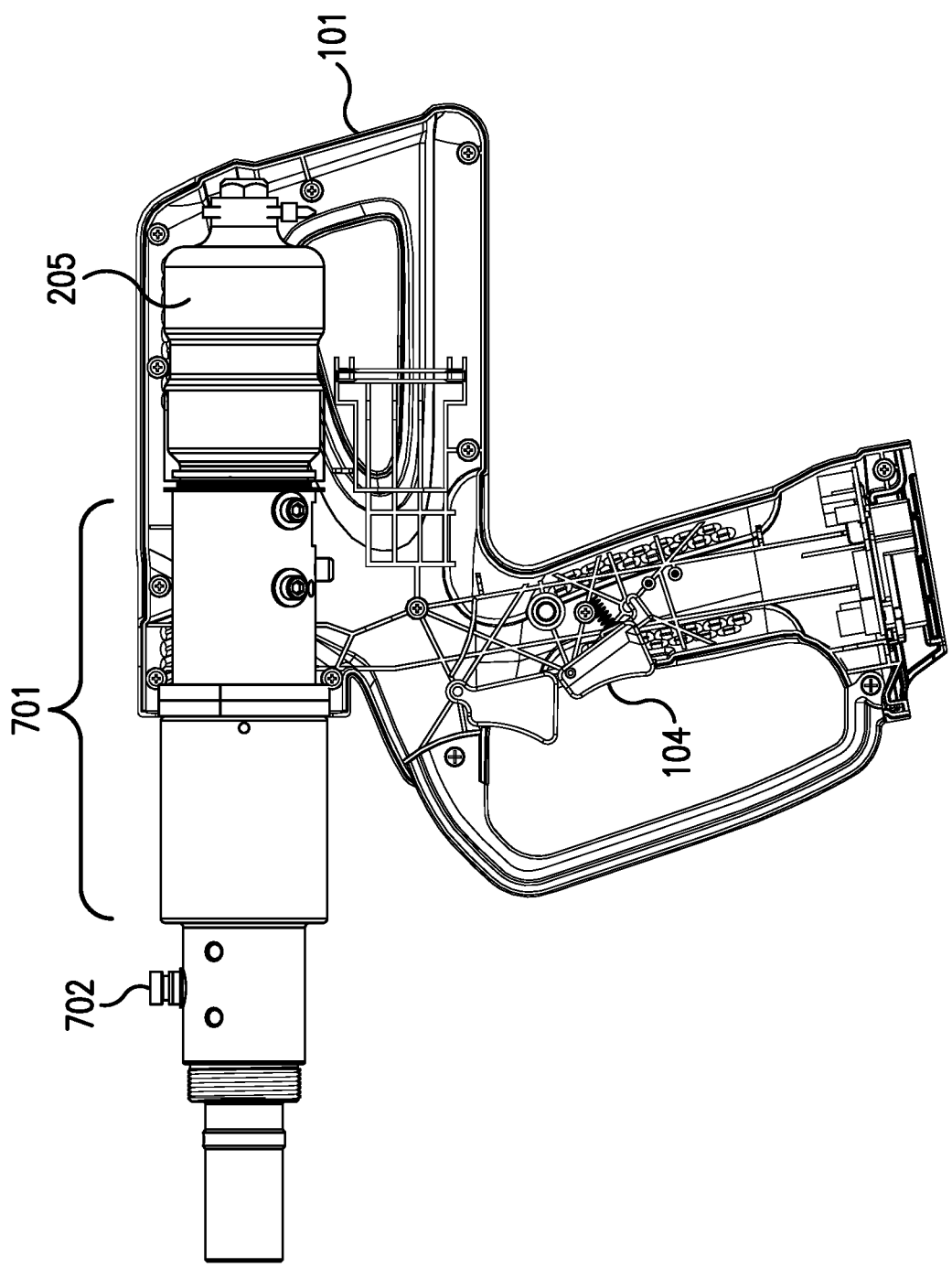
FIG. 8A is a perspective view of an open handle of a long reach cable cutting tool showing hydraulic casing components contained therein according to the present disclosure.
Figure 8B:
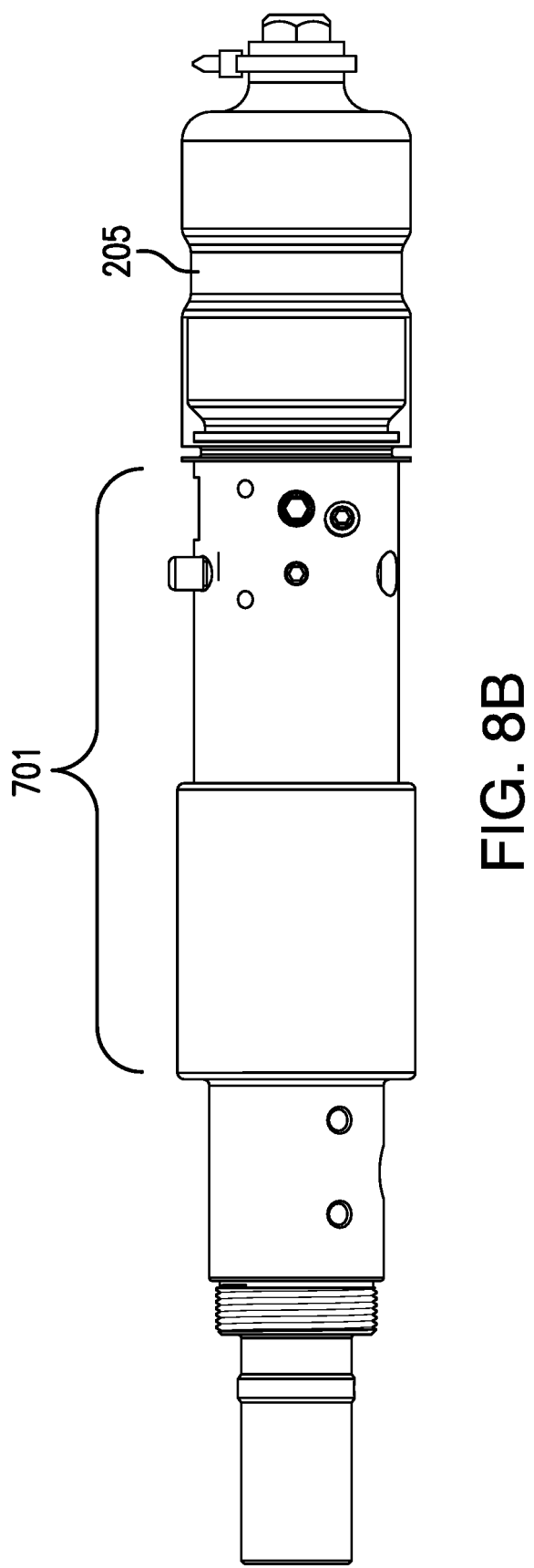
FIG. 8B is a perspective view of hydraulic casing components contained within the handle of FIG. 8A.
Figure 9:
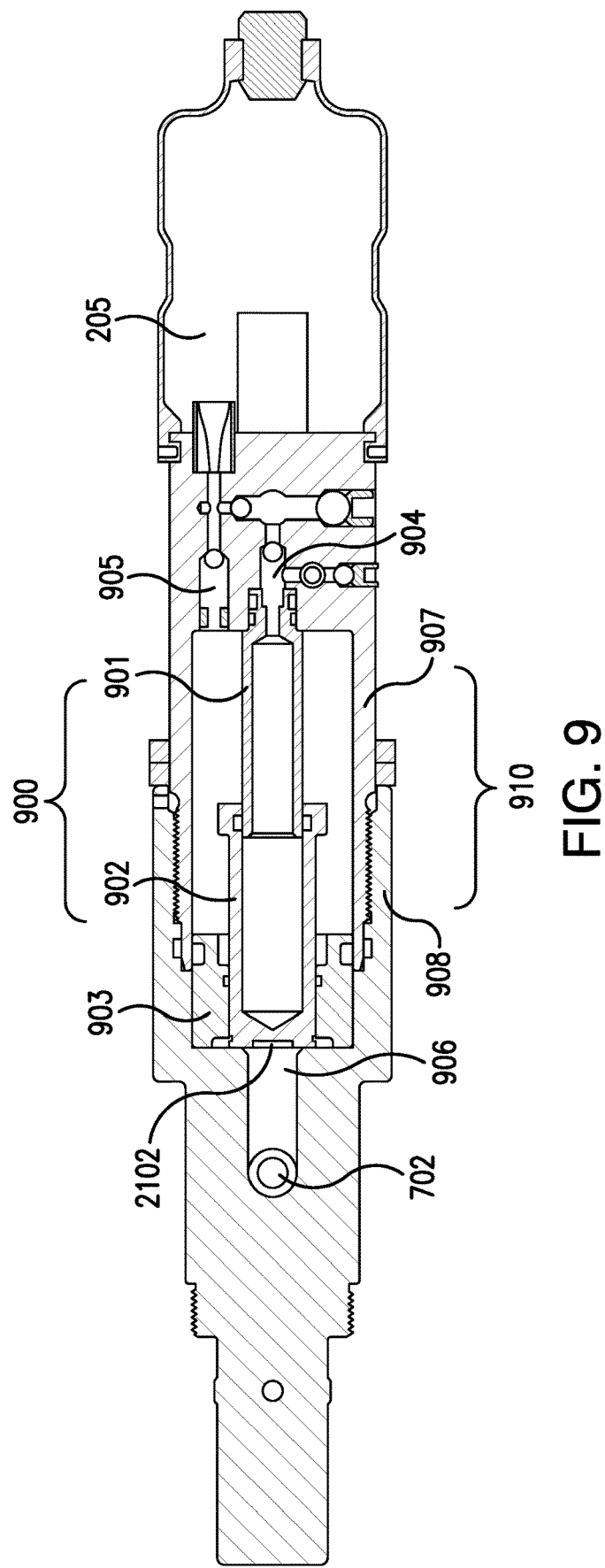
FIG. 9 is a cross-sectional view of a hydraulic system including a dual action hydraulic piston assembly contained within a handle of a long reach cable cutting tool according to the present disclosure.

The hydraulic system illustrated in FIG. 6 is primarily contained in the handle 101 and within an assembly 701 shown in FIG. 8A and shown in greater detail in FIG. 8B. The reservoir 206 and a hydraulic fluid connector 702 for the hose 106 are also indicated in FIG. 8A.

As described above, the hydraulic actuating system 206 is preferably implemented as the dual action hydraulic piston assembly 900. The dual action hydraulic piston assembly 900 will now be described with respect to FIGS. 9-13. Although the long reach cable cutting tool 100 is described herein as including the dual action hydraulic piston assembly, other hydraulic actuating assemblies are contemplated, for example, a single piston system. Varying sizes of the hydraulic actuating assembly are also contemplated for smaller or larger applications.

The central components of the dual action hydraulic piston assembly 900 include conduit 901, inner ram 902, and outer ram 903. These components of the dual action hydraulic piston assembly 900, namely the conduit 901, the inner ram 902, and the outer ram 903, are illustrated in more detail in FIG. 14-25. The conduit 901, the inner ram 902, and the outer ram 903 are contained within cylinder 910.

Contained within the assembly 701 are a lower cylinder component 907 and an upper cylinder component 908. When joined, the lower cylinder component 907 and the upper cylinder component 908 form the hydraulic cylinder 910 containing the dual action hydraulic piston assembly 900. First and second inlet ports 904 and 905, respectively, are positioned at a lower end of the cylinder 910. In the exemplary embodiment, the second inlet port 905 is positioned radially outboard of the first inlet port 904 in communication with a first fluid chamber or space 1101. An outlet port 906 is positioned at an upper end of the cylinder 910.

Figure 23:
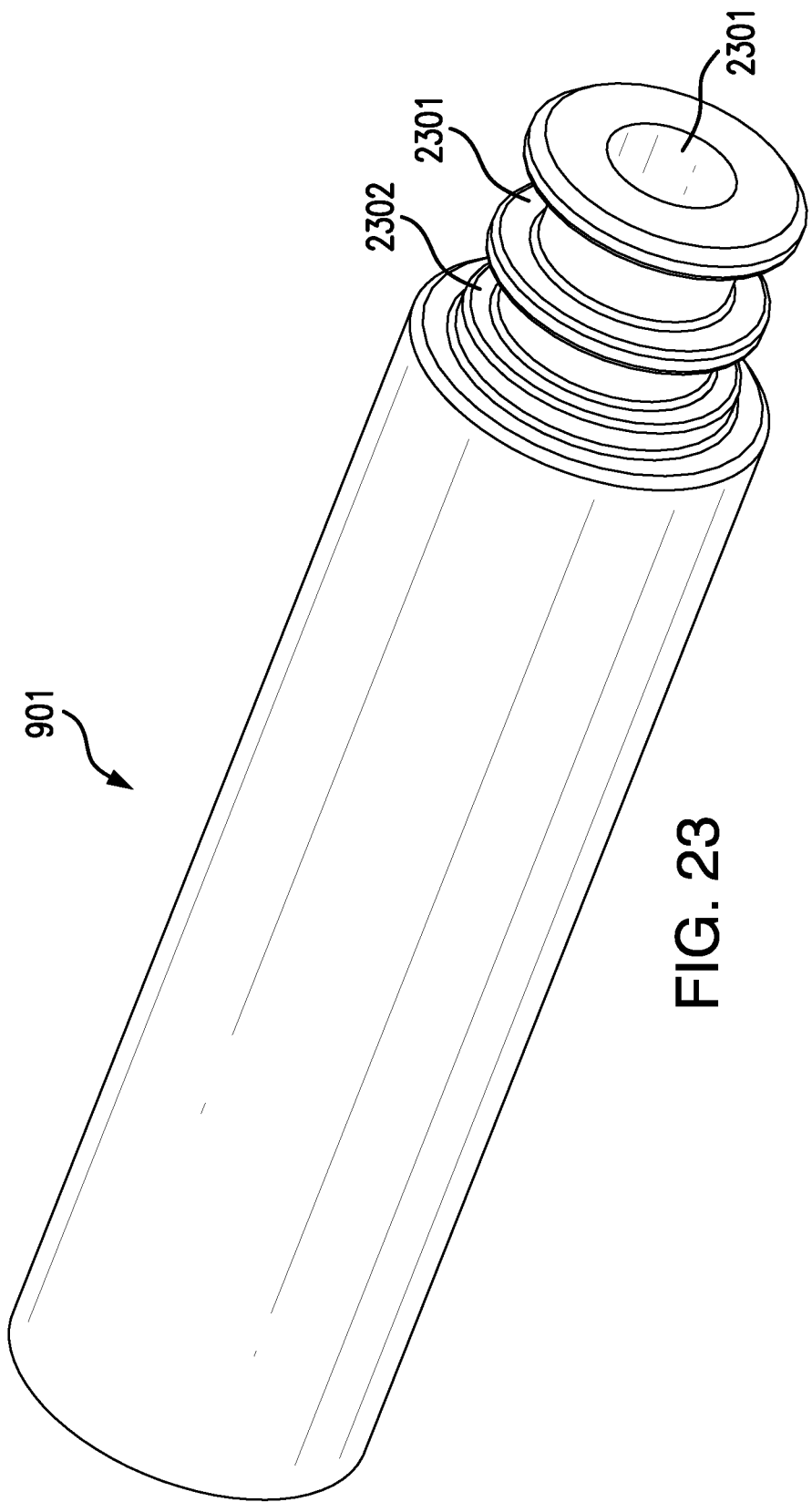
FIG. 23 is a bottom perspective view of a conduit of the dual action hydraulic piston assembly according to the present disclosure.
Figure 24:
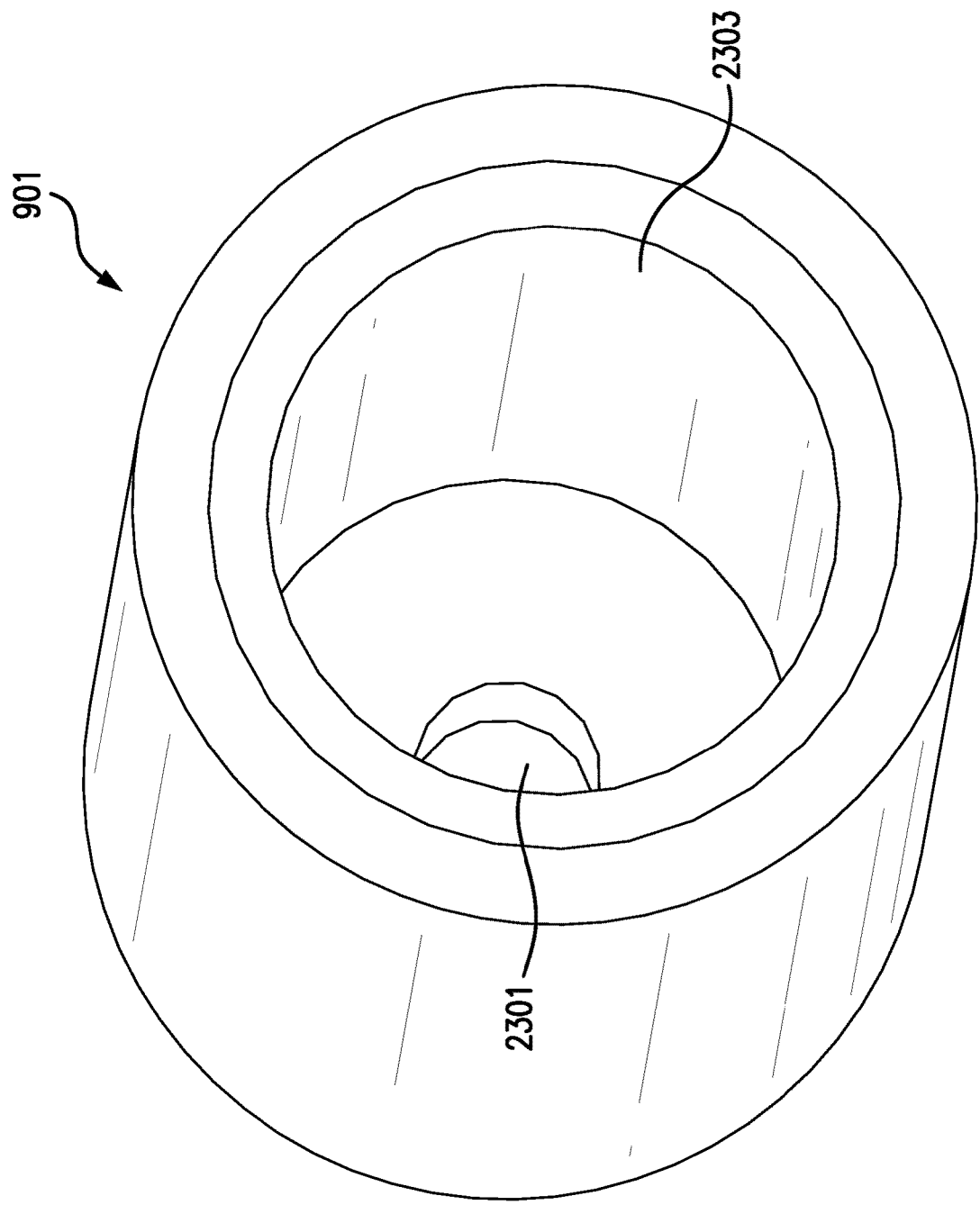
FIG. 24 a top perspective view of the conduit of the dual action hydraulic piston assembly according to the present disclosure.
Figure 25:
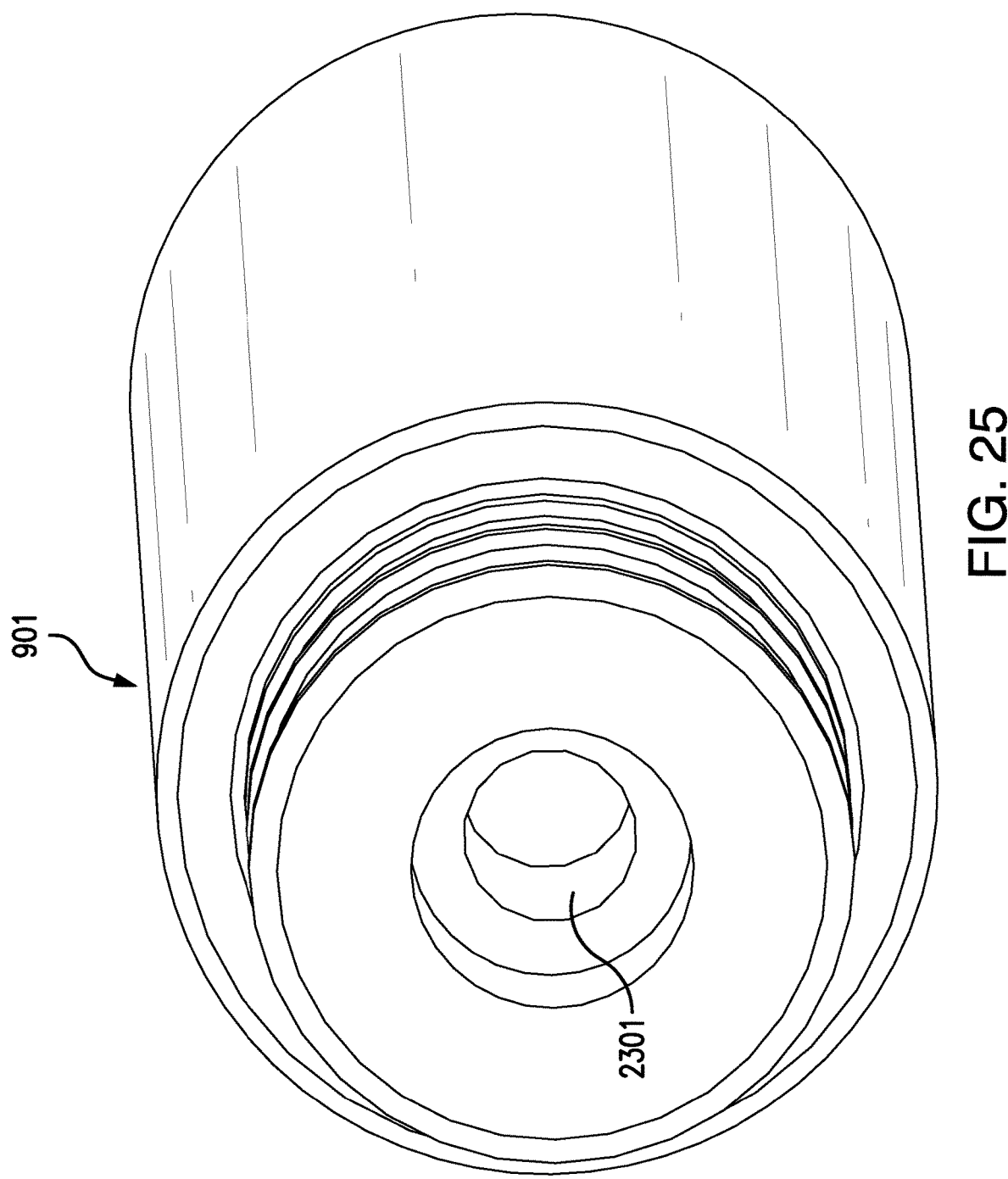
FIG. 25 is a bottom perspective view of the conduit of the dual action hydraulic piston assembly according to the present disclosure.
Figure 26:
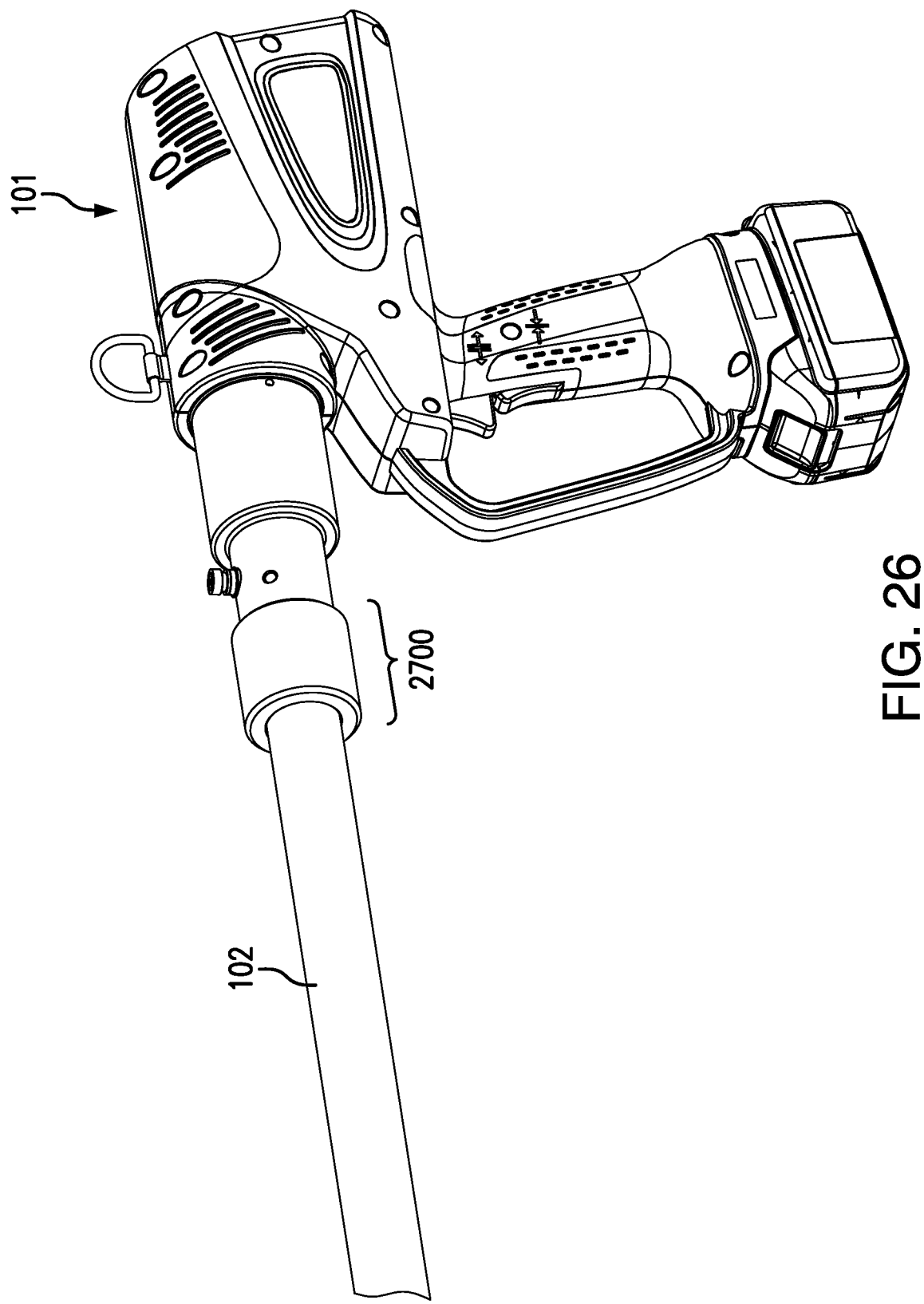
FIG. 26 is a side perspective view of a coupling for attaching a pole to a handle of the long reach cable cutting tool according to the present disclosure.
Figure 27:
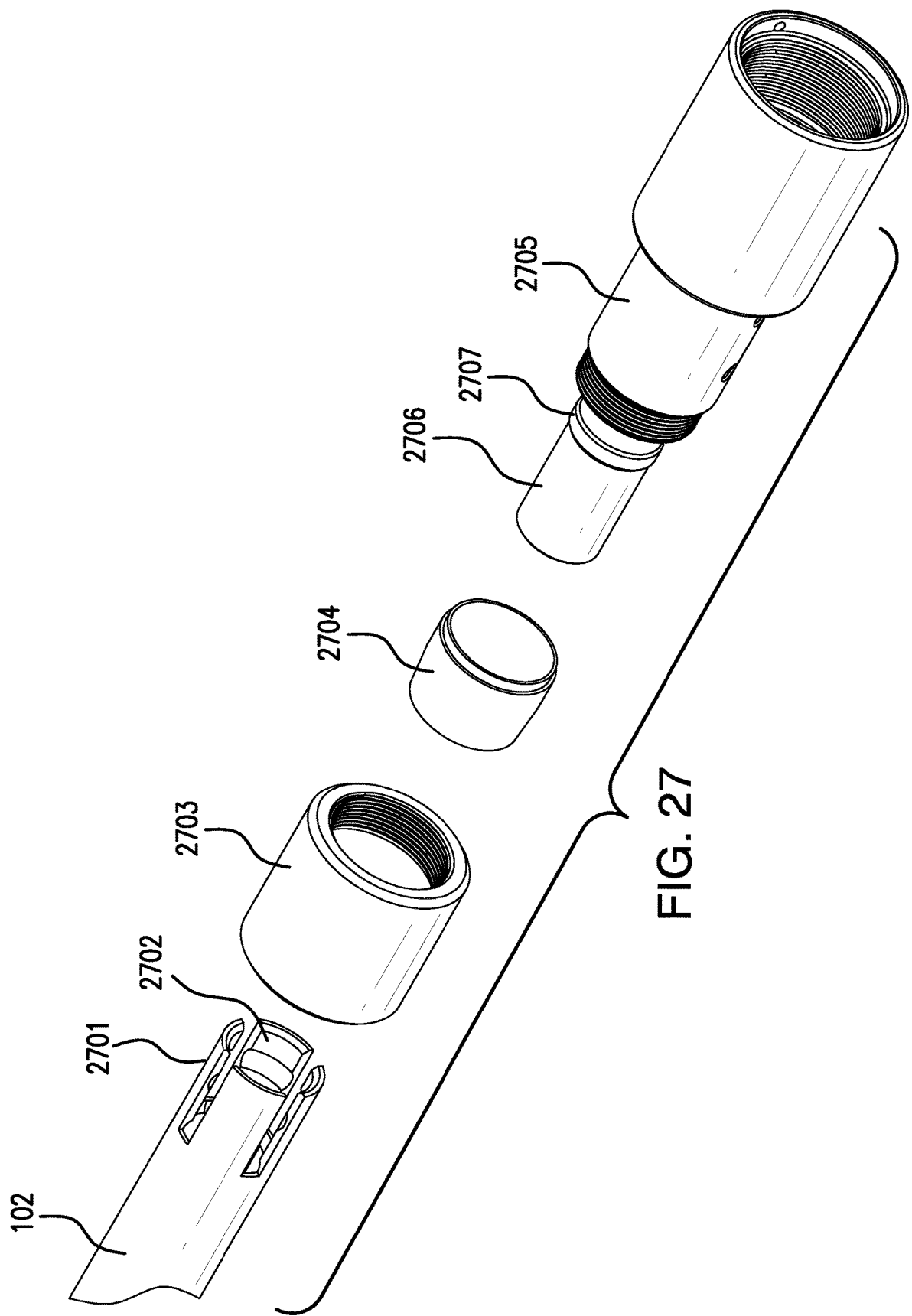
FIG. 27 is a side exploded view of a coupling for the long reach cable cutting tool according to the present disclosure.
Figure 28:
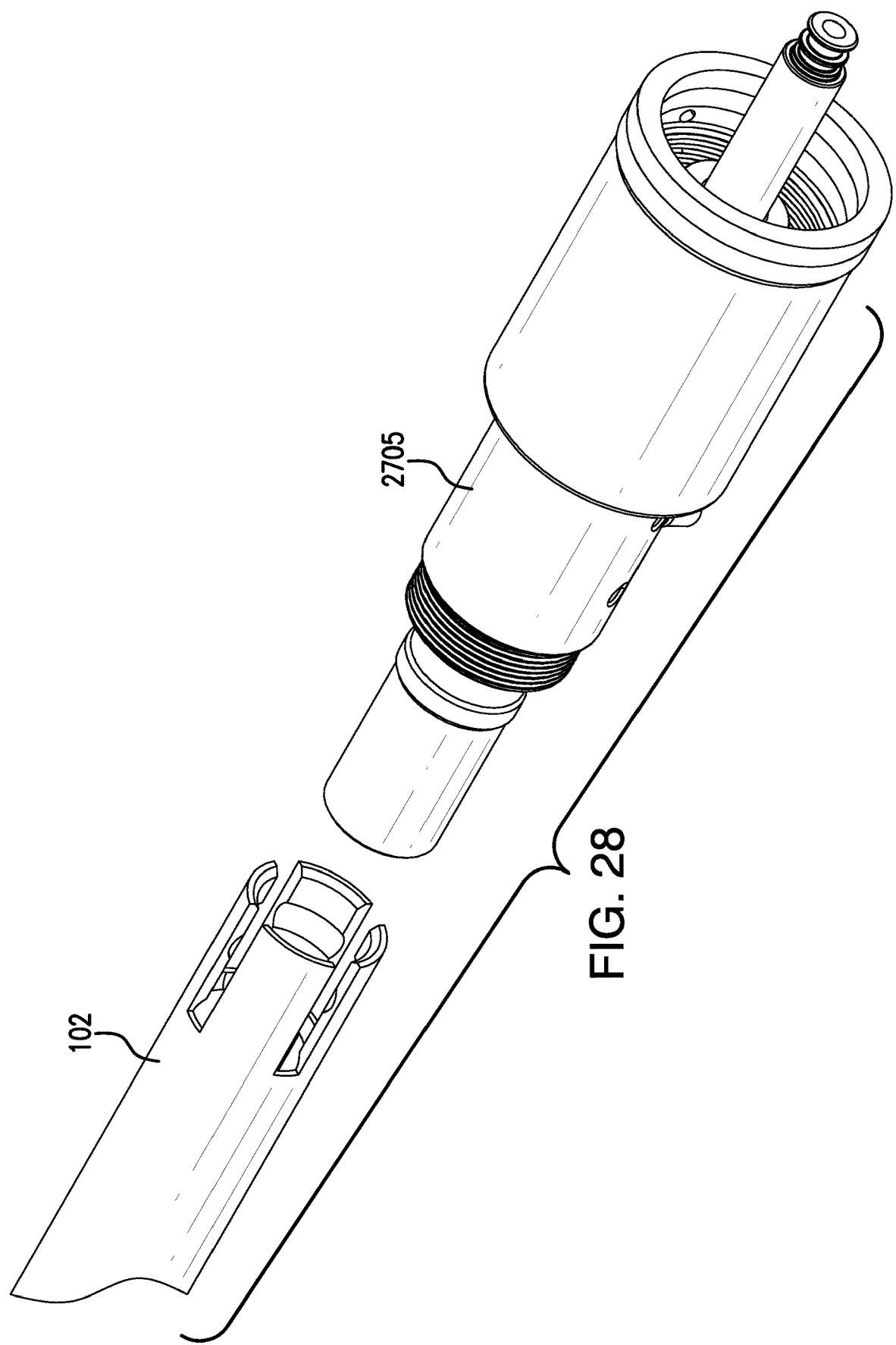
FIG. 28 is a side perspective view of the assembly of a coupling for the long reach cable cutting tool according to the present disclosure.
Figure 29:
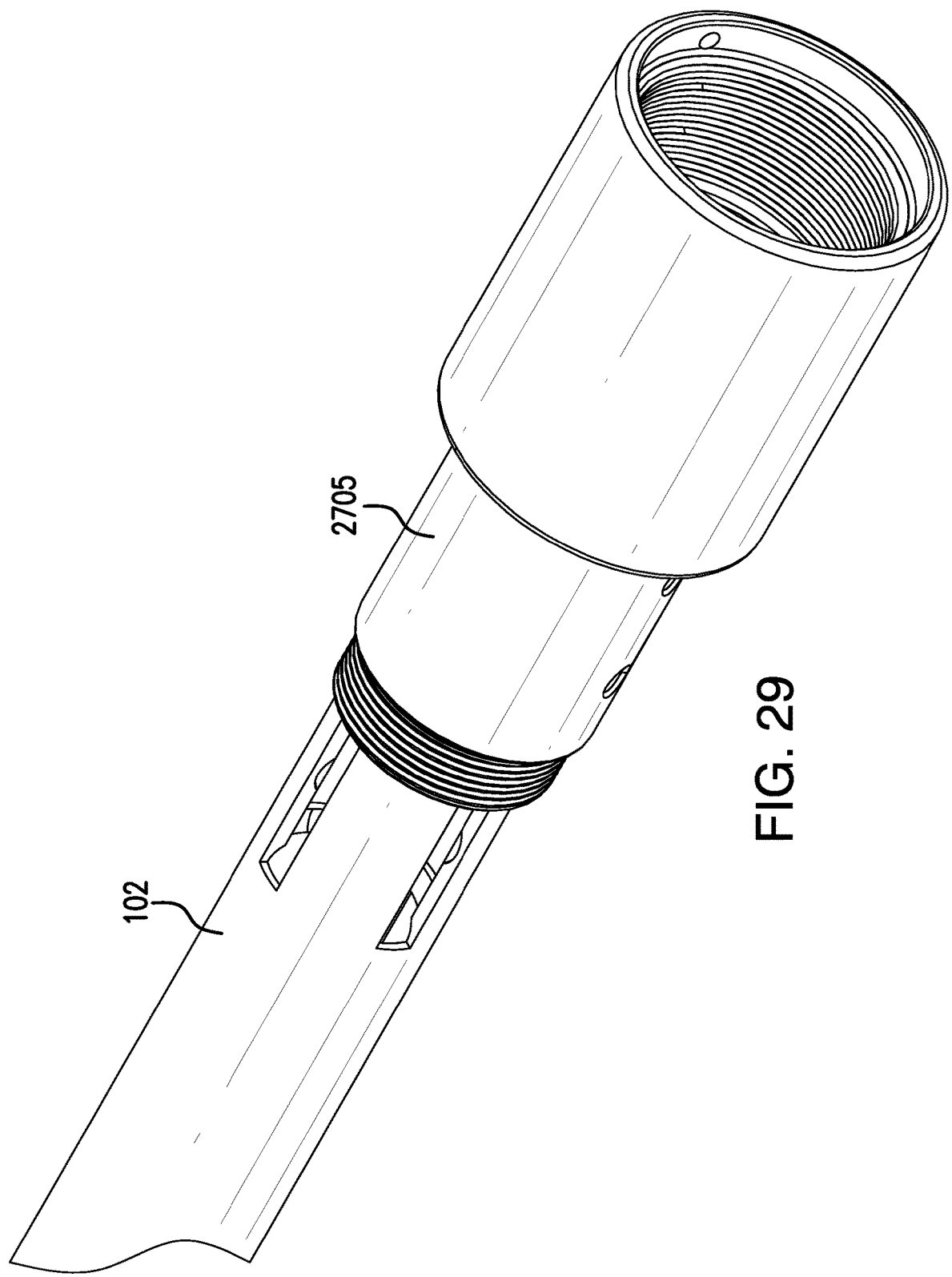
FIG. 29 is a side perspective view of the continued assembly of a coupling for the long reach cable cutting tool according to the present disclosure.
Figure 30:
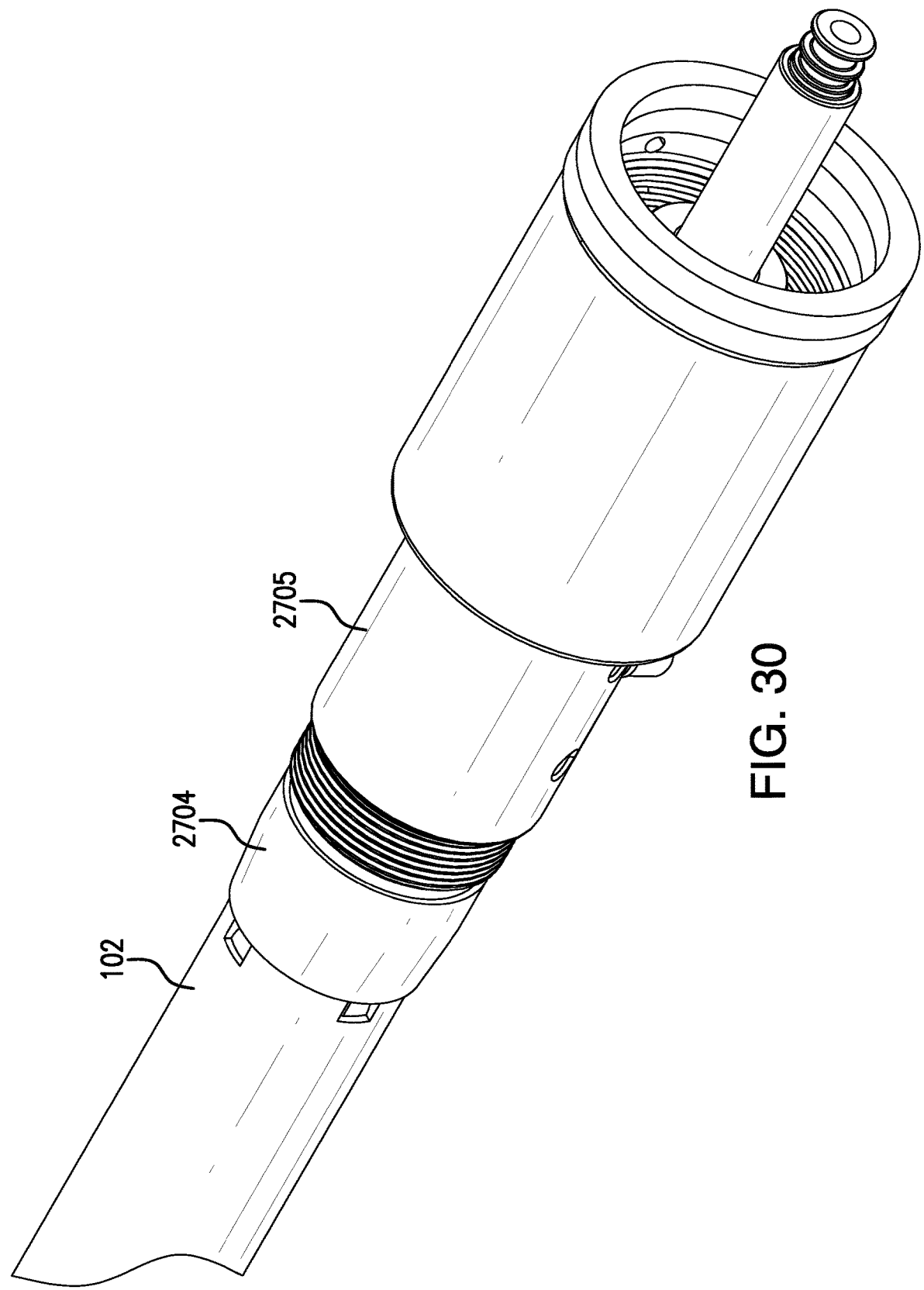
FIG. 30 is a side perspective view of the continued assembly of a coupling for the long reach cable cutting tool according to the present disclosure.
Figure 31:
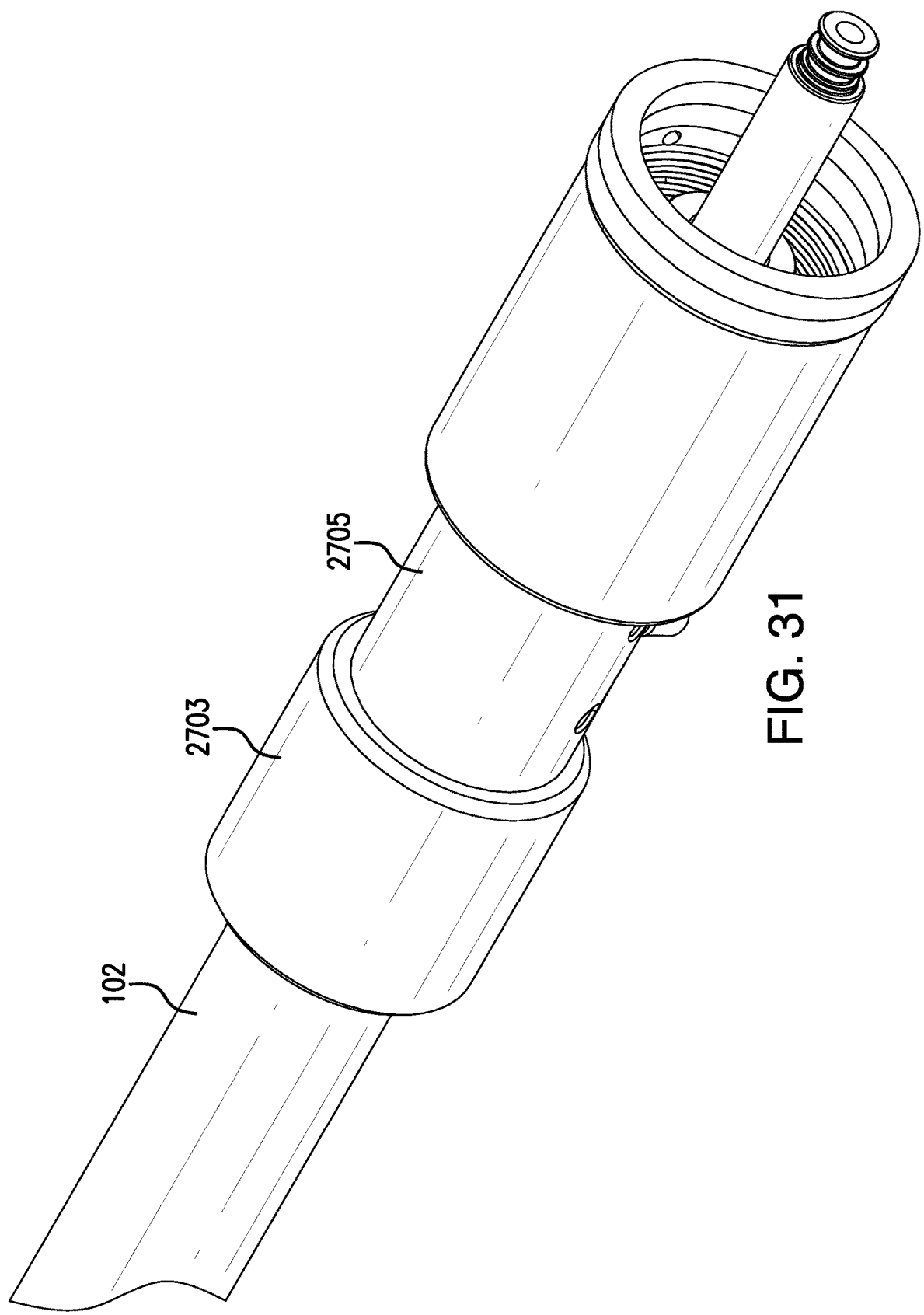
FIG. 31 is a side perspective view of the final assembly of a coupling for the long reach cable cutting tool according to the present disclosure.
Figure 32:
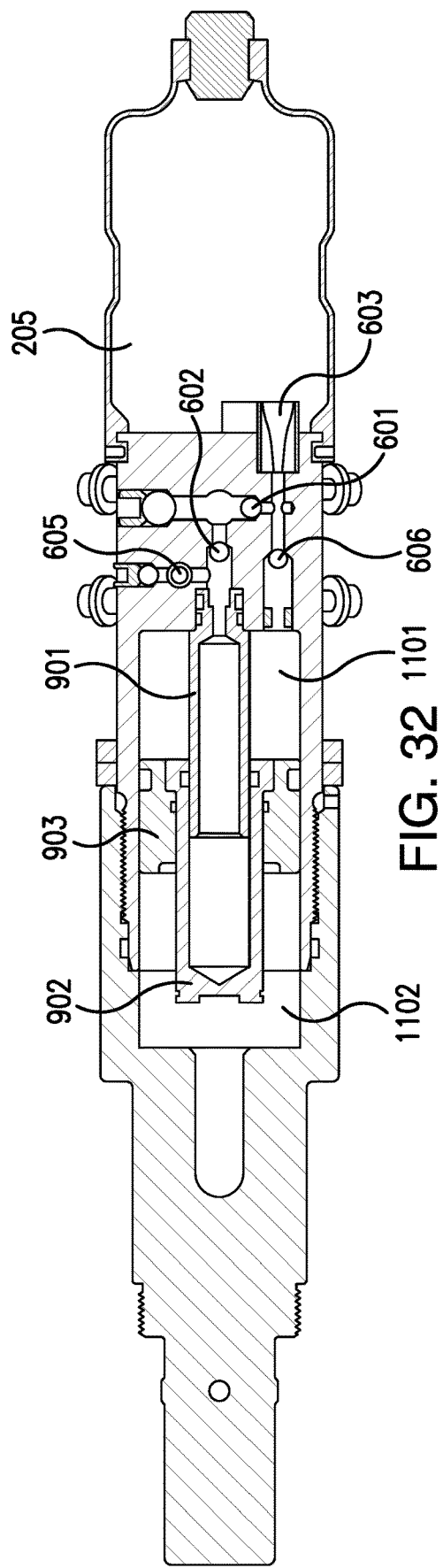
FIG. 32 is a cross sectional top view of a hydraulic system including a dual action hydraulic piston assembly contained within the handle of a long reach cable cutting tool according to the present disclosure.
Figure 33:
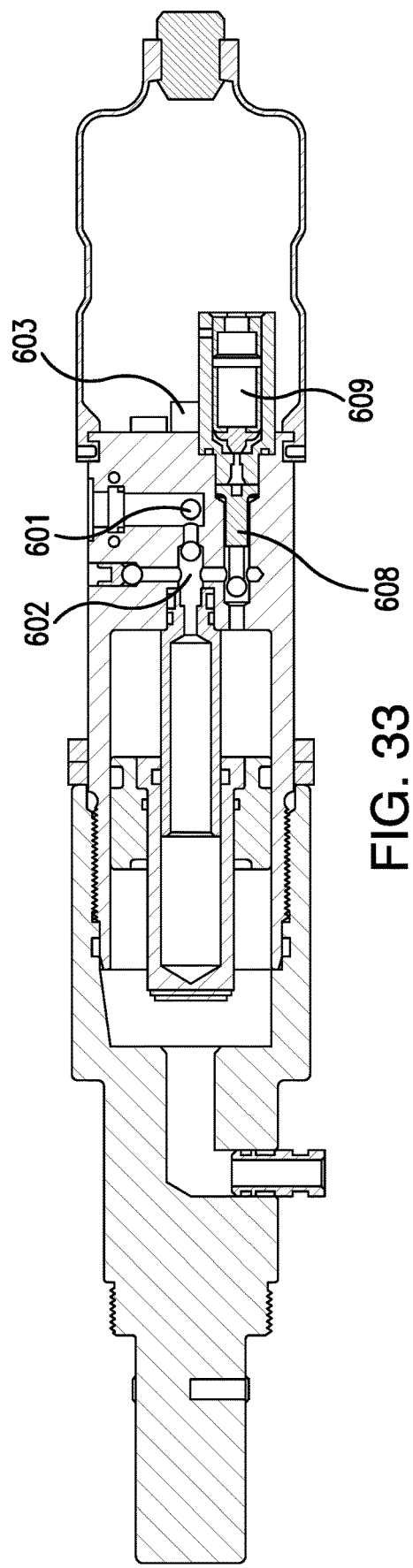
FIG. 33 is a cross sectional side view of a hydraulic system including a dual action hydraulic piston assembly contained within a handle of a long reach cable cutting tool according to the present disclosure.
Figure 34:
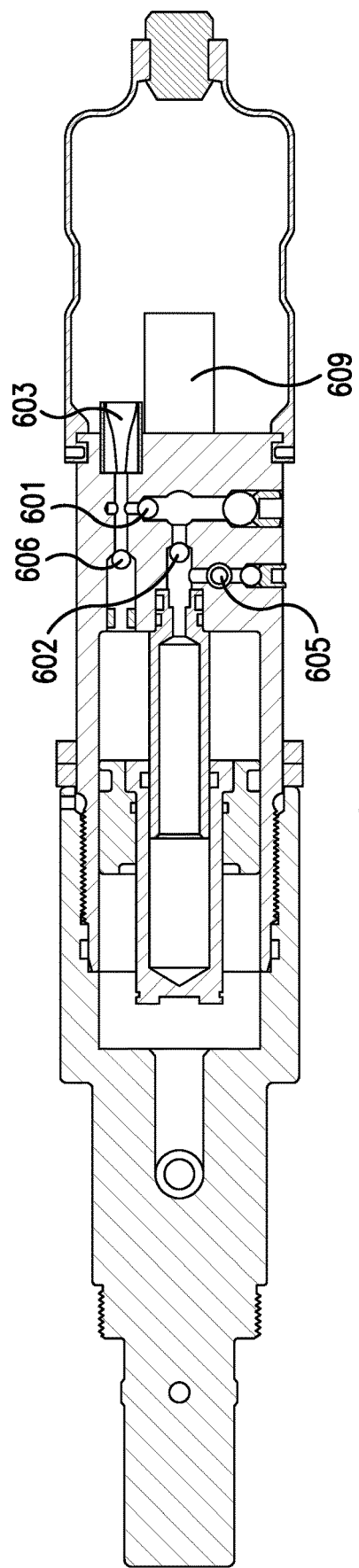
FIG. 34 is a cross sectional bottom view of a hydraulic system including a dual action hydraulic piston assembly contained within a handle of a long reach cable cutting tool according to the present disclosure.
Figure 35:
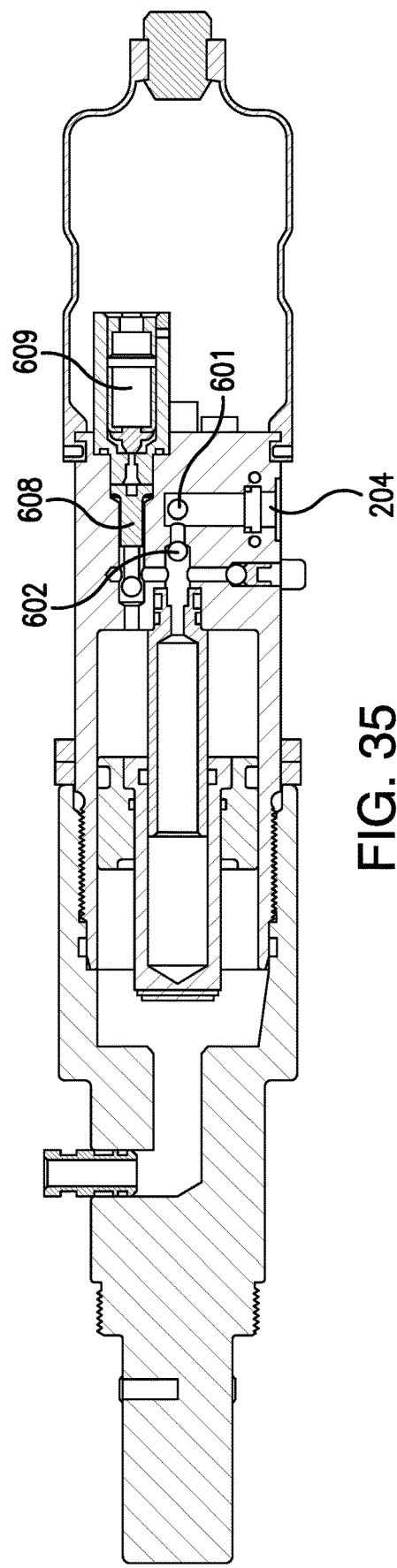
FIG. 35 is a cross sectional side view of a hydraulic system including a dual action hydraulic piston assembly contained within a handle of a long reach cable cutting tool according to the present disclosure.

The conduit 901, shown in more detail in FIGS. 17, 18 and 23-25, is cylindrical in shape and is attached to the inner lower surface of the cylinder 910 and the inlet port 904. During operation, the conduit 901 remains affixed to and stationary with the cylinder 910. As shown in FIGS. 23-25, the conduit 901 defines an inlet port 2301 at its proximal end to receive the first fluid. The distal end 2303 of the conduit 901 is open. Around its outer diameter at the proximal end, the conduit 901 defines at least one seal channel 2302/2303 to accept a seal element (not shown) to provide a fluid seal between the conduit 901 and the inner ram 902.

The inner ram 902, shown in more detail in FIGS. 17, 18, 21 and 22, is also cylindrical in shape. The inner ram 902 defines a fluid cavity therein, and is open at a lower (proximal) end and closed at an upper (distal) end. The inner ram 902 is designed to slidingly mate with the conduit 901 to allow the inner ram 902 to translate along a longitudinal axis of the dual action hydraulic piston assembly 900. The lengths of the conduit 901 and the inner ram 902 are configured such that in a fully advanced state (see FIG. 9) the open end 2303 of the conduit 901 remains within the fluid cavity of the inner ram 902.

At its distal end, the inner ram 902 can also include a recess 2102 that extends across the surface of the upper end. The recess 2102 provides a fluid path for the second fluid even when the upper end of the inner ram 902 is adjacent to the inner surface of the cylinder 910.

The inner ram 902 also includes a flange or outer ram stop 2101 defined about its proximal end. The outer ram stop 2101 engages with the outer ram 903. Around its inner diameter, the inner ram 902 defines a seal channel 2104 to accept a seal element (not shown) to provide a fluid seal between the inner ram 902 and the conduit 901.

Figure 36:
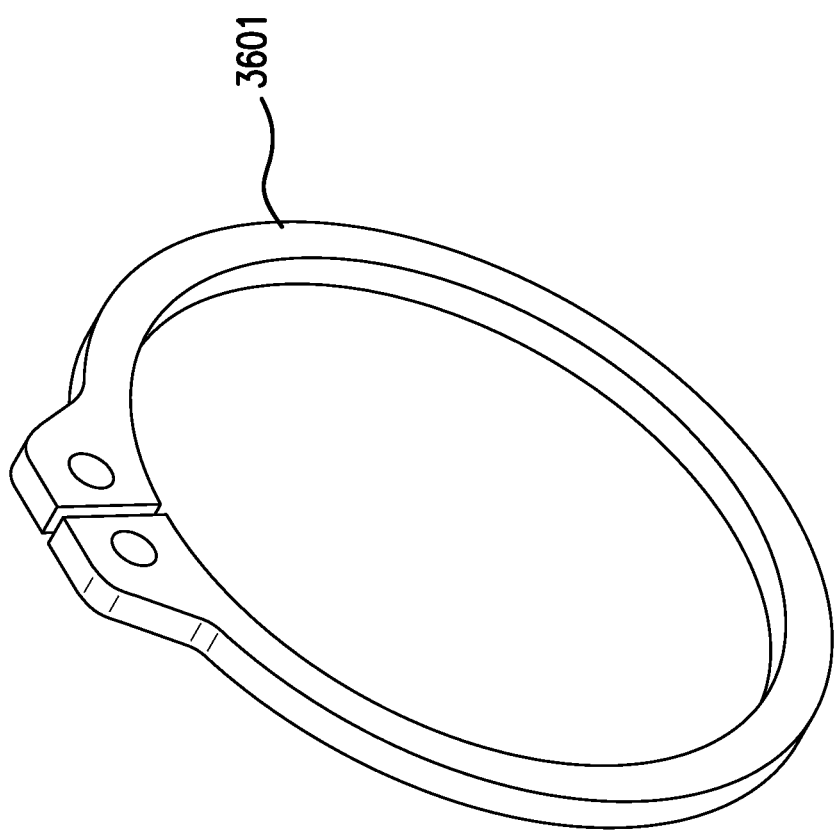
FIG. 36 is a perspective view of a retaining ring for an inner ram according to the present disclosure.
Figure 37:
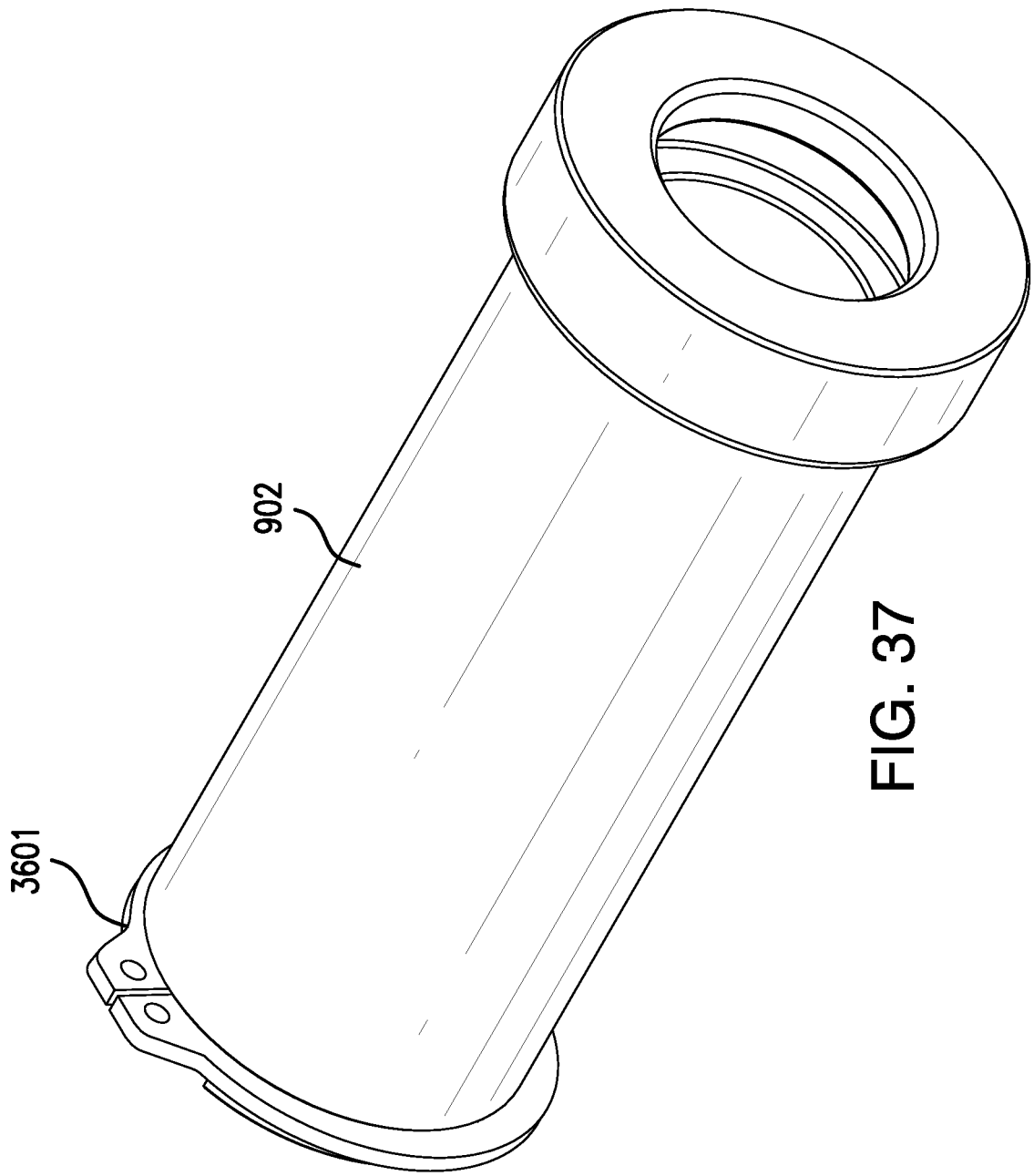
FIG. 37 is a perspective view of a retaining ring engaged on an inner ram according to the present disclosure.
Figure 38:
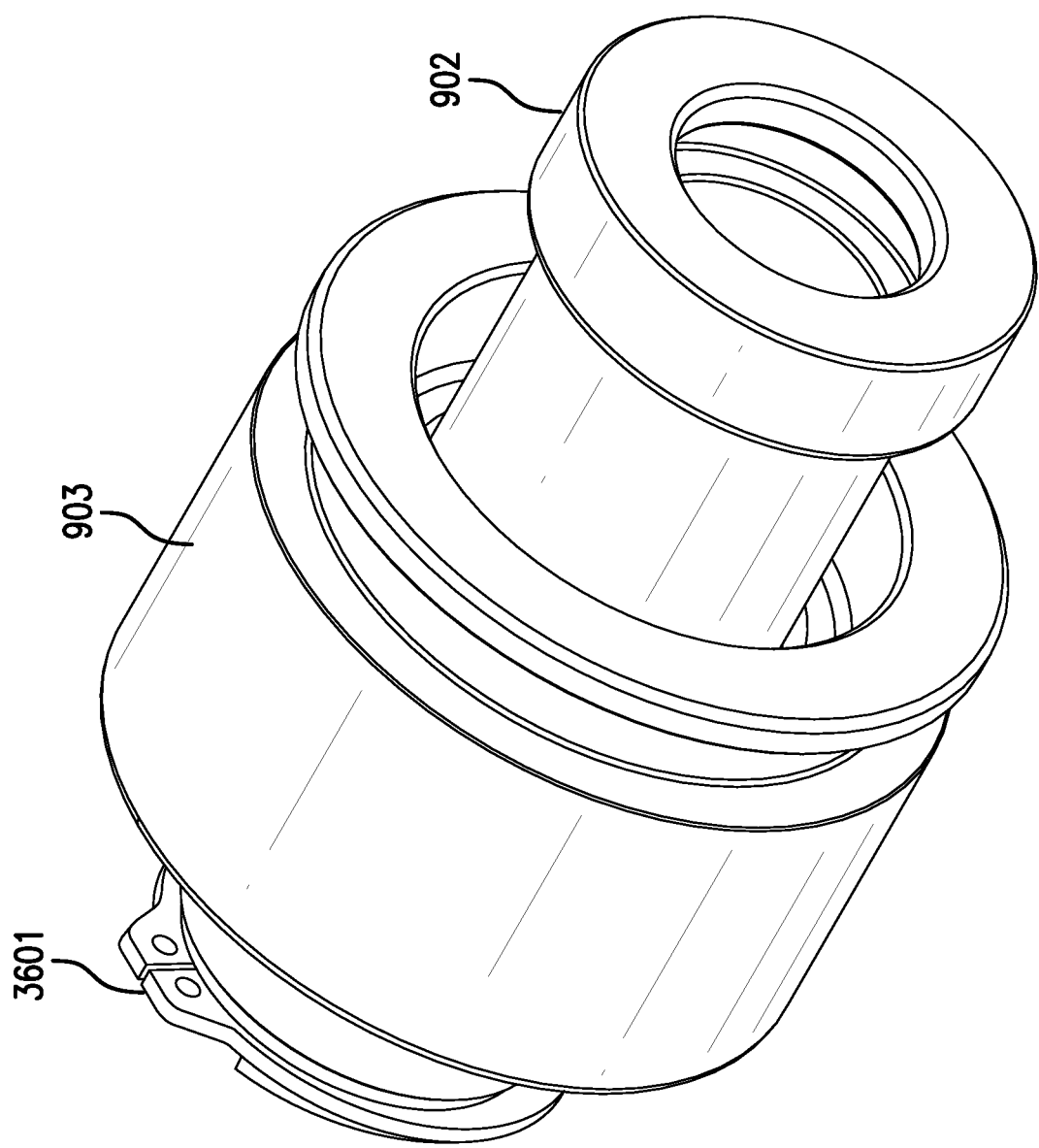
FIG. 38 is a perspective view of a retaining ring engaged on an inner ram engaged with an outer ram according to the present disclosure.
Figure 39:
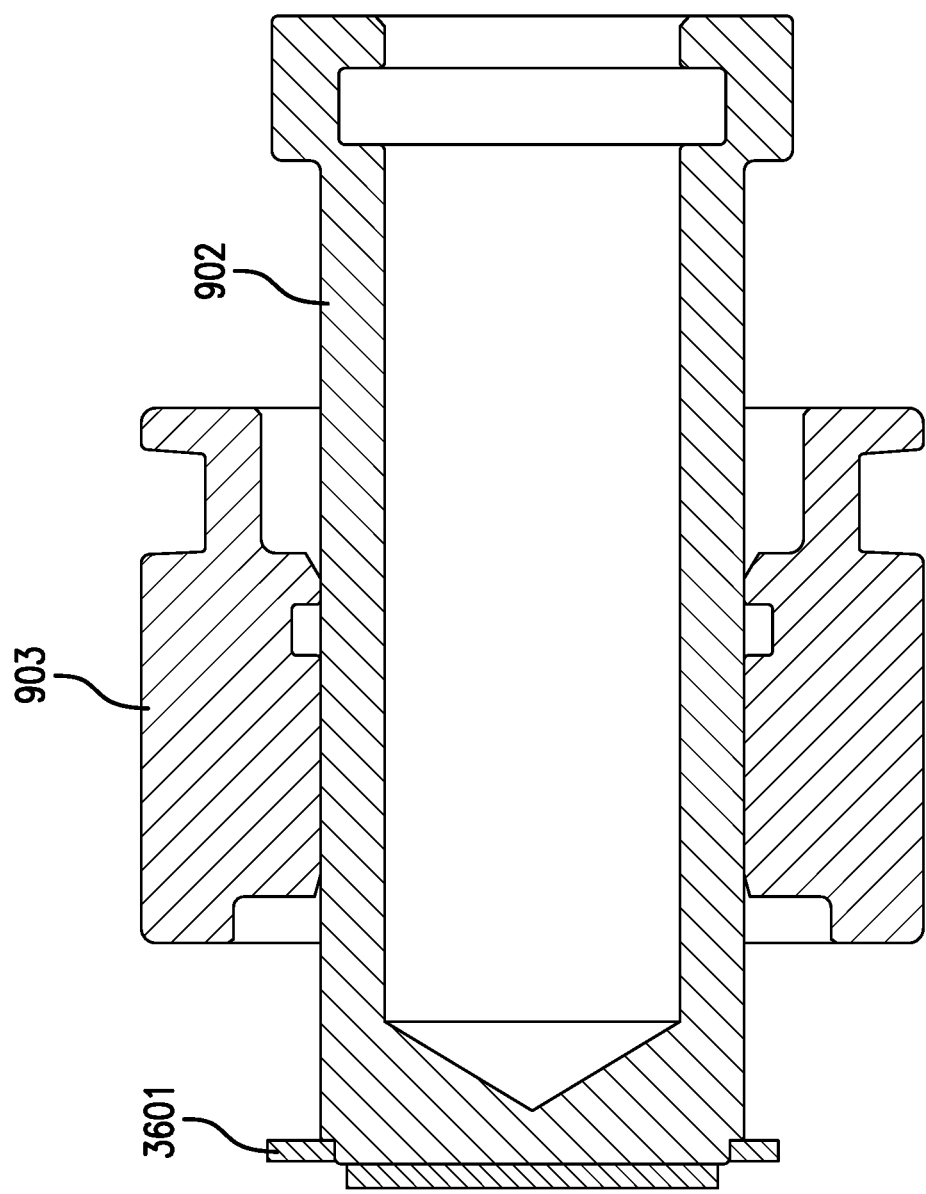
FIG. 39 is a cross sectional view of a retaining ring engaged on an inner ram engaged with an outer ram according to the present disclosure.

The inner ram 902 also defines a retaining ring channel 2103 positioned along the outer diameter at its upper end. The retaining ring channel 2103 is designed to receive a retaining ring 3601 shown in FIG. 36. As shown in FIGS. 37-39, when the outer ram 903 is assembled onto the inner ram 902, the retaining ring 3601 prevents the outer ram 903 from extending past the distal end of the inner ram 902.

The outer ram 903, shown in more detail in FIGS. 17-20, is also cylindrical in shape. The outer ram 903 is open at both its lower (proximal) end and upper (distal) end. The outer ram 903 is designed to slidingly mate with the outer surface of the inner ram 902 to allow the outer ram 903 to translate along the longitudinal axis of the dual action hydraulic piston assembly 900. The length of the outer ram 903 is less than the length of the inner ram 902.

The outer ram 903 also includes an inner recess or inner ram stop 1903 defined about its lower end on its inner surface. The inner diameter of an inner surface 1902 of the outer ram 903 below the inner ram stop 1903 is substantially equal but greater than the outer diameter of the outer ram stop 2101. The inner ram stop 1903 is designed to mate with the outer ram stop 2101. Around its inner diameter and positioned above the inner ram stop 1903, the outer ram 903 defines a seal channel 1904 to accept a seal element (not shown) to provide a fluid seal between the outer ram 903 and the inner ram 902. In addition, around its outer diameter and positioned above at or about the lower end, the outer ram 903 defines a seal channel 1901 to accept a seal element (not shown) to provide a fluid seal between the outer ram 903 and the inner surface of the cylinder 910.

When the outer ram 903 is assembled with the inner ram 902 and the retaining ring 3601 is engaged in the channel 2103, the outer ram 903 can translate along the longitudinal axis between the outer ram stop 2101 and the retaining ring 3601. See FIG. 39.

Operation of the dual action hydraulic ram assembly 900 will now be described with reference to FIGS. 10-13. The dual action hydraulic ram assembly 900 defines a first fluid chamber or space 1101 and a second fluid chamber or space 1102. See FIG. 11.

Figure 10:
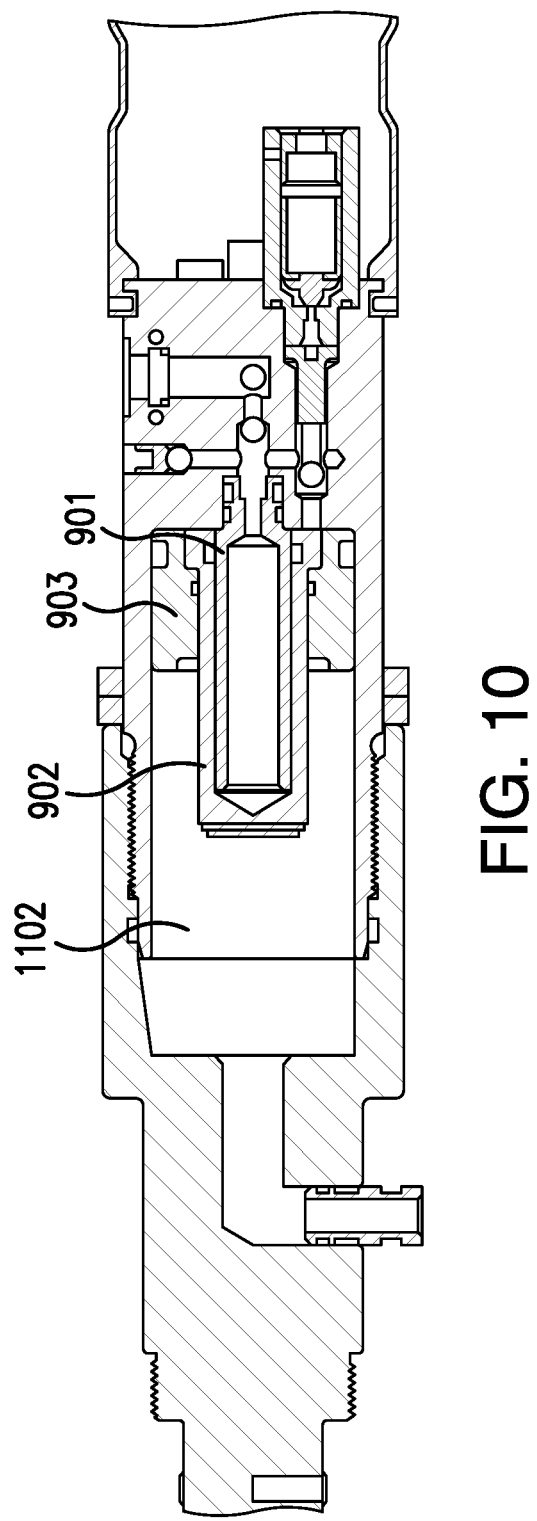
FIG. 10 is a cross-sectional view of the dual action hydraulic piston assembly in a fully retracted state according to the present disclosure.
Figure 11:
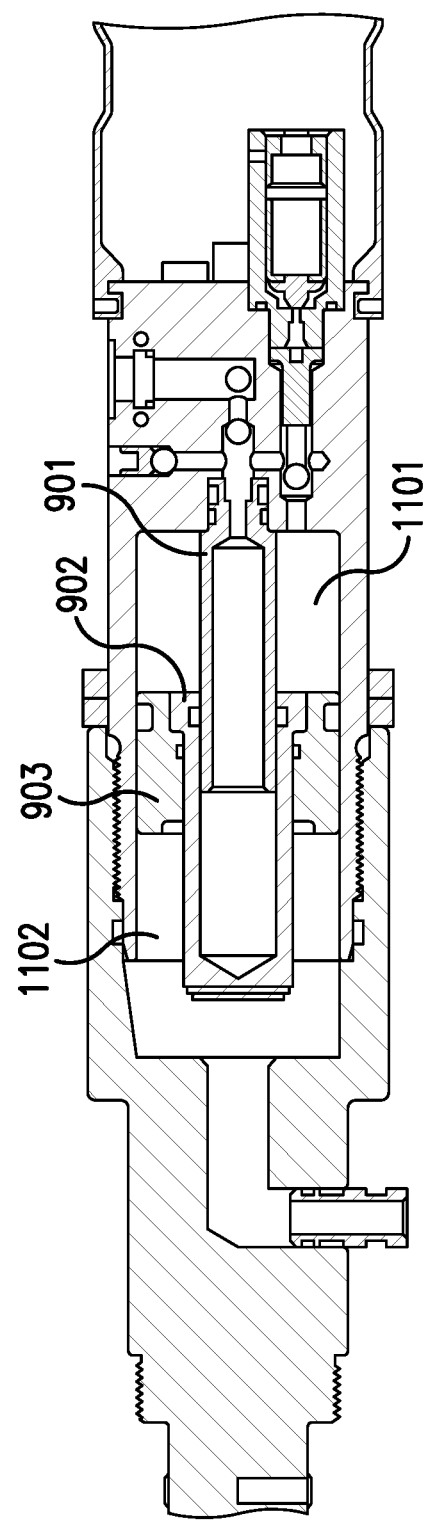
FIG. 11 is a cross-sectional view of the dual action hydraulic piston assembly in an intermediate rapid advance state according to the present disclosure.
Figure 12:
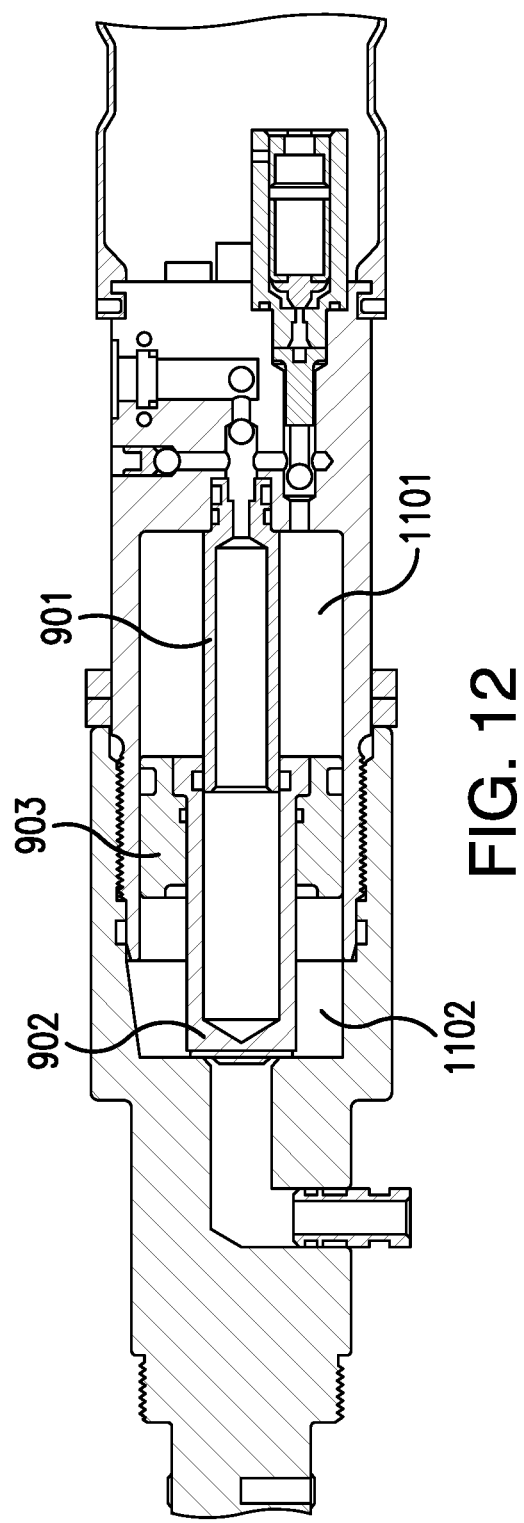
FIG. 12 is a cross-sectional view of the dual action hydraulic piston assembly in a final rapid advance state according to the present disclosure.
Figure 13:
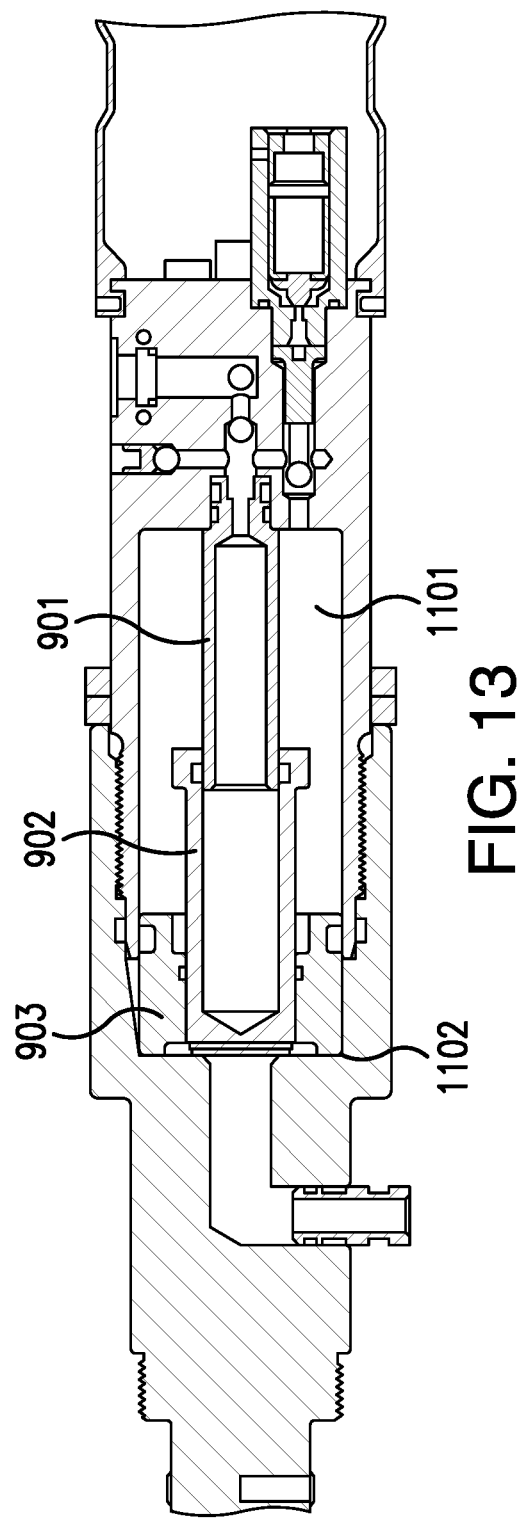
FIG. 13 is a cross-sectional view of the dual action hydraulic piston assembly in a fully advanced state according to the present disclosure.
Figure 14:
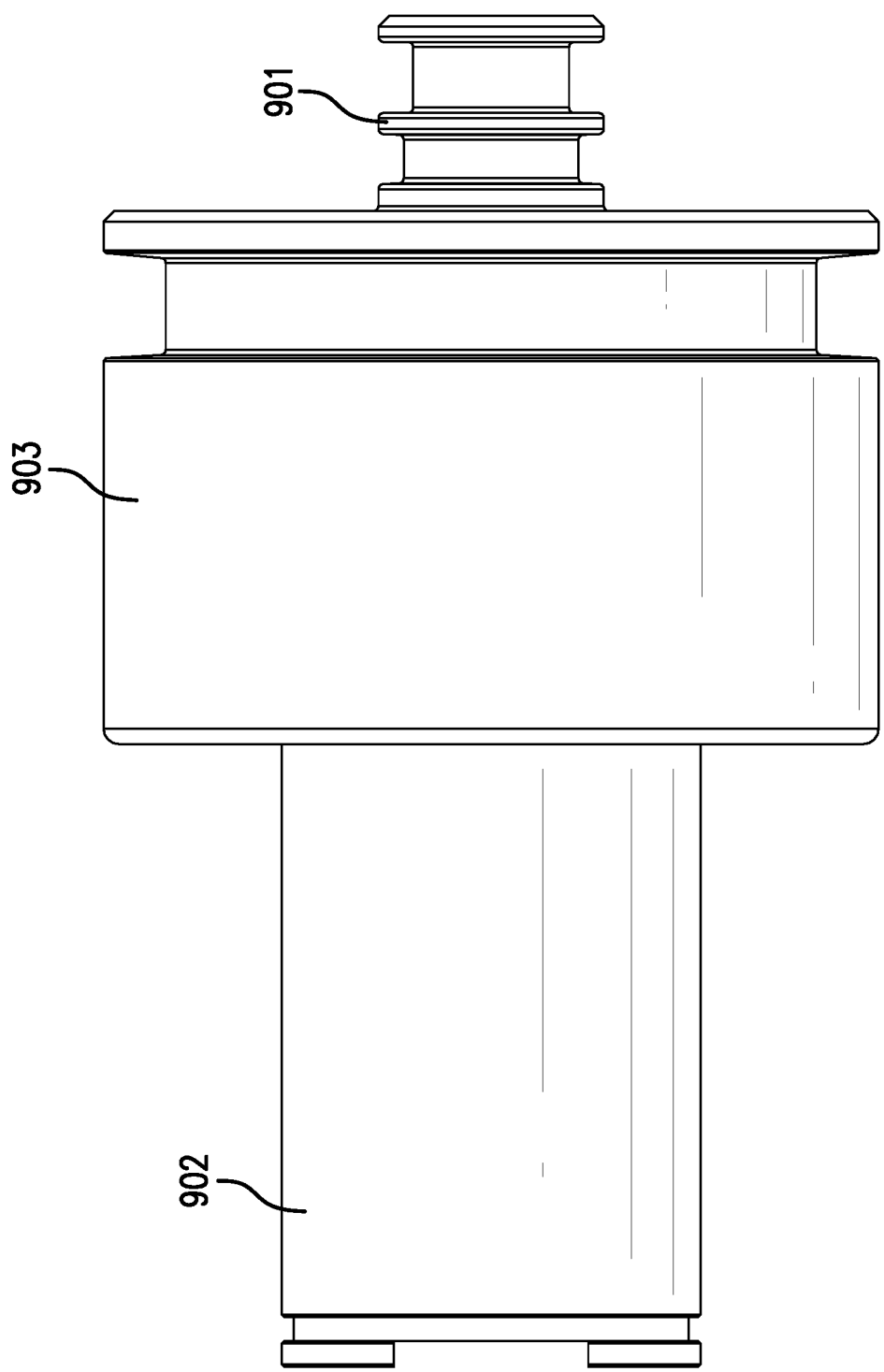
FIG. 14 is a perspective view of the dual action hydraulic piston assembly in a fully retracted state according to the present disclosure.
Figure 15:
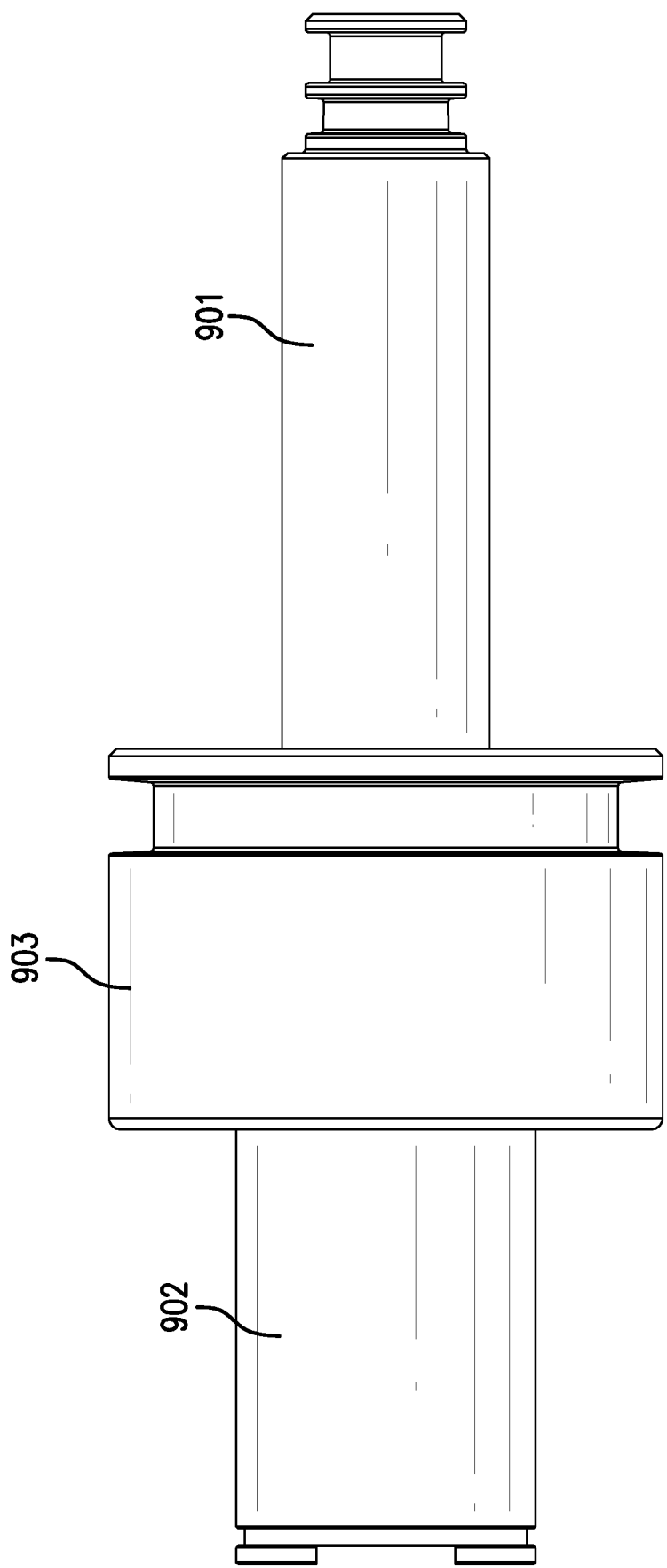
FIG. 15 is a perspective view of the dual action hydraulic piston assembly in an intermediate state according to the present disclosure.
Figure 16:
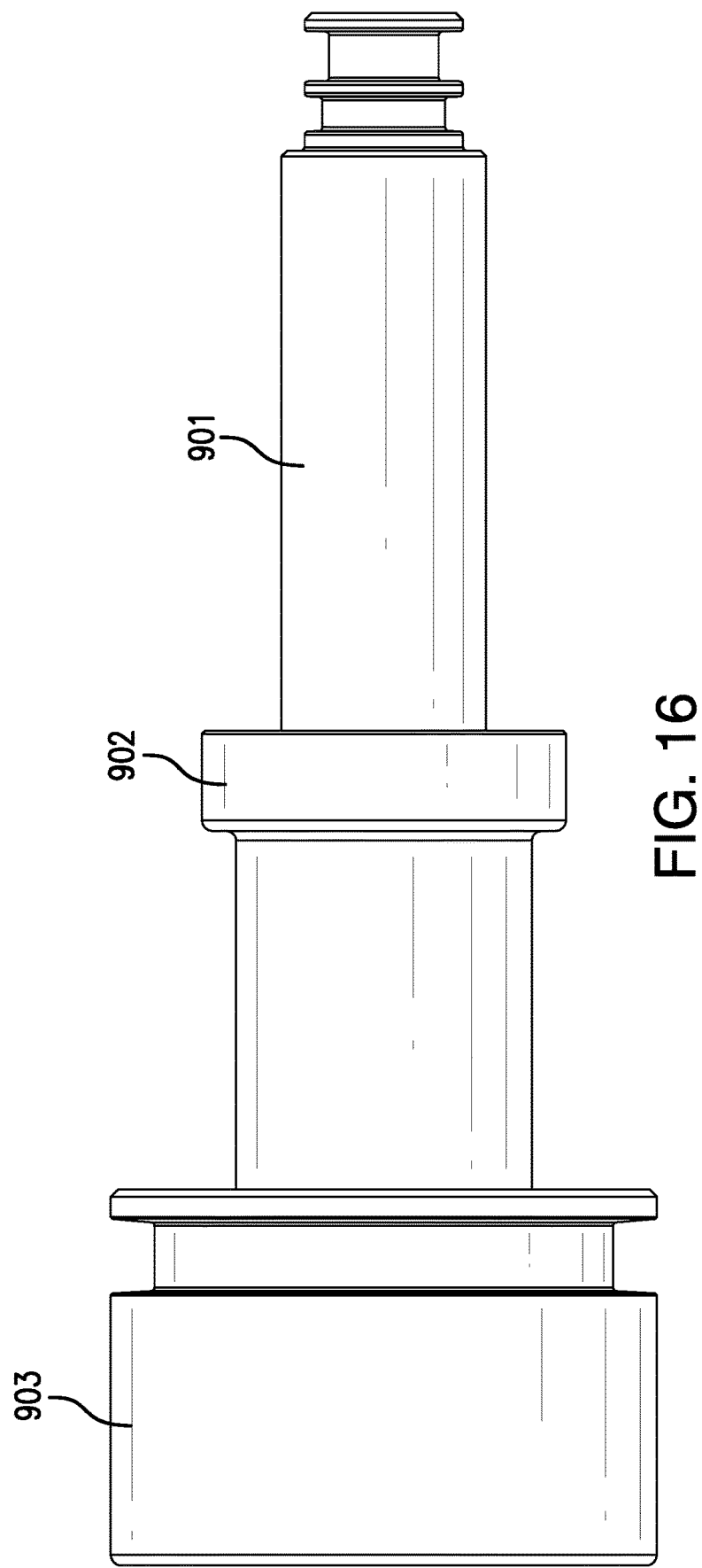
FIG. 16 is a perspective view of the dual action hydraulic piston assembly in a fully advanced state according to the present disclosure.
Figure 17:
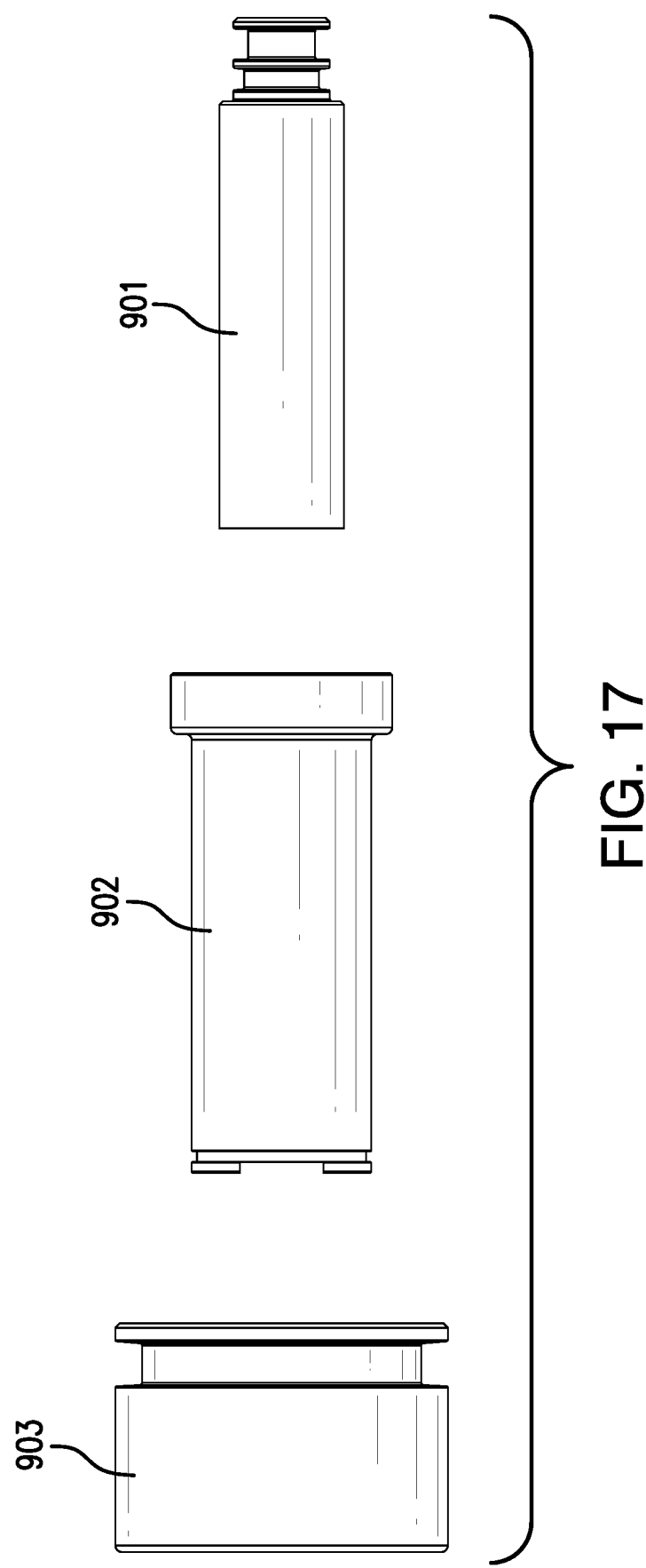
FIG. 17 is a side perspective and exploded view of the dual action hydraulic piston assembly according to the present disclosure.
Figure 18:
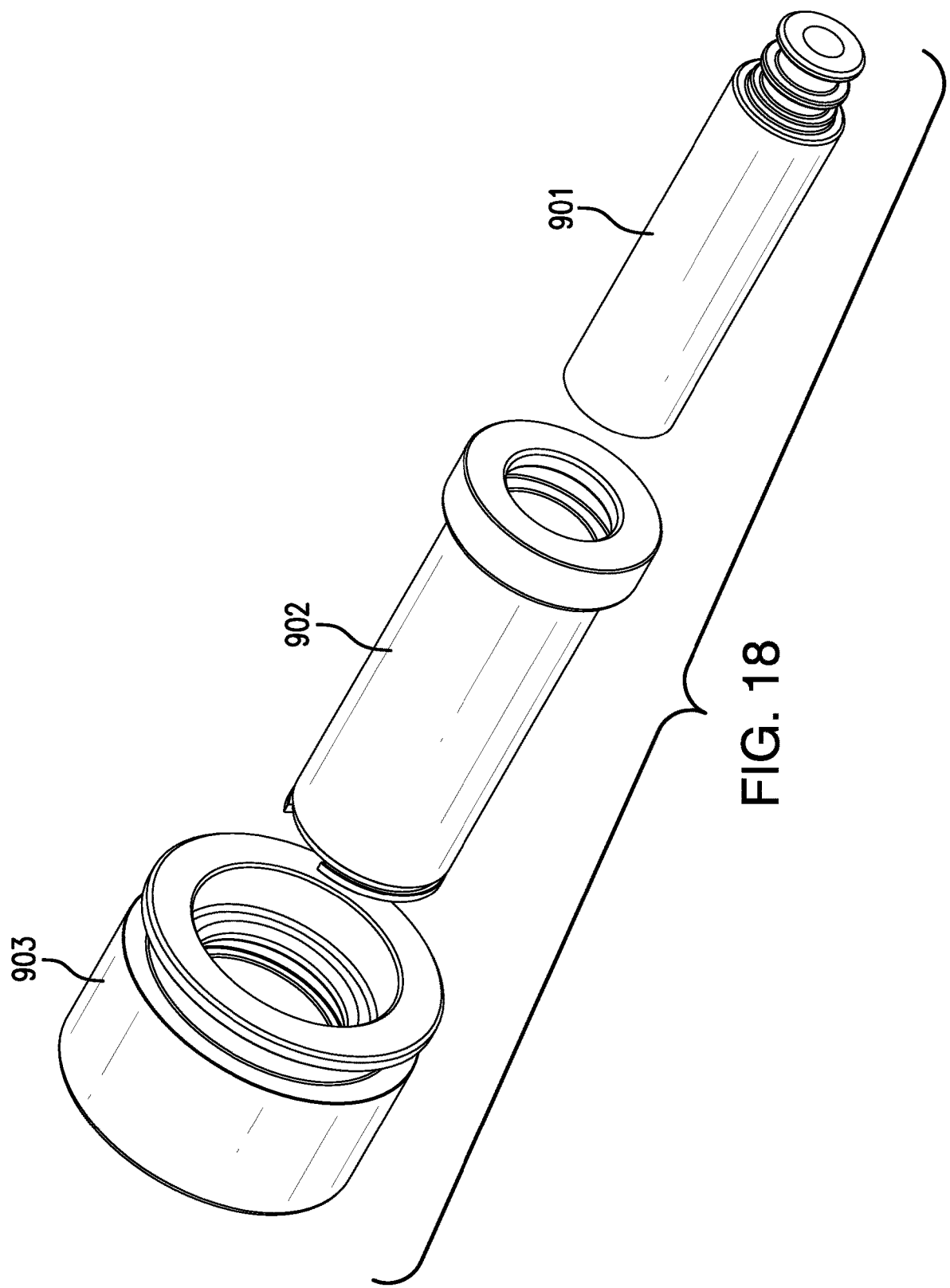
FIG. 18 is a bottom perspective and exploded view of the dual action hydraulic piston assembly according to the present disclosure.
Figure 19:
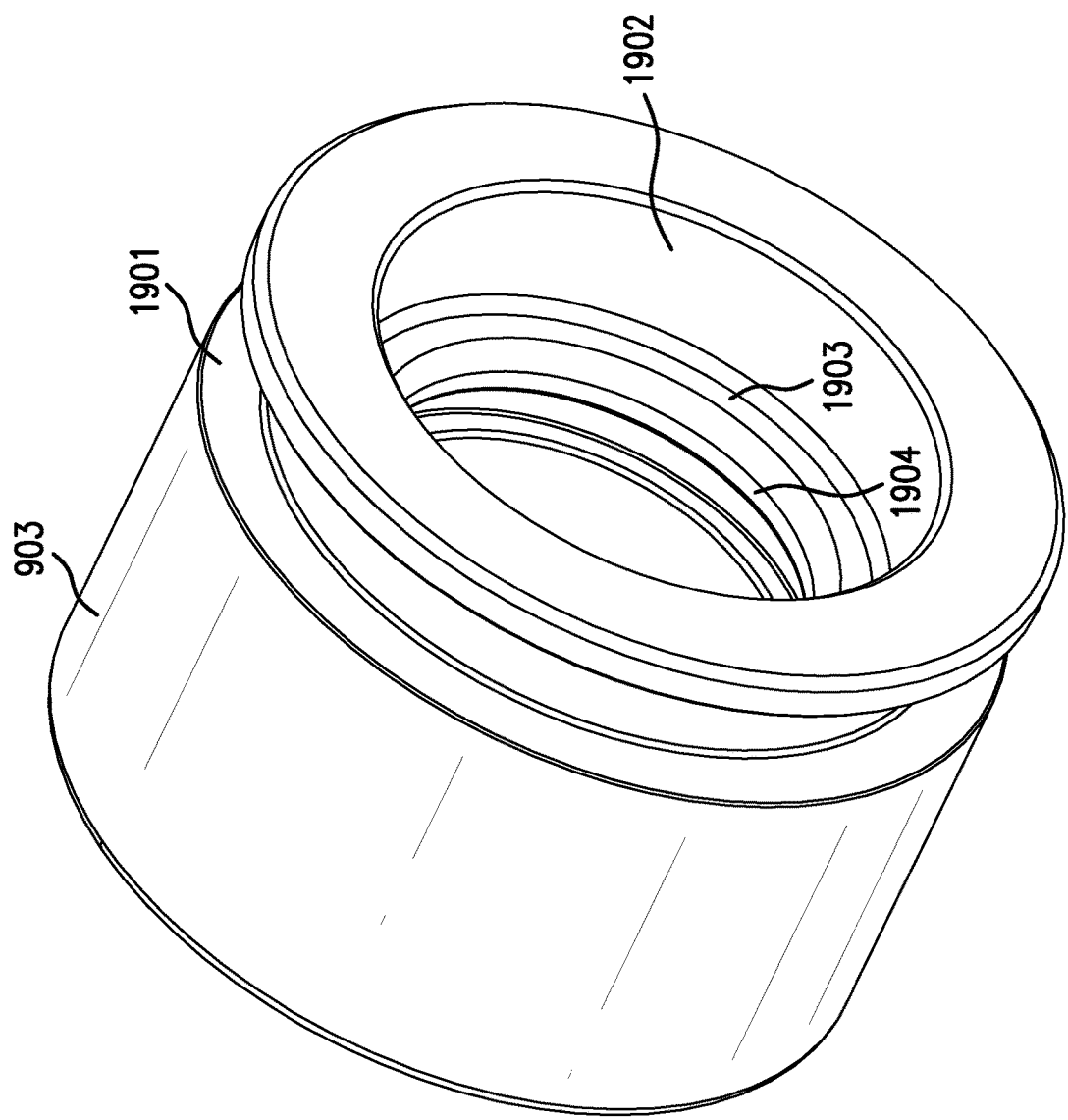
FIG. 19 is a bottom perspective view of an outer ram of the dual action hydraulic piston assembly according to the present disclosure.
Figure 20:
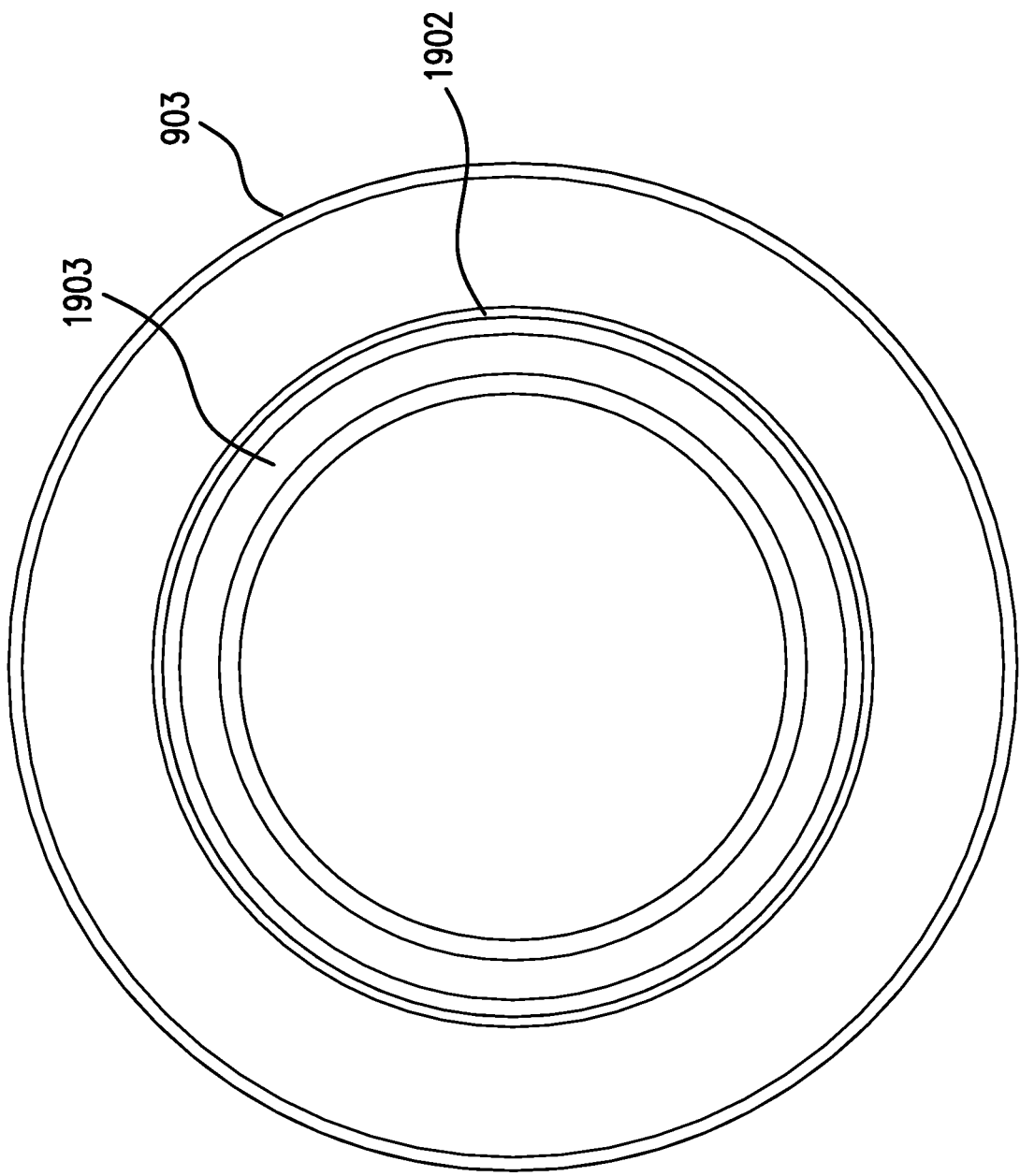
FIG. 20 is a bottom plan view of the outer ram of the dual action hydraulic piston assembly according to the present disclosure.
Figure 21:
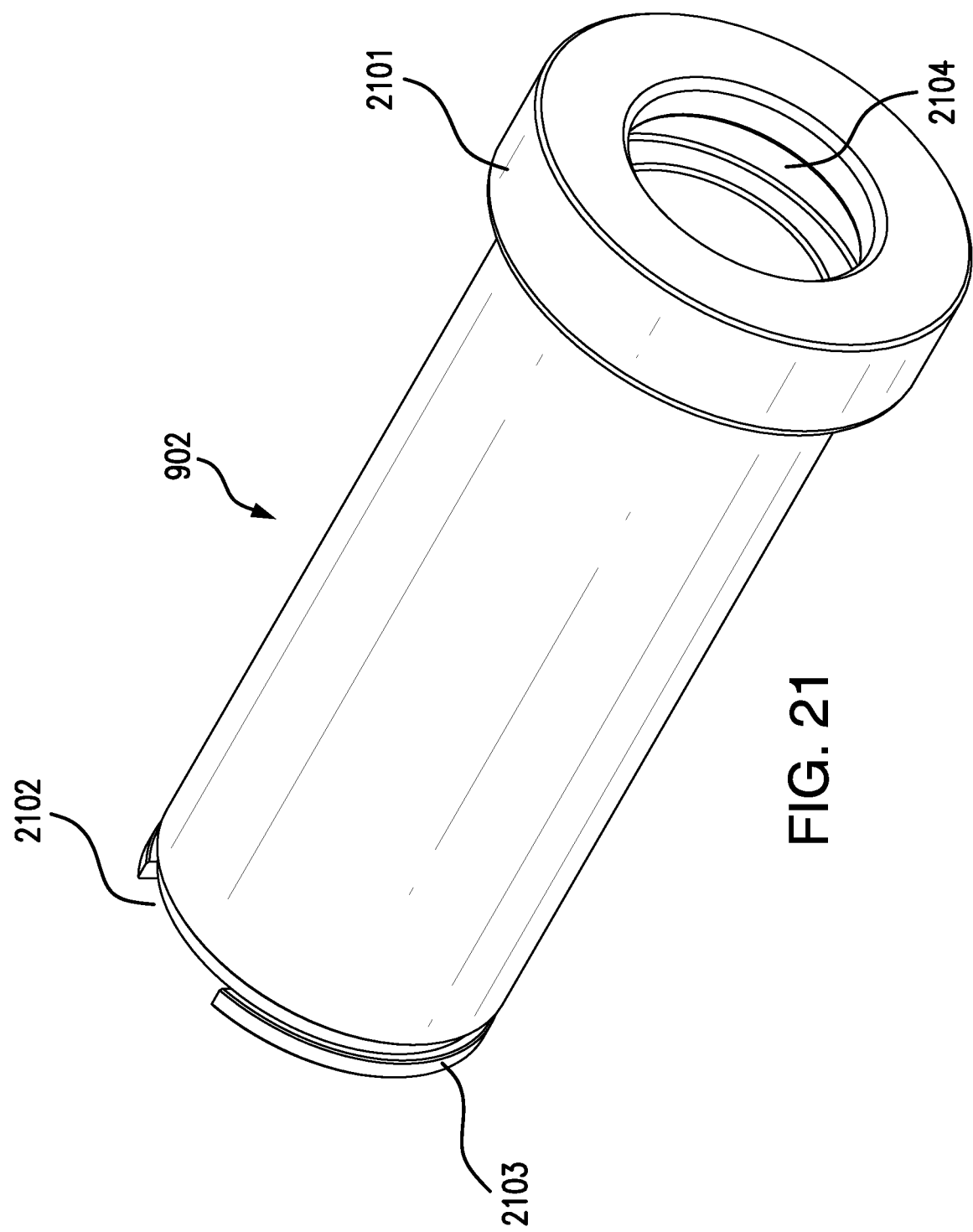
FIG. 21 is a bottom perspective view of an inner ram of the dual action hydraulic piston assembly according to the present disclosure.
Figure 22:
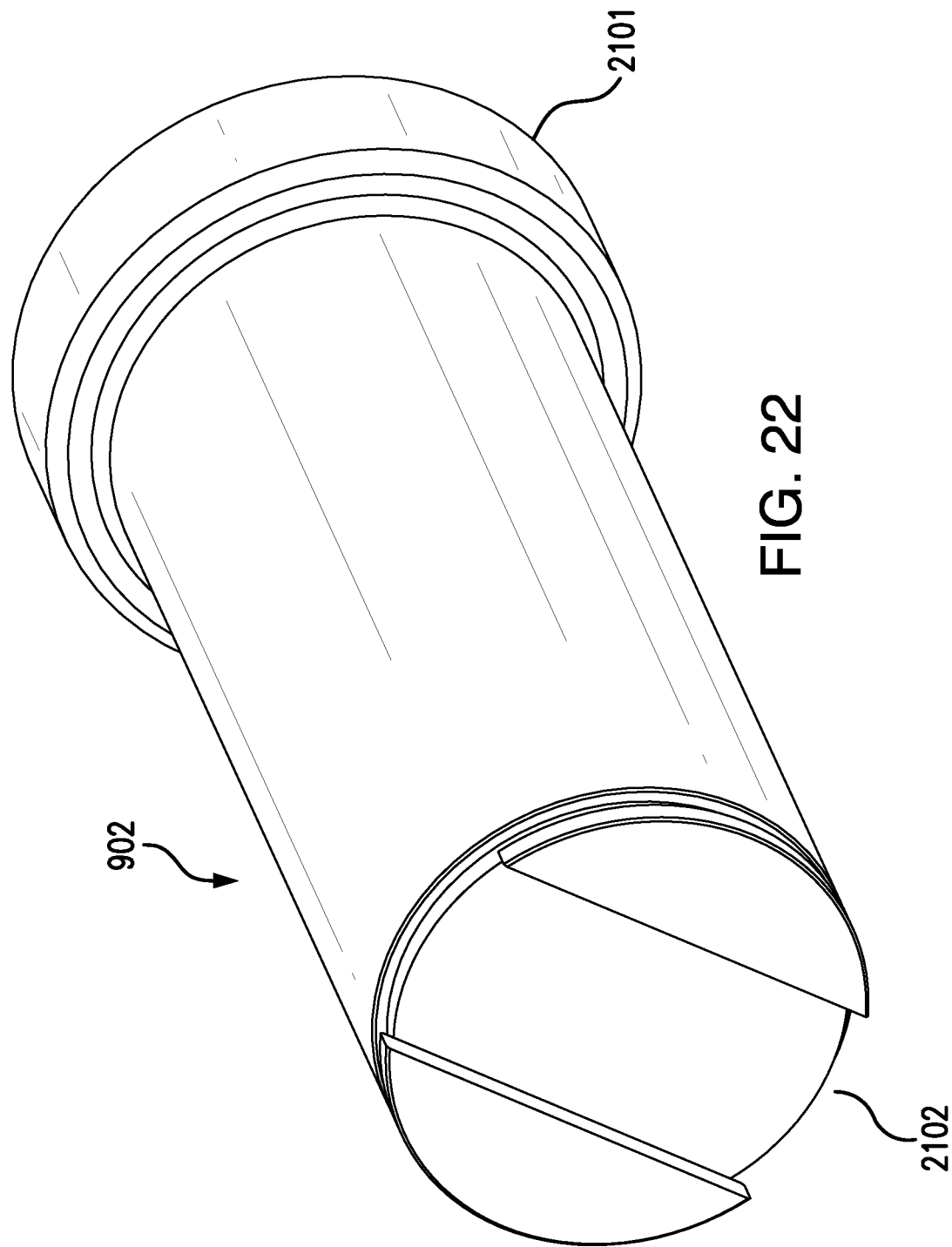
FIG. 22 is a top perspective view of the inner ram of the dual action hydraulic piston assembly according to the present disclosure.

In its fully retracted state as shown in FIG. 10, both the inner ram 902 and the outer ram 903 are positioned about the bottom of the cylinder 910. In this state, the volume of the first fluid chamber 1101 is at a minimum and the volume of the second fluid chamber 1102 is at a maximum.

Upon engaging on the trigger 104, pump 204 is engaged and begins to pump the first fluid from the reservoir 205 into the inlet port 2301 of the conduit 901. In this first stage/action of movement of the dual action hydraulic ram assembly 900, when there is low/no load on the cutting tool, the ram assembly 900 rapidly extends it's length relative to the bore of the cylinder 910.

The inner ram 902 and the outer ram 903 function both as a single unit, and independently, based on the total resistance of the circuit being driven by the hydraulic ram assembly 900. Under low/no load conditions, the first fluid is input through the center of the conduit 901, which routes the fluid flow and pressure to the inside bore of the inner ram 902. With fluid/pressure acting on this surface, the resulting forward motion of the inner ram 902 and outer ram 903 is at a rate proportionally greater than that of the motion when the system becomes subjected to high resistance/load. Both the inner ram 902 and the outer ram 903 move simultaneously as the outer ram stop 2101 and the inner ram stop 1903 are in full engagement. See, FIG. 11.

Under high load conditions, a calibrated check (bypass 607) internal to the primary system changes the first fluid path to produce flow/pressure to the outer ram 903, which subsequently reduces the rate of forward motion of the secondary system, while increasing the pressure output to the secondary system by a factor relative to the area of the cylinder 910. See, FIG. 13. Subsequent motion, volume transfer, and system pressure of the secondary circuit is relative to the flow input for each piston, piston diameter, and input pressures/secondary system resistance. The same action occurs, but in the opposing direction, when the system pressure is relieved, either through a calibrated pressure check 609 or a manual drain 604 actuation. See, FIG. 10.

With the system described above, the dual action hydraulic ram assembly 900 is adapted to advance at a speed of about 0.09 ft/sec (1.08 in/sec) in its first operating mode and at a speed of about 0.018 ft/sec (0.215 in/sec) in its second operating mode. In some embodiments, the dual action hydraulic ram assembly 900 advances at a speed of at least 1 inch per second in the first operating mode and a speed of at least 0.2 inches per second in the second operating mode. In some embodiments, the speed of the dual action hydraulic ram assembly 900 in the first operating mode is at least three times faster (e.g., or at least four times faster, such as about five times faster) than the speed of the dual action hydraulic ram assembly 900 in the second operating mode. A prior art 18 V battery operated hydraulic crimping tool, on the other hand, was limited to a ram advancement speed of about 0.0127 ft/sec (0.1521 in/sec). Thus, the speed of the dual action hydraulic ram assembly 900 is substantially faster than the speed of the ram in a conventional prior art 18 V battery operated hydraulic tool. The speed of the dual action hydraulic ram assembly 900 is also faster than the speed of the ram in a conventional prior art 14.4 V battery operated hydraulic tool. The system according the present disclosure also provides superior cutting force such as being able to cut electrical cables up to 954 ACSR and greater.

Connectors 107a/107b will now be described with respect to FIGS. 26-31. Although the long reach cable cutting tool is described herein as including the quick-release connectors described herein, other connector assemblies are contemplated, for example, threaded system, adhesive, or locking pin system (see, e.g., Pub. No. US 2015/0283693). In addition, although a connector will be described herein with respect to only the connection between the pole and the handle, the connector is equally applicable to the connection between the pole and the tool head. The connector described herein can be utilized to connect a pole to any other object that is affixed with the collar as described herein.

Connector 2700 includes a collar 2705, a collet 2704, and a retaining nut 2703. The pole 102 is adapted at its proximate end to connect with the collar 2705. The pole 102 includes a plurality of arcuate members 2701 extending from the proximate end. The arcuate members 2701 can be manufactured by making cuts in a longitudinal direction along the pole 102. Each arcuate member 2701 defines a channel 2702 extending across an inner surface of its respective arcuate member 2701. The channel 2702 is positioned a distance from the proximate end of the pole 102.

The collar 2705 is attachable at a proximate end to the handle 101. As shown, the collar 2705 includes a threaded female connection to connect with the handle 101, but other connections are contemplated. The collar 2705 includes a pole connecting member 2706 extending from a distal end of the collar 2705. The pole connecting member 2706 is sized to fit within the pole 102 and is substantially the same diameter as an inner diameter of the pole 102. The pole connecting member 2706 includes a ridge 2707 extending circumferentially around the pole connecting member 2706. A connecting feature shown as threads is positioned at the proximate end of the pole connecting member 2706. The ridge 2707 is positioned a distance from the threads, the distance being approximately equal to the distance the channels 2702 are positioned from the proximate end of the pole 102.

The collet 2704 is designed to slidably mate with the outer surface of the pole 102. The retaining nut 2703 includes threads to mate with the threads on the collar 2705. A distal end of the retaining nut 2703 has a diameter substantially equal to but less than the outer diameter of the pole 102.

The assembly of the connector 2700 will be described with respect to FIGS. 28-31. The pole 102 is positioned onto the pole connecting member 2706 to the point where the channel 2702 mates with the ridge 2706. See FIG. 29. When the pole 102 is positioned onto the pole connecting member 2706, the ridge 2707 causes the arcuate members 2701 to slightly splay open. The collet 2704 is positioned on the pole 102 and over the arcuate members 2701 at or about the channel 2702 and the ridge 2707. As the inner diameter of the collet 2707 is substantially equal to the outer diameter of the pole 102, the collet 2704 fits tightly over the splayed arcuate members 2701. The retaining nut 2703 is positioned over the pole 102 and collet 2704 and mated with the threads of the collar 2705. See FIG. 31. The retaining nut 2703 is designed to slightly compress onto the collet 2704, which in turn compresses the arcuate members 2701 onto the ridge 2707 and pole connecting member 2706, thus forming a tight connection between the pole 102 and the collar 2705.

An alternative collet 4001 and retaining nut 4201 are illustrated in FIGS. 40-45. The collet 4001 and retaining nut 4201 can be used with pole 102 and collar 2705 as previously described.

Figure 40:
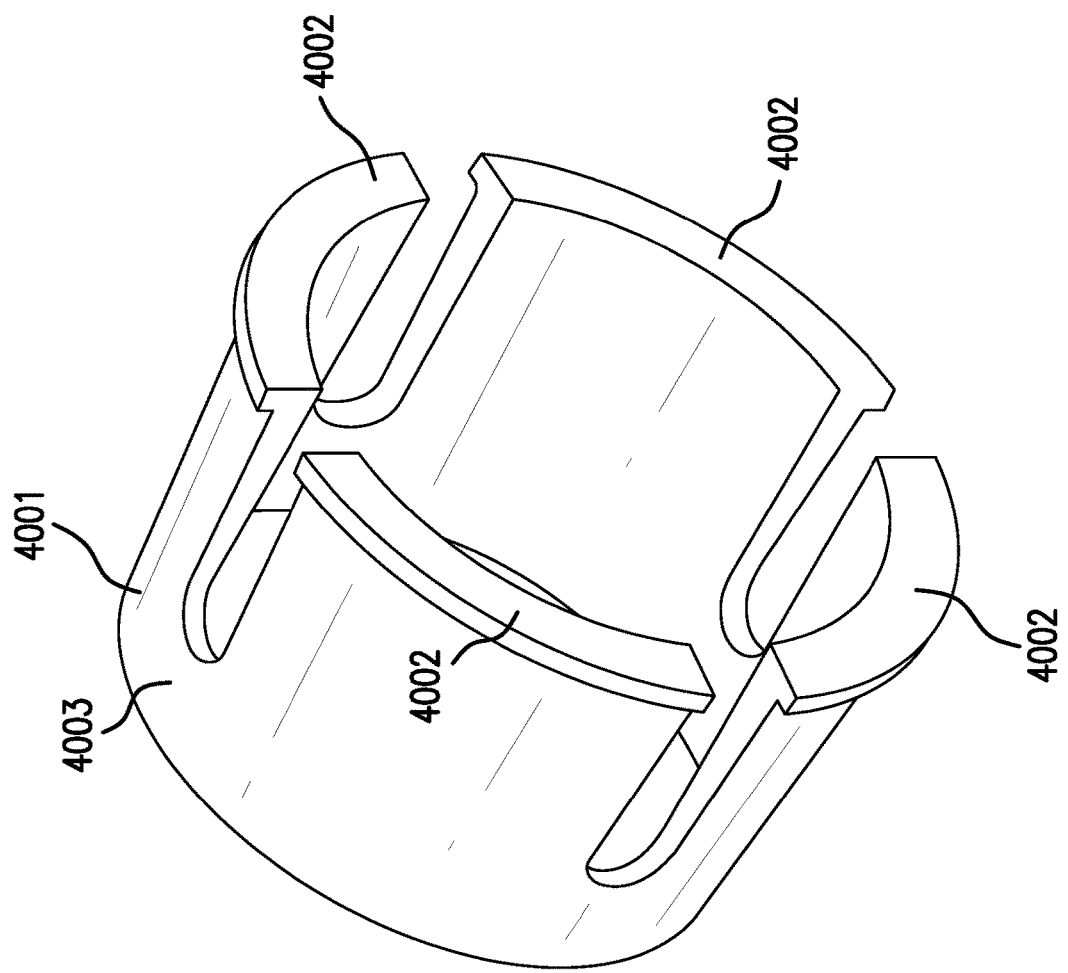
FIG. 40 is a side perspective view of collet for a coupling for the long reach cable cutting tool according to the present disclosure.
Figure 41:
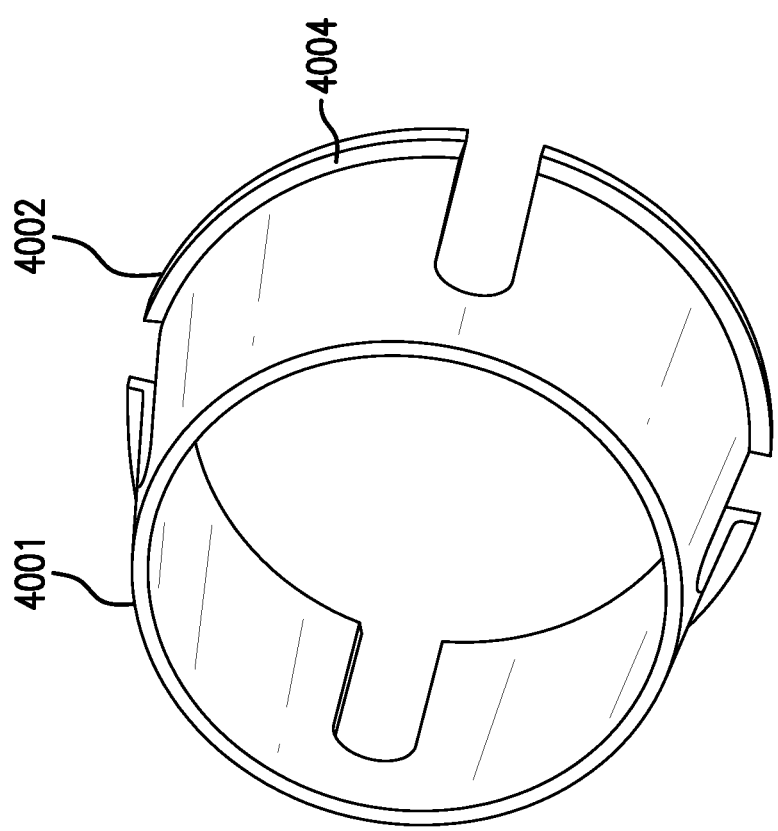
FIG. 41 is a side perspective view of a collet for a coupling for the long reach cable cutting tool according to the present disclosure.
Figure 42:
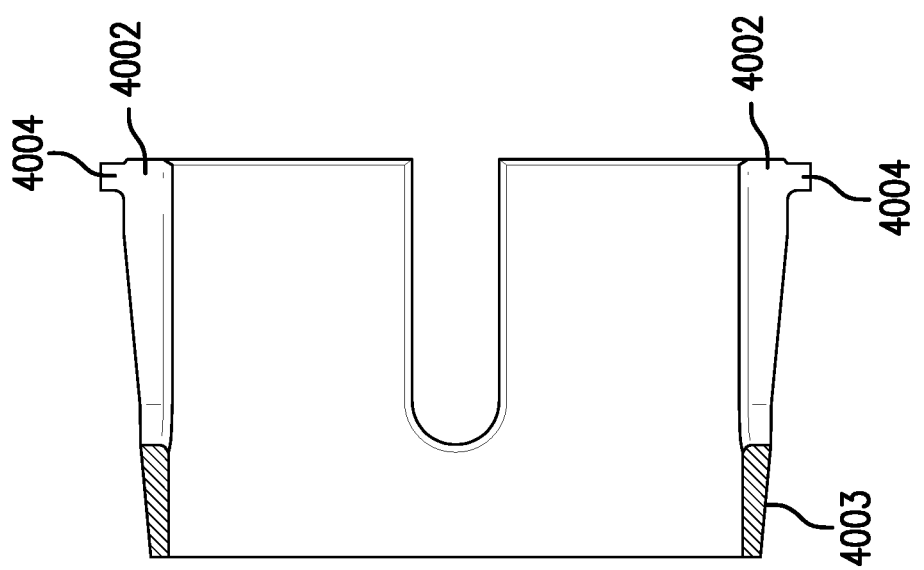
FIG. 42 is a cross sectional view of a collet for a coupling for the long reach cable cutting tool according to the present disclosure.

The collet 4001 is shown in FIGS. 40-42. Collet 4001 includes at least two extensions 4002 that are connected at base ring 4003. The inside of collet 4001 is configured to slidably mate with the pole 102. The outer surface of collet 4001 is tapered in order to provide compression when mated with the retaining nut 4201. A flange 4004 is positioned on upper edge of the extensions 4002 for mating with a channel 4401 defined inside of the retaining nut 4201.

Figure 43:
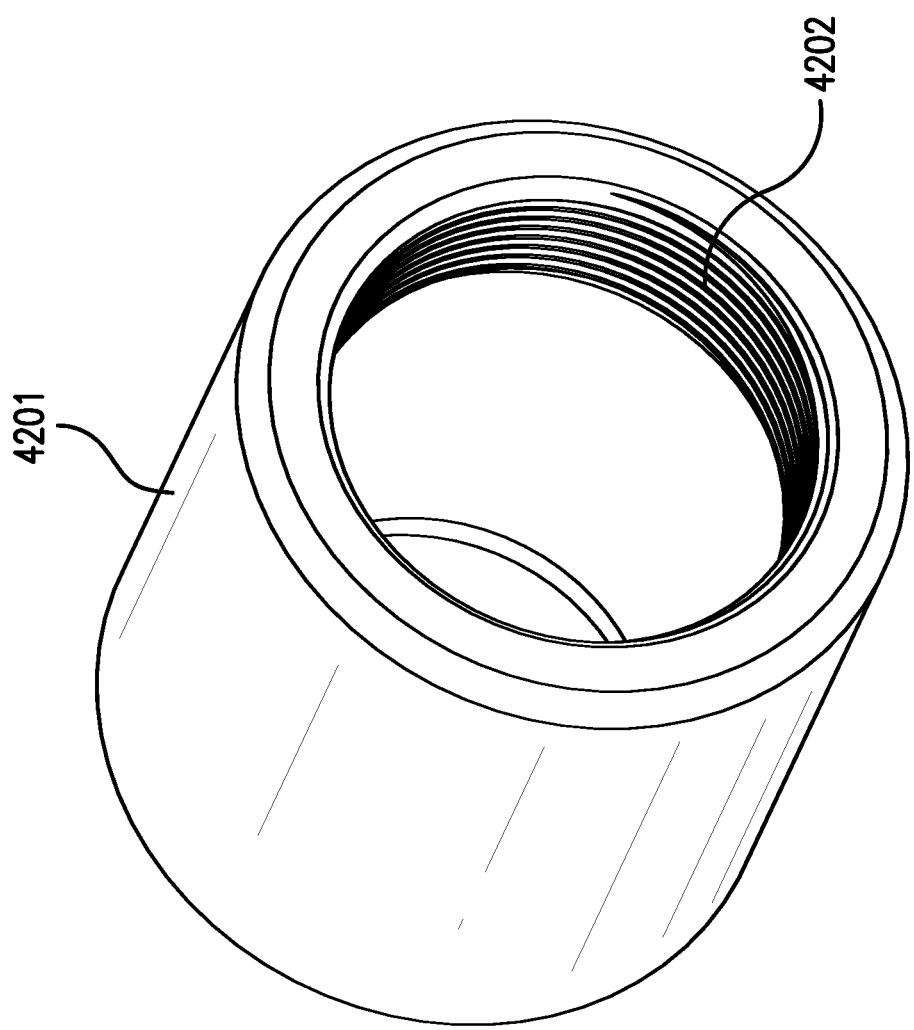
FIG. 43 is a side perspective view of a retaining nut for a coupling for the long reach cable cutting tool according to the present disclosure.
Figure 44:
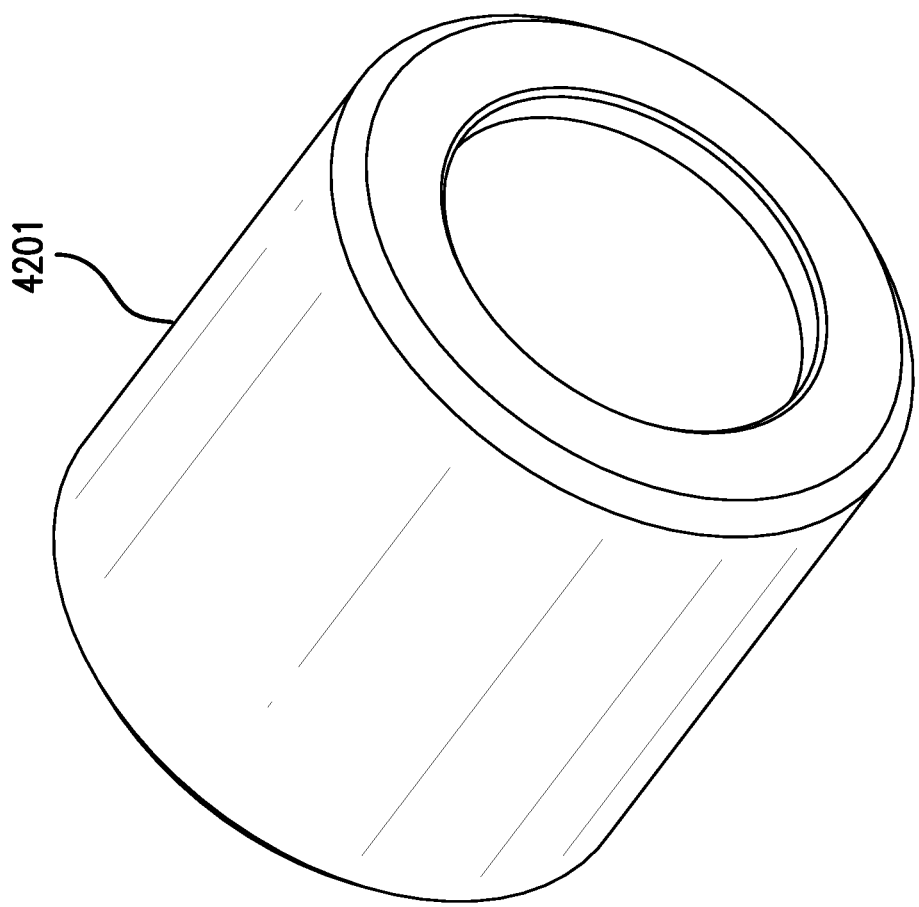
FIG. 44 is a side perspective view of a retaining nut for a coupling for the long reach cable cutting tool according to the present disclosure.
Figure 45:
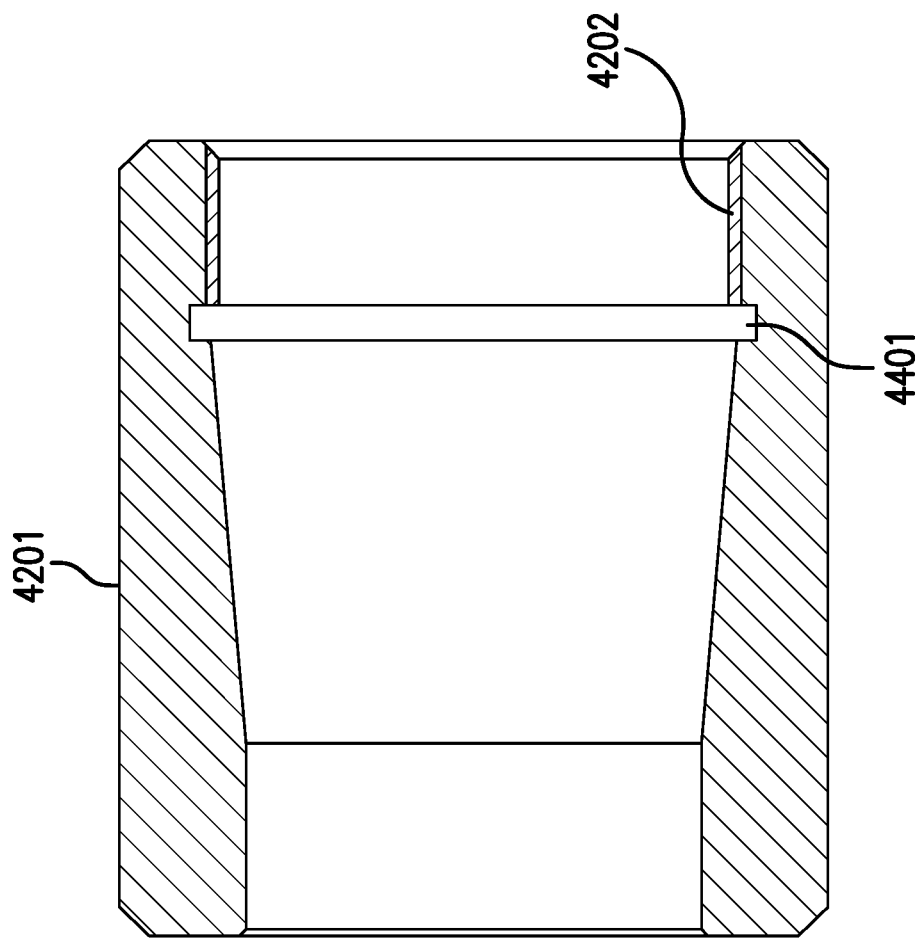
FIG. 45 is a cross sectional view of a retaining nut for a coupling for the long reach cable cutting tool according to the present disclosure.

The retaining nut 4201 is shown in FIGS. 43-45. The retaining nut 4201 includes threads 4202 on its leading edge to mate with threads on the collar 2705. The retaining nut 4201 defines the channel 4401 on the inside diameter of the retaining nut 4201 and set back from the threaded surface 4202. When assembled, the flange 4004 on the collet 4001 mates with the channel 4401 and provides a removable connection between the two components. This also permits the retaining nut 4201 to rotate about the collet 4001 even when connected. The inner surface of the retaining nut 4201 from the channel 4401 to the distal end is tapered to mate with the tapered surface of the collet 4001 and add to the compression force onto the pole 102 when assembled.

FIGS. 46-60G illustrate another embodiment of the long reach cable cutter according to the present disclosure. This embodiment is described only to the extent it differs from the embodiment described above.

Figure 46:
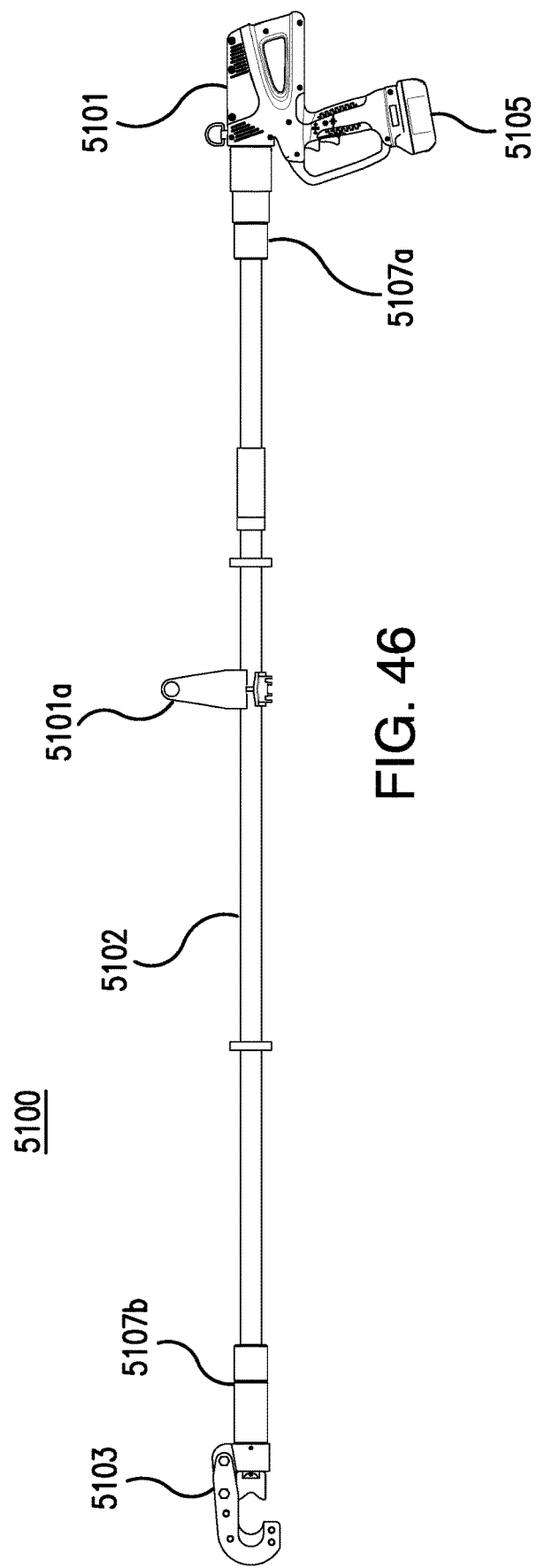
FIG. 46 is a side view of a long reach cable cutting tool according to the present disclosure.

As shown in FIG. 46, the long reach cable cutter tool 5100 includes a handle 5101, a pole 5102, and a tool head 5103. The present embodiment includes a second handle 5101a on the pole 5102. The second handle 5101a clamps around the pole 5102 at an adjustable and/or user selected distance from the handle 5101, e.g., using a clamp having two fasteners. The tool head 5103 is releasably connected to the pole 5102 via connector 5107b.

Figure 47:
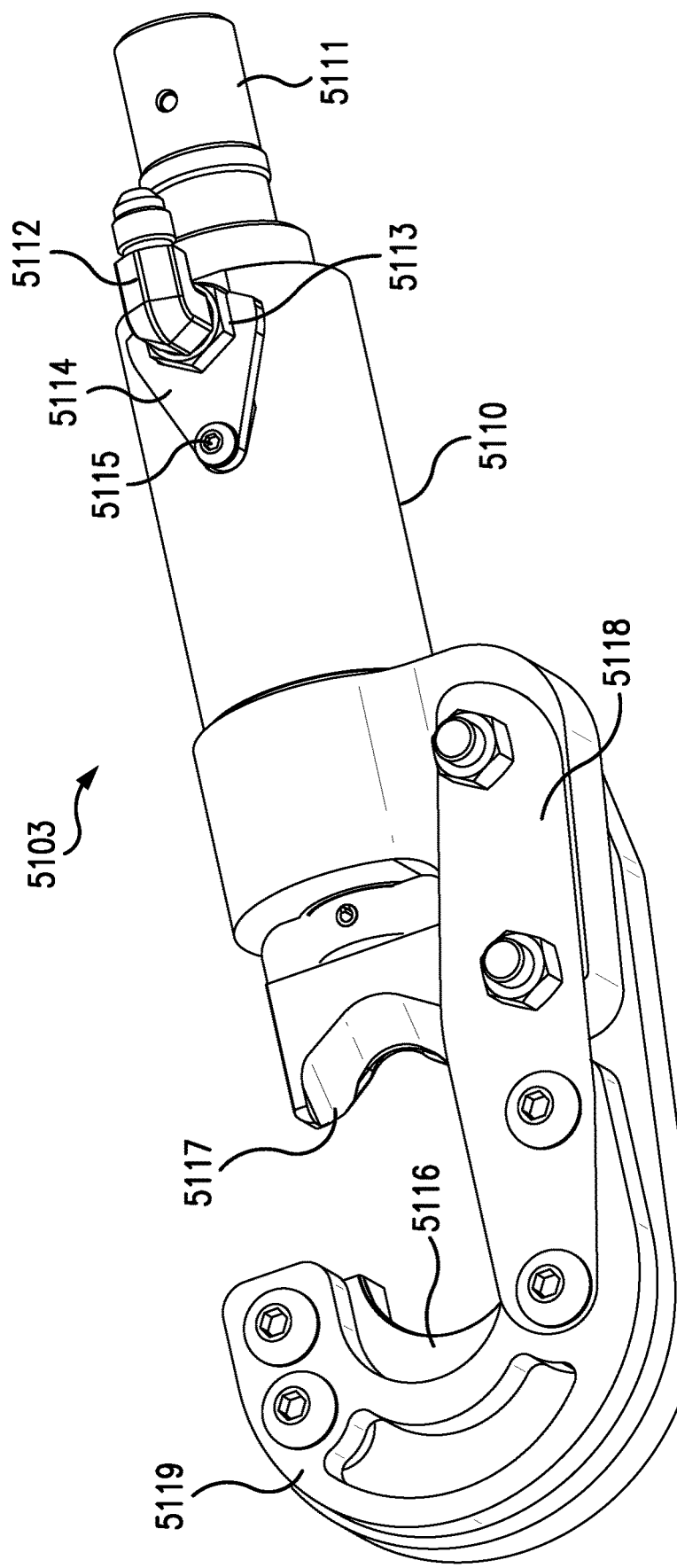
FIG. 47 is a perspective view of a tool head of a long reach cable cutting tool according to the present disclosure.

FIG. 47 further illustrates the tool head 5103. The tool head 5103 includes a housing 5110 with a connector (male) portion 5111 on its proximal end for releasably engaging with the pole 5102 via the connector 5107b. The housing 5110 includes a hydraulic fluid connector 5112 for receiving hydraulic fluid from the hose 5106. The hydraulic fluid connector 5112 threads into hydraulic fluid connector 5112, and is additionally secured to the housing by a nut 5113 around its base. The nut 5113 is prevented from rotation by an A-shaped fitting clamp 5114 that at least partially surrounds and engages the nut 5113 and is held in place with a fastener 5115.

Figure 48A:
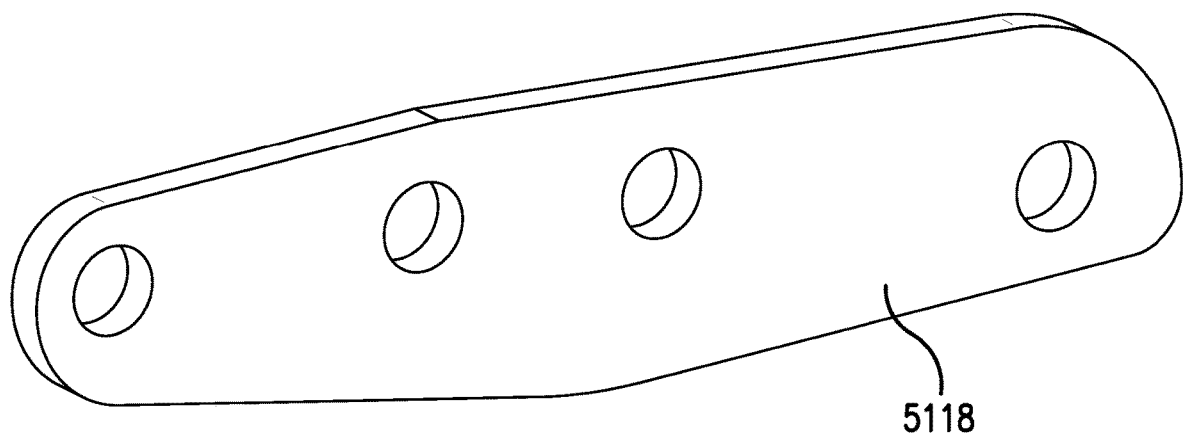
FIGS. 48A-48B are perspective and side views, respectively, of a retainer portion of the tool head shown in FIG. 47.
Figure 48B:
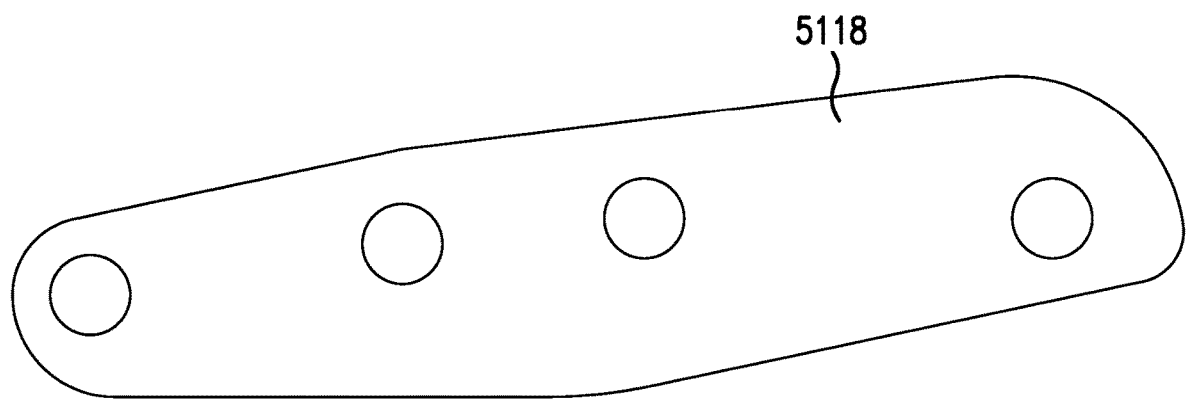
Figure 49A:
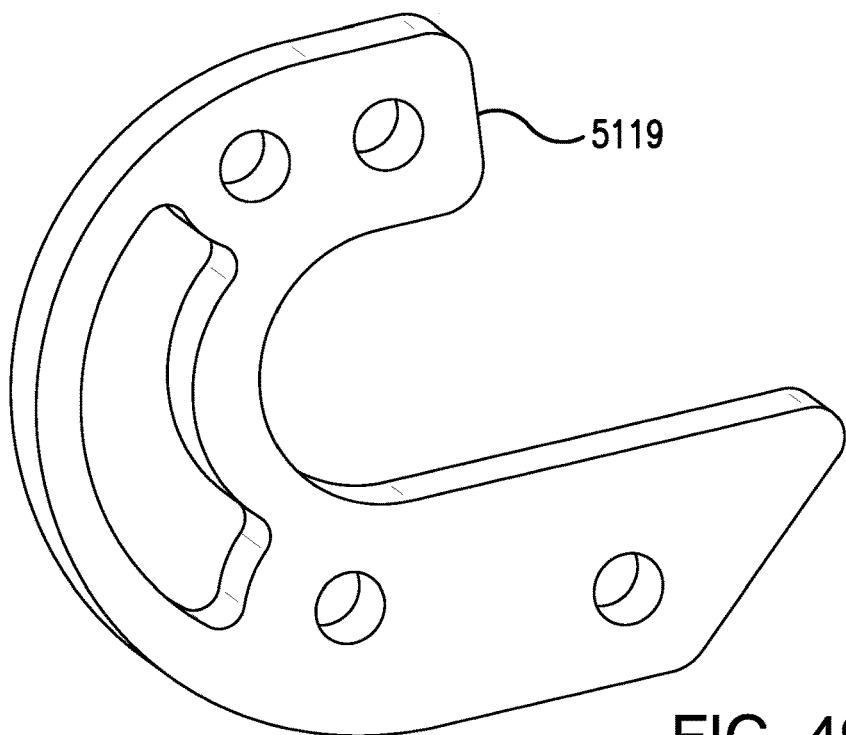
FIGS. 49A-49B are perspective and side views, respectively, of a catch portion of the tool head shown in FIG. 47.
Figure 49B:
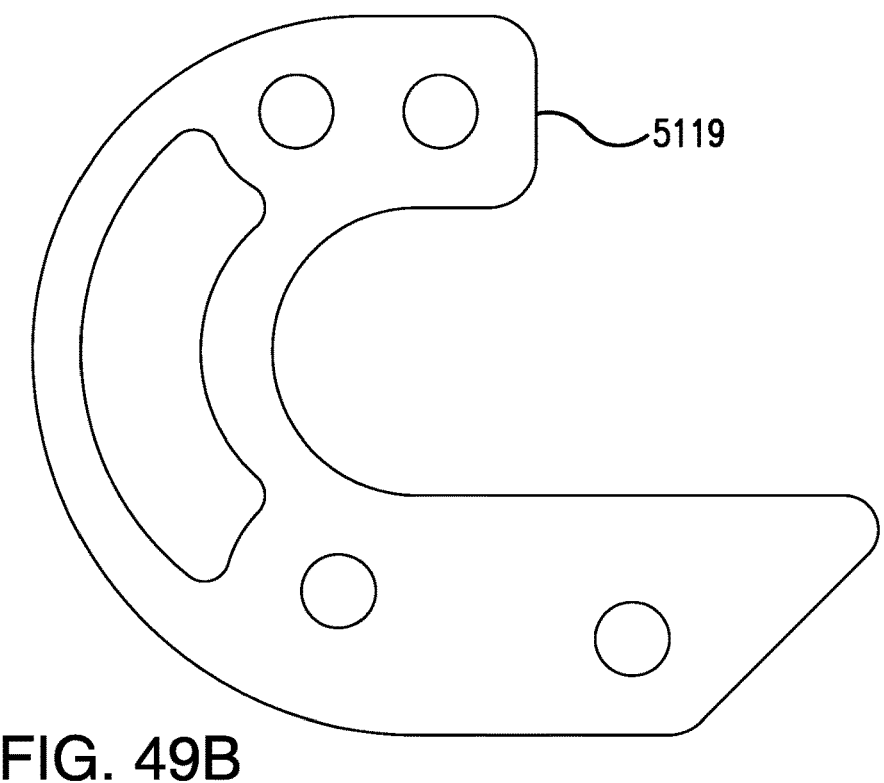

The tool head 5103 has a fixed cutter 5116 and a movable cutter 5117. The movable cutter 5117 advances towards the fixed cutter 5116 when the trigger 5104 is activated. The tool head 5103 may also include a retainer 5118 and a catch 5119. The catch 5119 is fastened to the fixed cutter 5116 and the retainer 5118 is fastened between the catch 5119 and a distal end of the housing 5110. The retainer 5118 and catch 5119 provide additional strength to the tool head 5103, e.g., to withstand the high forces exerted during actuation of the tool. The retainer 5118 and catch 5119 also act as safety mechanisms to retain the fixed cutter 5116 in the event that it was to fracture during use. FIGS. 48A-48B further illustrate the retainer 5118. In the exemplary embodiment, the retainer 5118 has four apertures for receiving fasteners. FIGS. 49A-49B further illustrate the catch 5119. In the exemplary embodiment, the catch 5119 has four apertures for receiving fasteners, and a curved opening.

Figure 50:
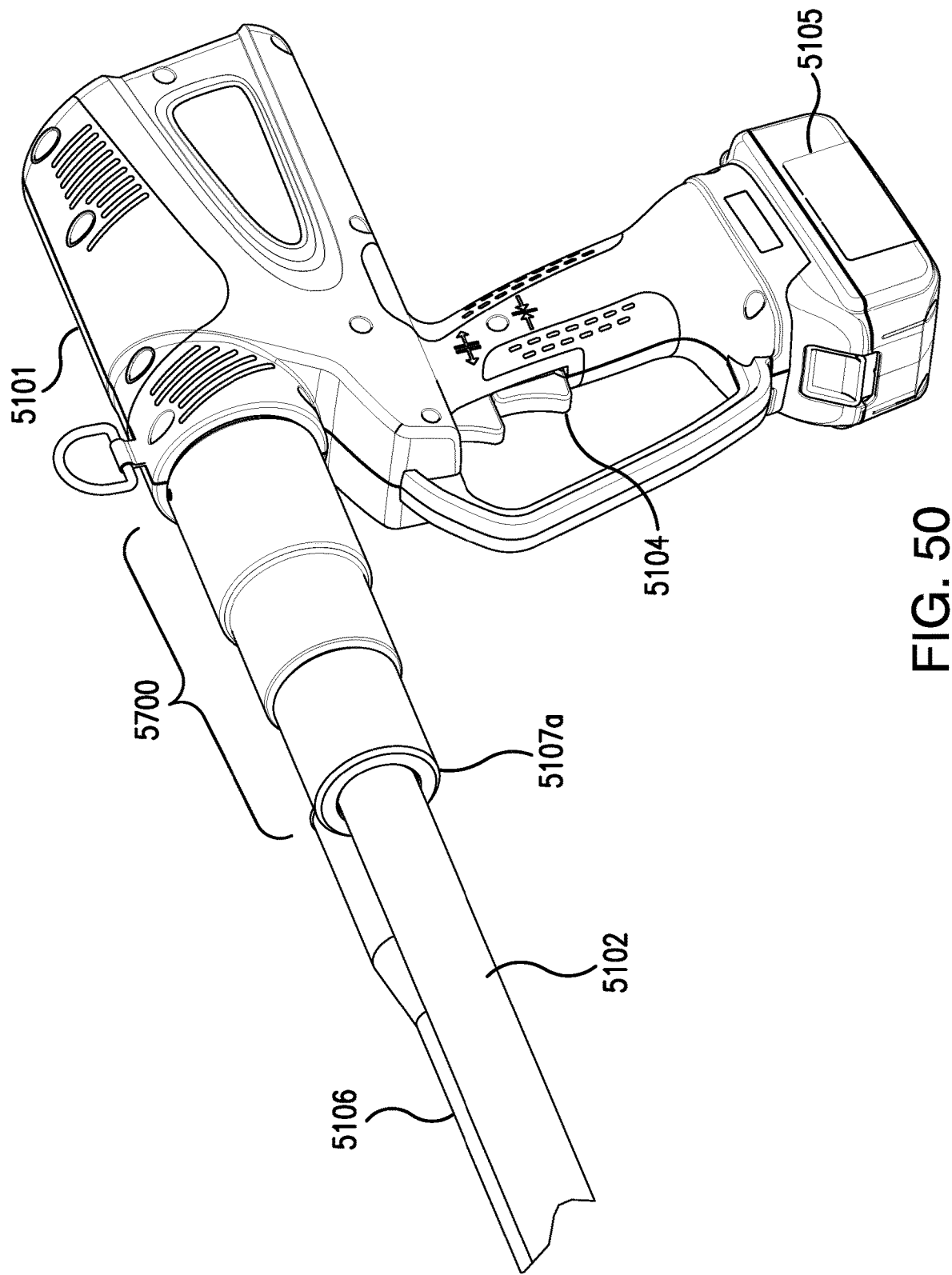
FIG. 50 is a side perspective view of a coupling and a handle of the long reach cable cutting tool according to the present disclosure.
Figure 51:
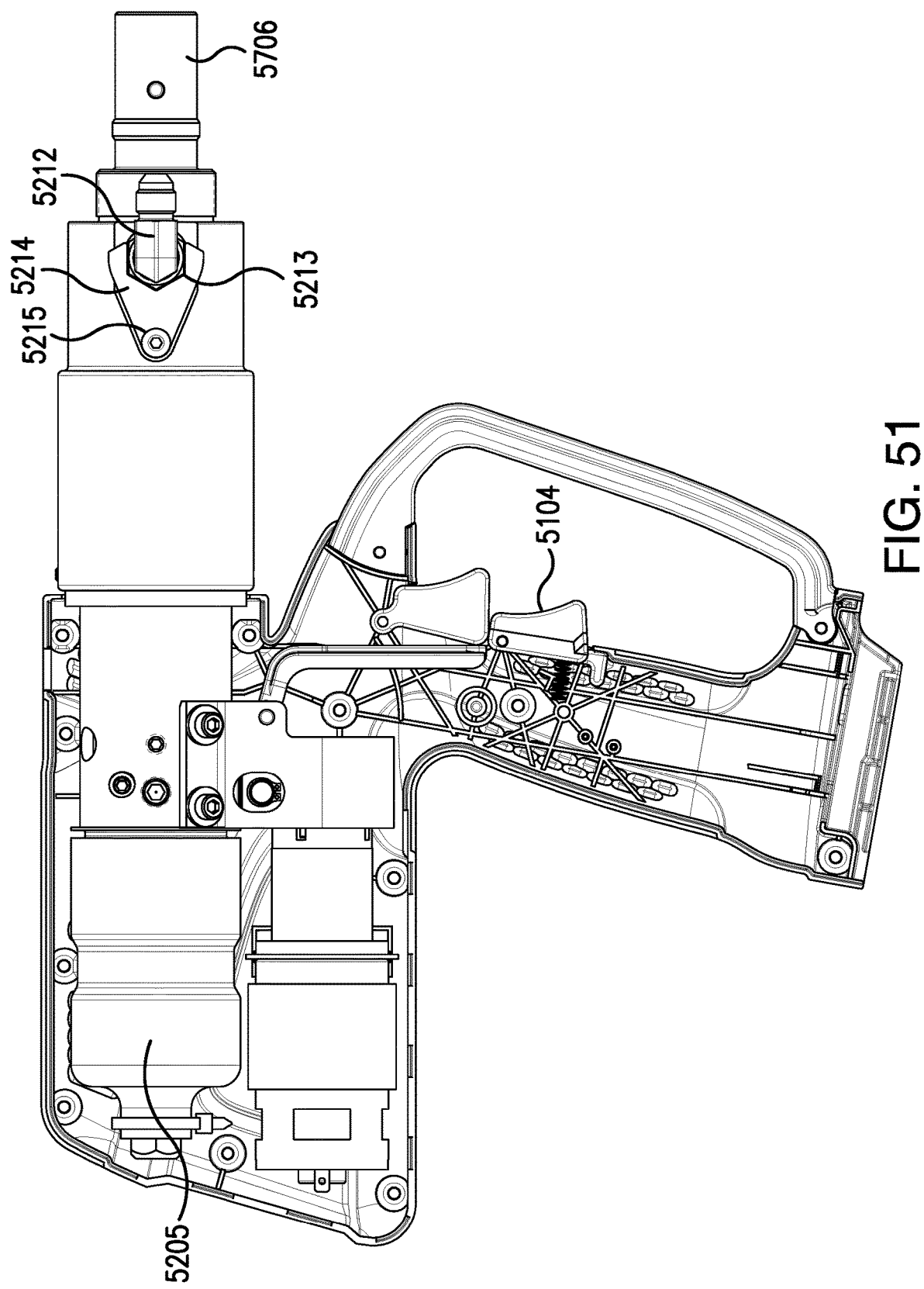
FIG. 51 is a perspective view of an open handle of a long reach cable cutting tool according to the present disclosure.

FIGS. 50-51 shows the handle 5101 including a trigger 5104, a battery 5105, and an assembly 5700. The handle 5101 is connected to the pole 5102 in the manner described above. In the present embodiment, the hydraulic hose 5106 is mounted on the side of the pole 5102 where it is less likely to be damaged. As shown in FIG. 51, the handle includes a fluid reservoir 5205 and a connector (male) portion 5706 on its distal end for releasably engaging with the pole 5102 via the connector 5107a. The handle 5101 includes a hydraulic fluid connector 5212 for receiving hydraulic fluid from the hose 5106. The hydraulic fluid connector 5212 threads into hydraulic fluid connector 5212, and is additionally secured to the housing by a nut 5213 around its base. The nut 5213 is prevented from rotation by an A-shaped fitting clamp 5214 that at least partially surrounds and engages the nut 5213 and is held in place with a fastener 5215.

Figure 52A:
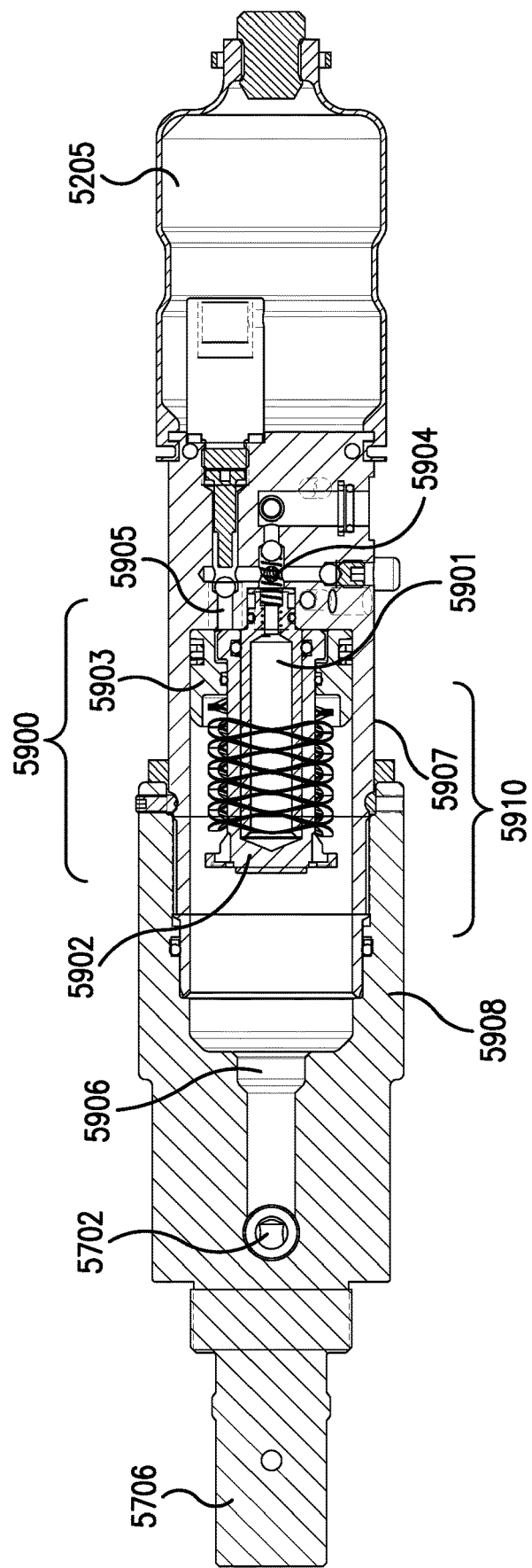
FIGS. 52A-52C are cross sectional views of a hydraulic system including a dual action hydraulic piston assembly contained within a handle of a long reach cable cutting tool according to the present disclosure.
Figure 52B:
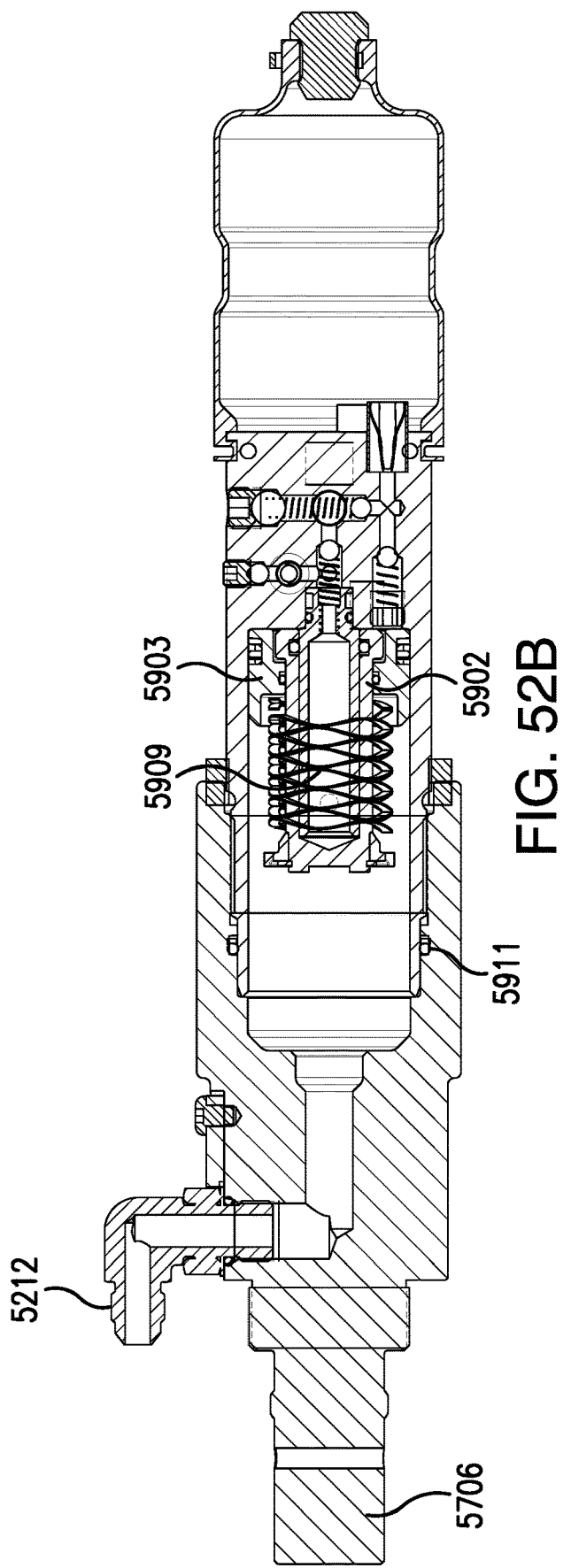
Figure 52C:
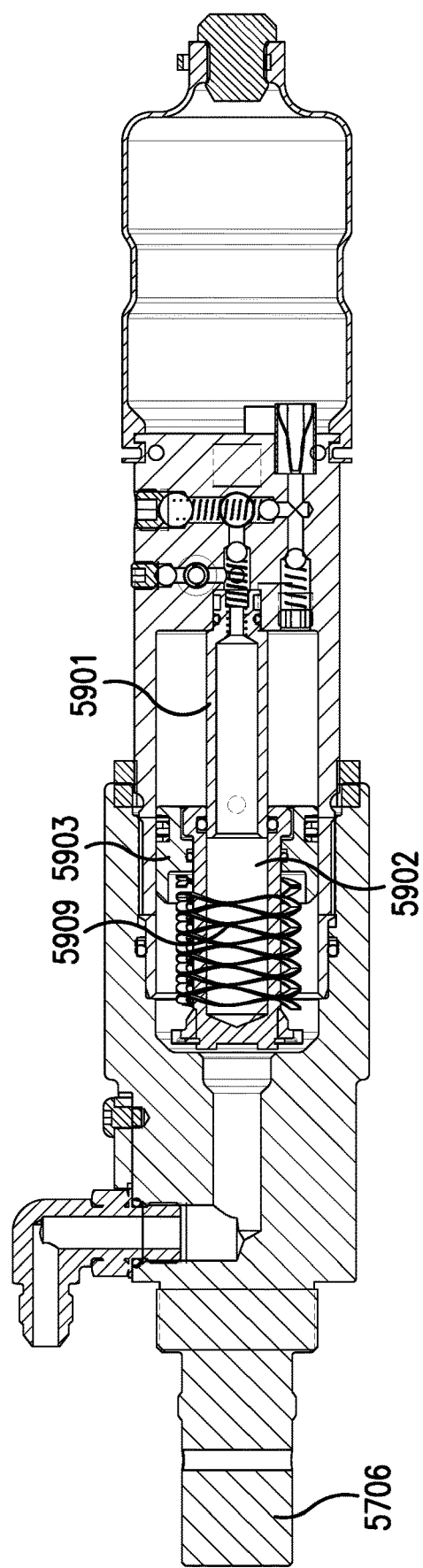

FIG. 52A is a side cross sectional view of the assembly 5700 and FIGS. 52B-52C are top sectional views of the assembly 5700. The central components of the dual action hydraulic piston assembly 5900 include conduit 5901, inner ram 5902, and outer ram 5903. The conduit 5901, the inner ram 5902, and the outer ram 5903 are contained within cylinder 5910. In the present embodiment, the interior of the cylinder 5910 is at least partially extended to provide for more fluid volume. First and second inlet ports 5904 and 5905, respectively, are positioned at a lower/proximal end of the cylinder 5910. An outlet port 5906 is positioned at an upper/distal end of the cylinder 5910.

In FIGS. 52A-52B, the dual action hydraulic piston assembly 5900 is in a fully retracted state. In FIG. 52C, the dual action hydraulic piston assembly 5900 has completed the first stage and is in the beginning of the final high pressure advance stage.

The upper end of the cylinder 5910 and the outlet port 5906 have tapered edges and an intermediate cavity therebetween. The outer ram 5903 also has a corresponding taper. The features and geometry distribute the load over a larger area. The cylinder 5910 includes a seal or O-ring 5911 to prevent backflow of hydraulic fluid. The dual action hydraulic piston assembly 5900 includes a wave spring 5909, discussed in more detail below.

Figure 53A:
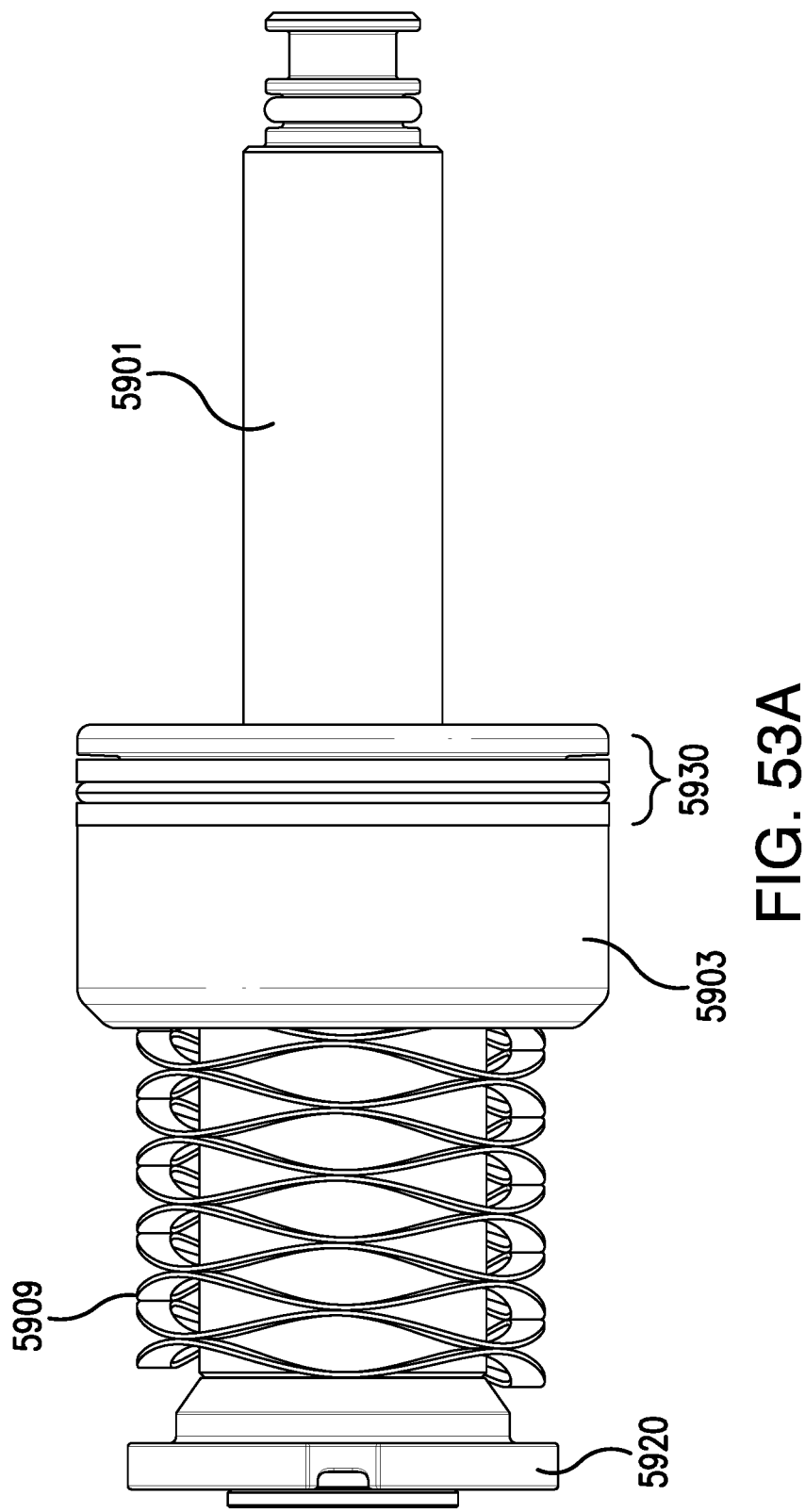
FIG. 53A-53B are perspective views of the dual action hydraulic piston assembly according to the present disclosure.
Figure 53B:
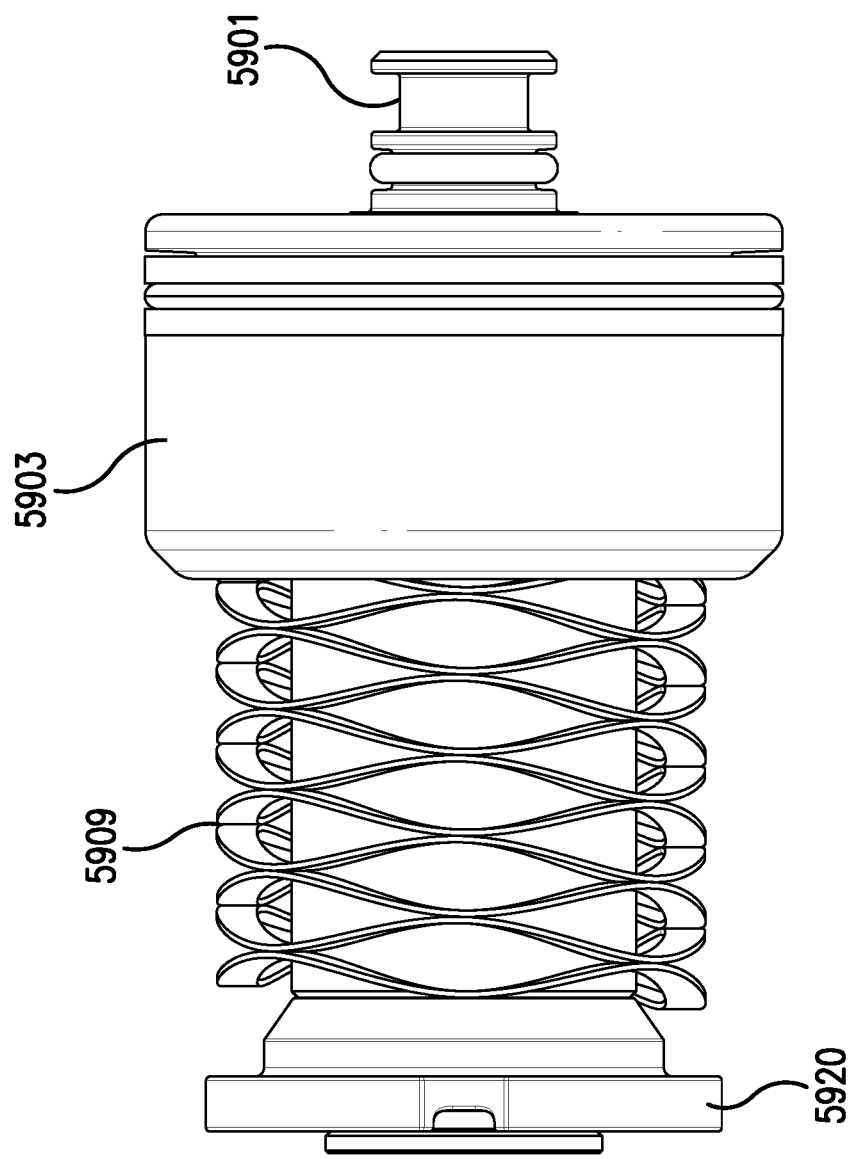
Figure 54A:
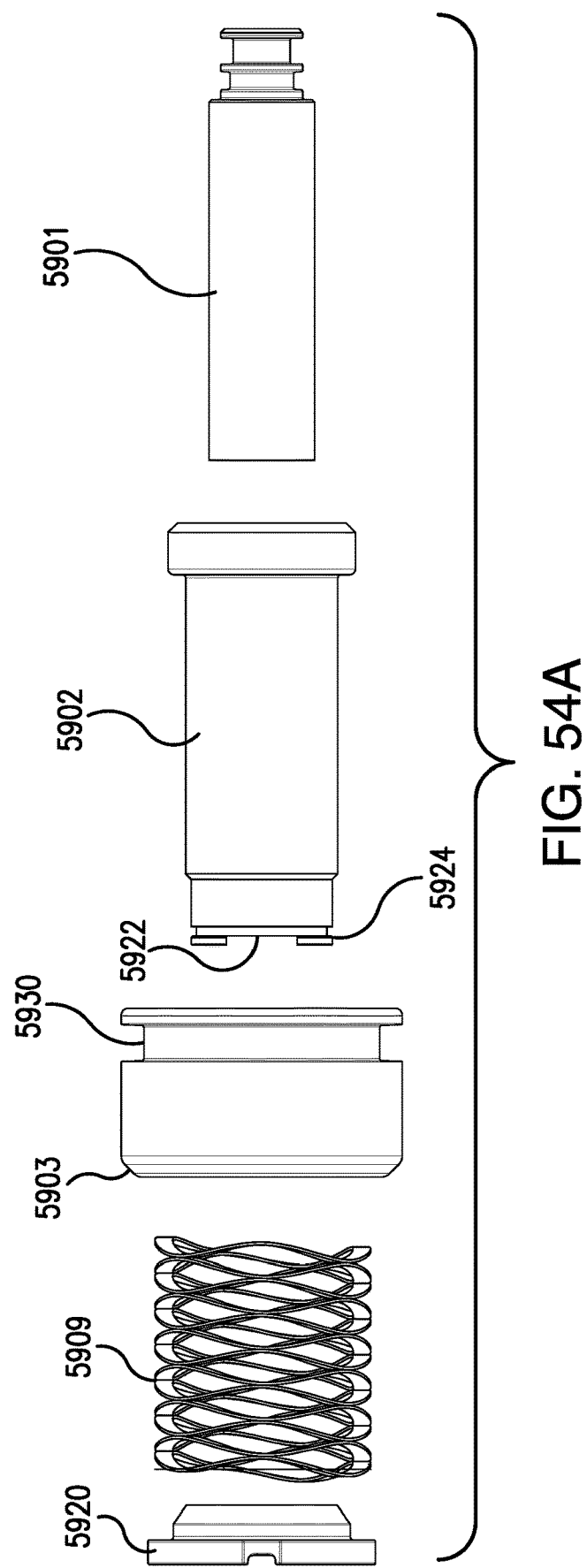
FIGS. 54A-54B are exploded views of the dual action hydraulic piston assembly shown in FIGS. 53-53B.
Figure 54B:
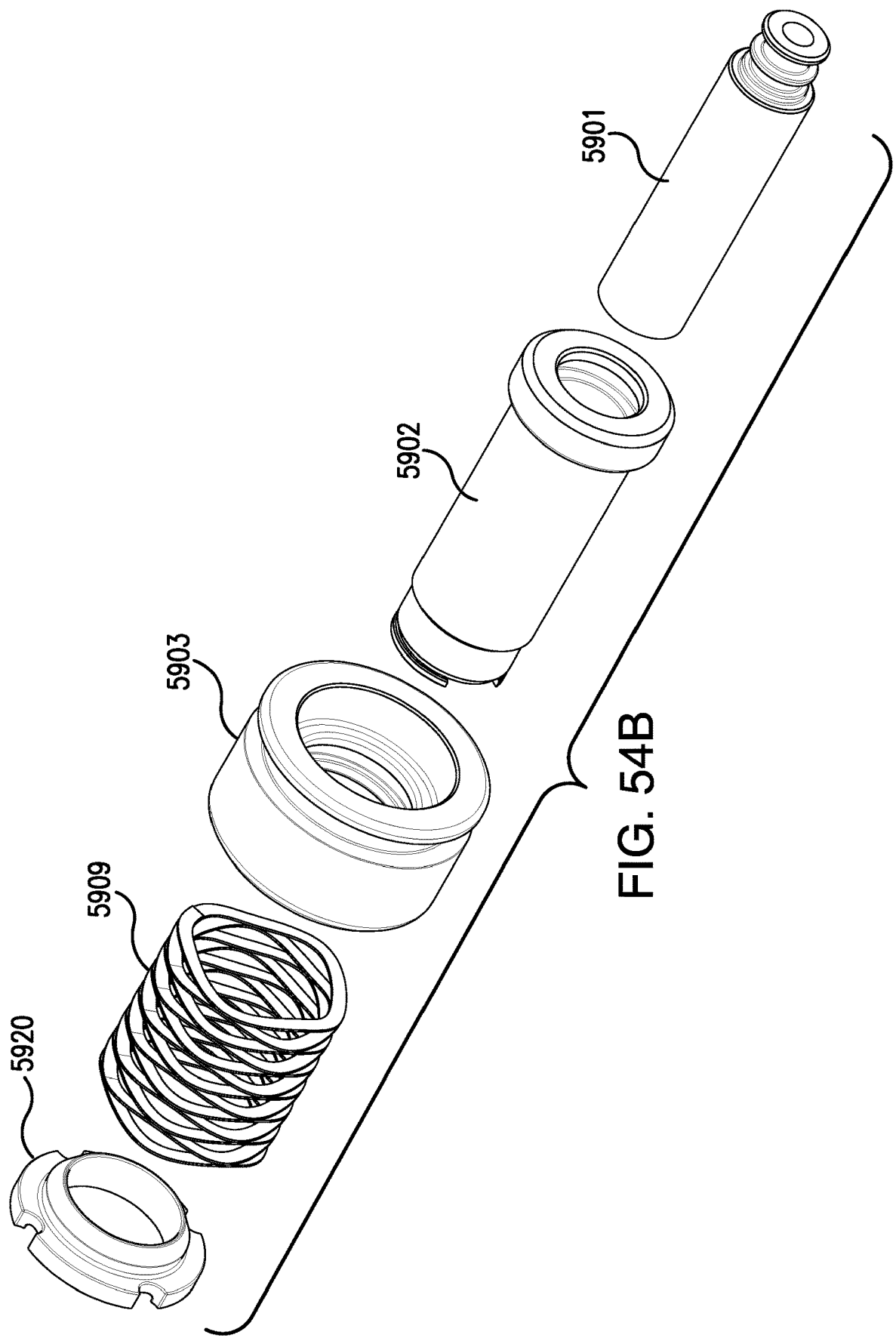

FIGS. 53A-53B further illustrate the dual action hydraulic piston assembly 5900 with the conduit 5901, inner ram 5902, and outer ram 5903. In FIG. 53A, dual action hydraulic piston assembly 5900 is in a partially extended or intermediate rapid advance state. In FIG. 53B, the piston 5900 is in a fully retracted state. FIGS. 54A-54B provide exploded views of the piston 5900. The wave spring 5909 is mounted about the inner ram 5902 between the outer ram 5903 and a retainer 5920 on the end of the inner ram 5902. The retainer 5920 is secured to the inner ram 5902 via a clip that engages in a channel 5924. When the dual action hydraulic piston assembly 5900 is in the fully advanced state, the wave spring 5909 is substantially or fully compressed between the inner ram 5902 and the outer ram 5903. When the dual action hydraulic piston assembly 5900 is returning the fully retracted state, the wave spring 5909 increases separation load between the inner ram 5902 and the outer ram 5903. The wave spring 5909 also influences the inner and outer rams 5902/5903 to separate if they get stuck or misaligned.

Figure 55A:
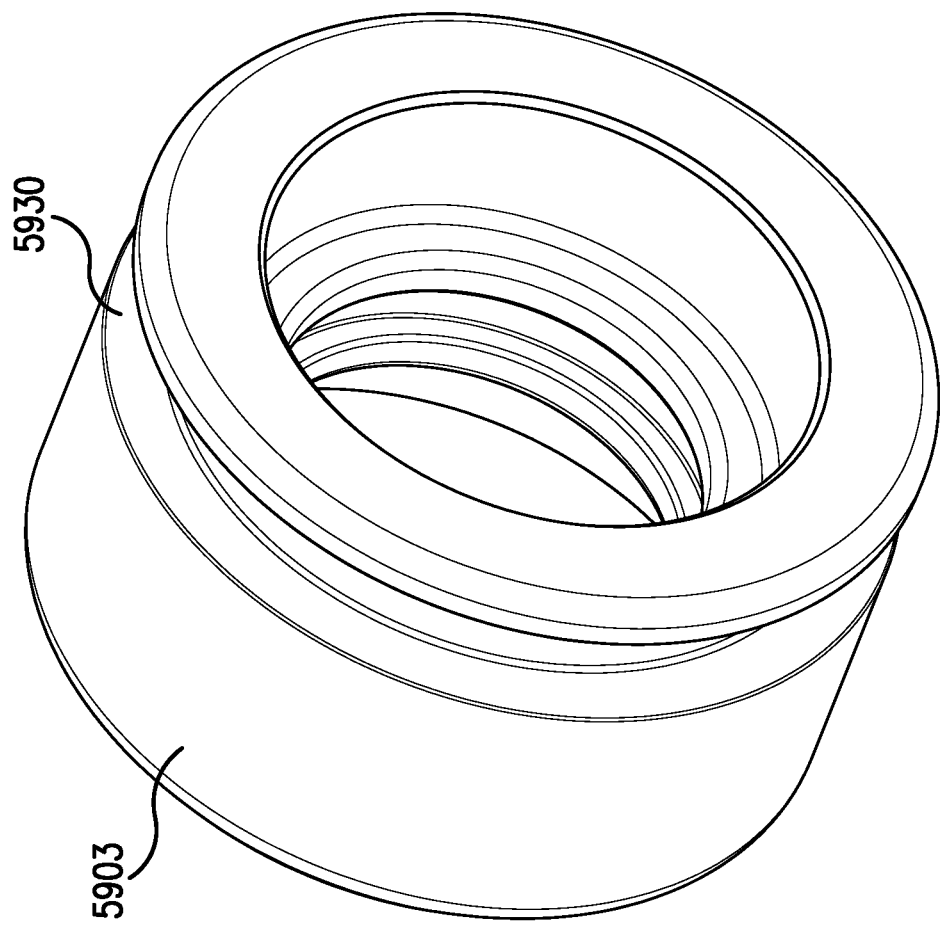
FIGS. 55A-55B are perspective and end views, respectively, of an outer ram of the hydraulic piston assembly according the present disclosure.
Figure 55B:
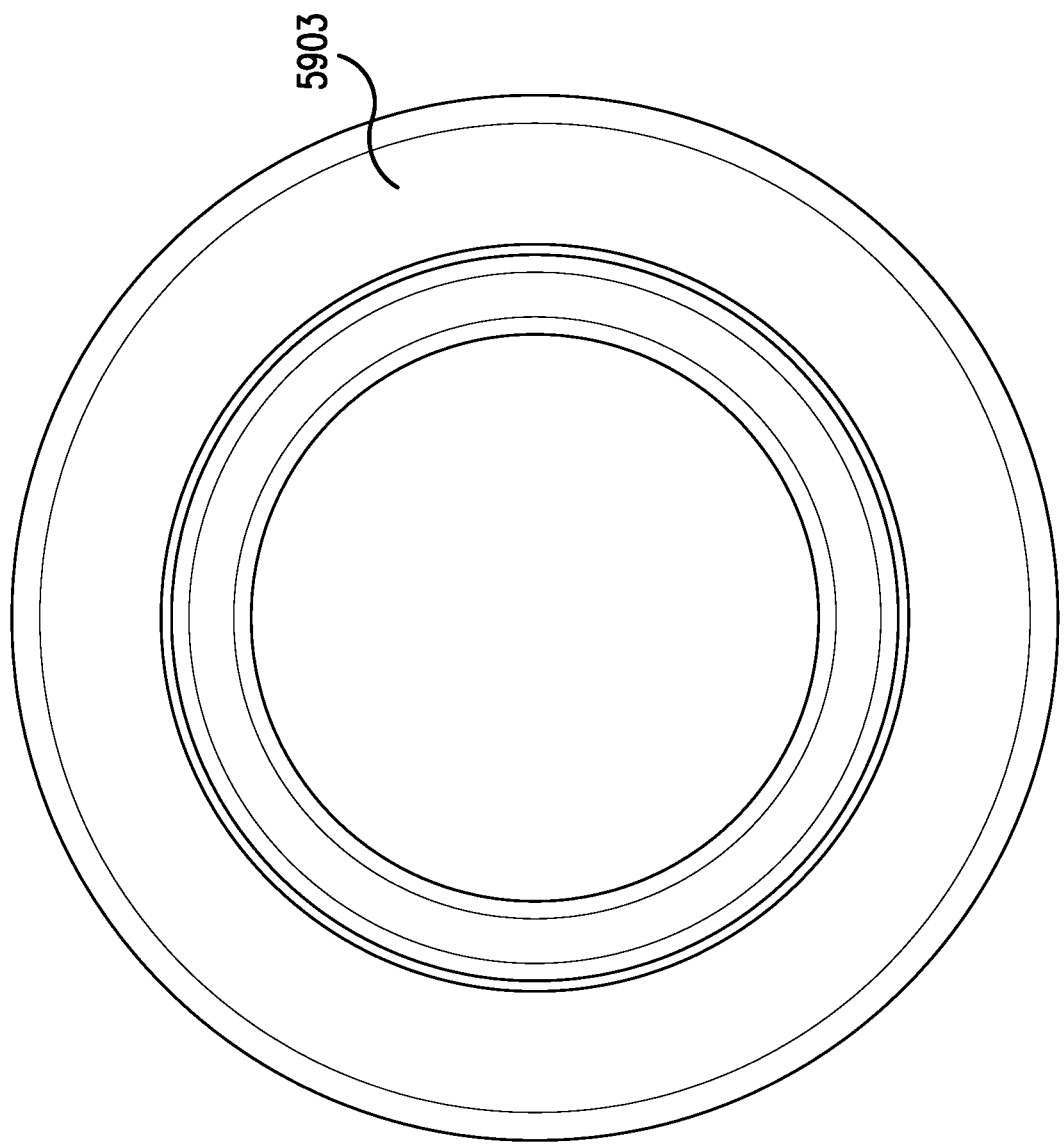
Figure 56A:
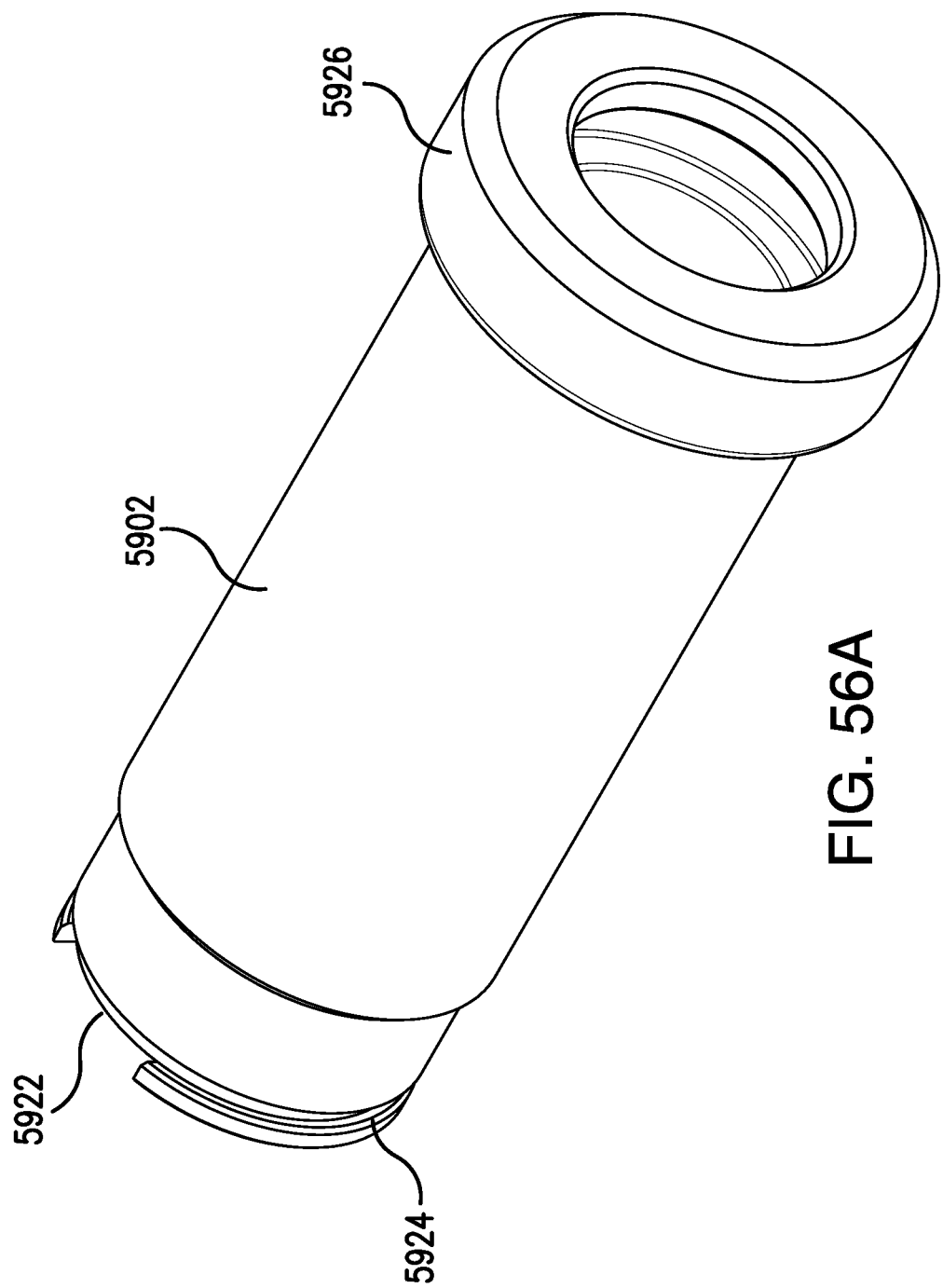
FIGS. 56A-56B are perspective views of an inner ram of the hydraulic piston assembly according the present disclosure.
Figure 56B:
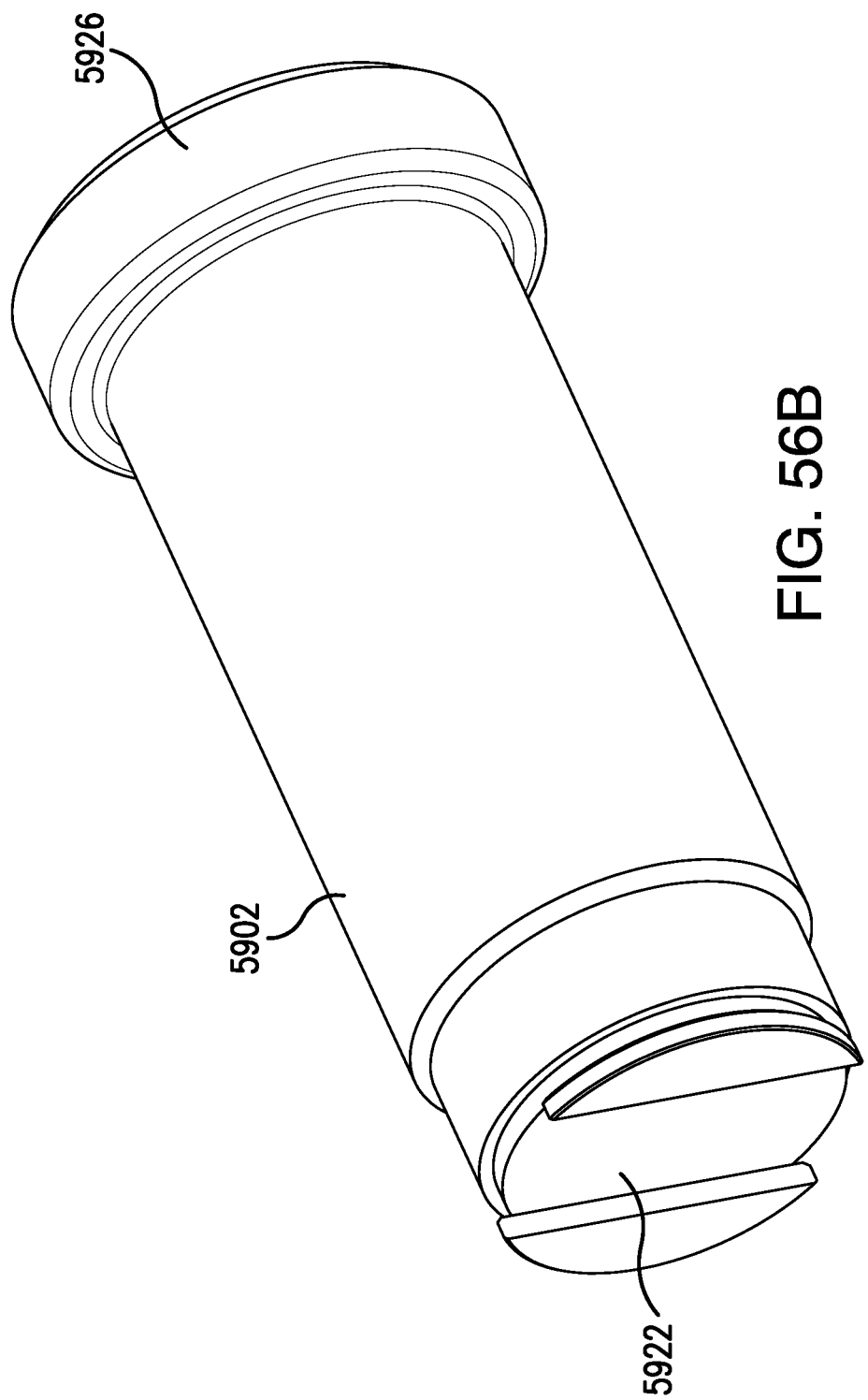

FIGS. 55A-55B further illustrate the outer ram 5903 and FIGS. 56A-56B further illustrate the inner ram 5902. The outer ram 5903 defines a seal channel 5930 to accept one or more seal elements to provide a fluid seal between the outer ram 5903 and the inner surface of the cylinder 5910. The inner ram 5902 has a distal portion with a reduced diameter to receive the retainer 5920. As in the previous embodiment, the inner ram 5902 also has, at its distal end, a recess 5922 that extends across the surface of the distal end. The recess 5922 provides a fluid path for the second fluid even when the upper end of the inner ram 5902 is adjacent to the inner surface of the cylinder 5910. The inner ram 5902 also includes a flange or outer ram stop 5926 defined about its proximal end. The outer ram stop 5926 engages within the outer ram 5903.

Figure 57A:
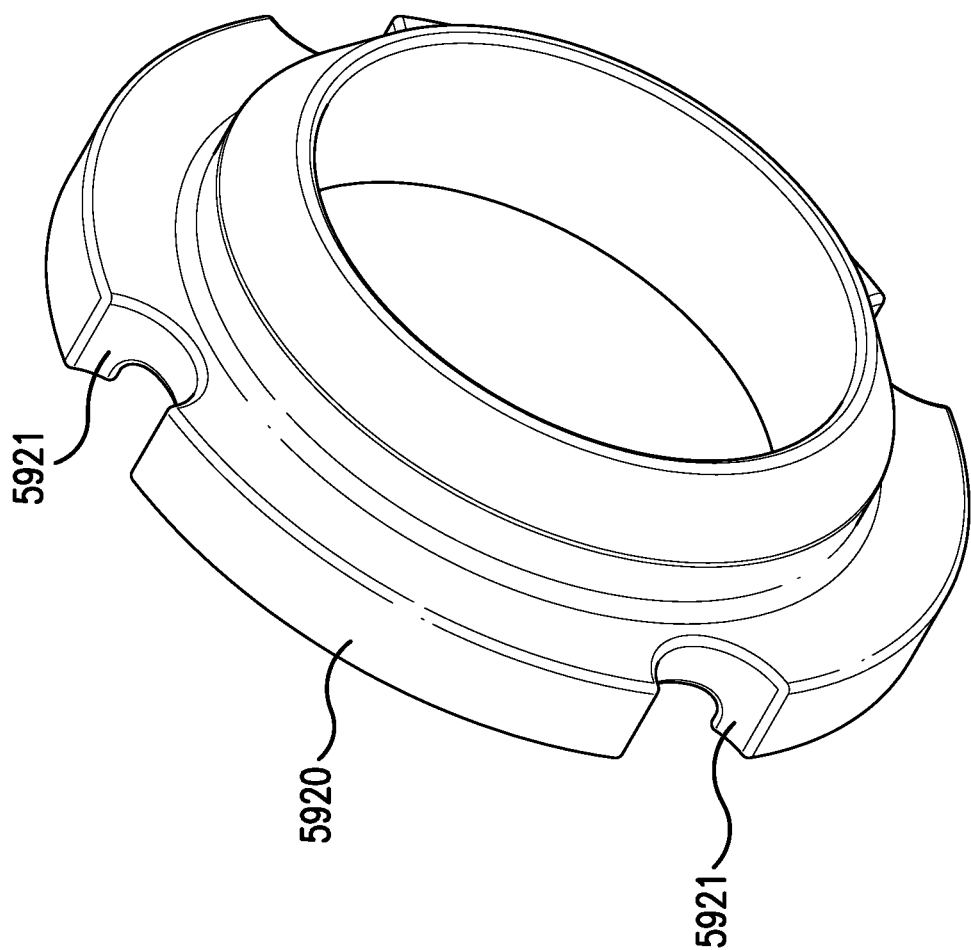
FIGS. 57A-57B are perspective views of a retainer portion of a hydraulic piston assembly according the present disclosure.
Figure 57B:
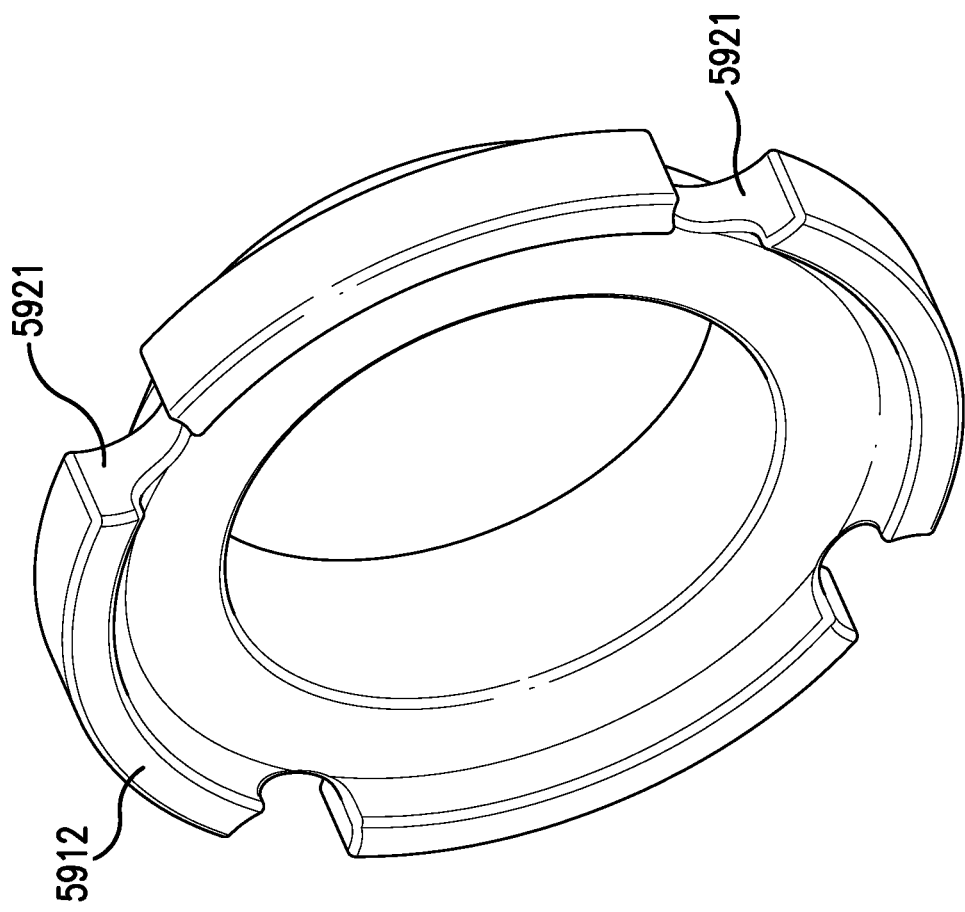

FIGS. 57A-57B show the retainer 5920. The retainer 5920 has an inner diameter sized to fit over the distal portion of the inner ram 5902. The retainer 5920 has a plurality of grooves 5921 to allow fluid to flow around the retainer 5920. In some embodiments, the retainer 5920 is comprised of aluminum. In some embodiments, the retainer 5921 is at least partially flexible.

Figure 58:
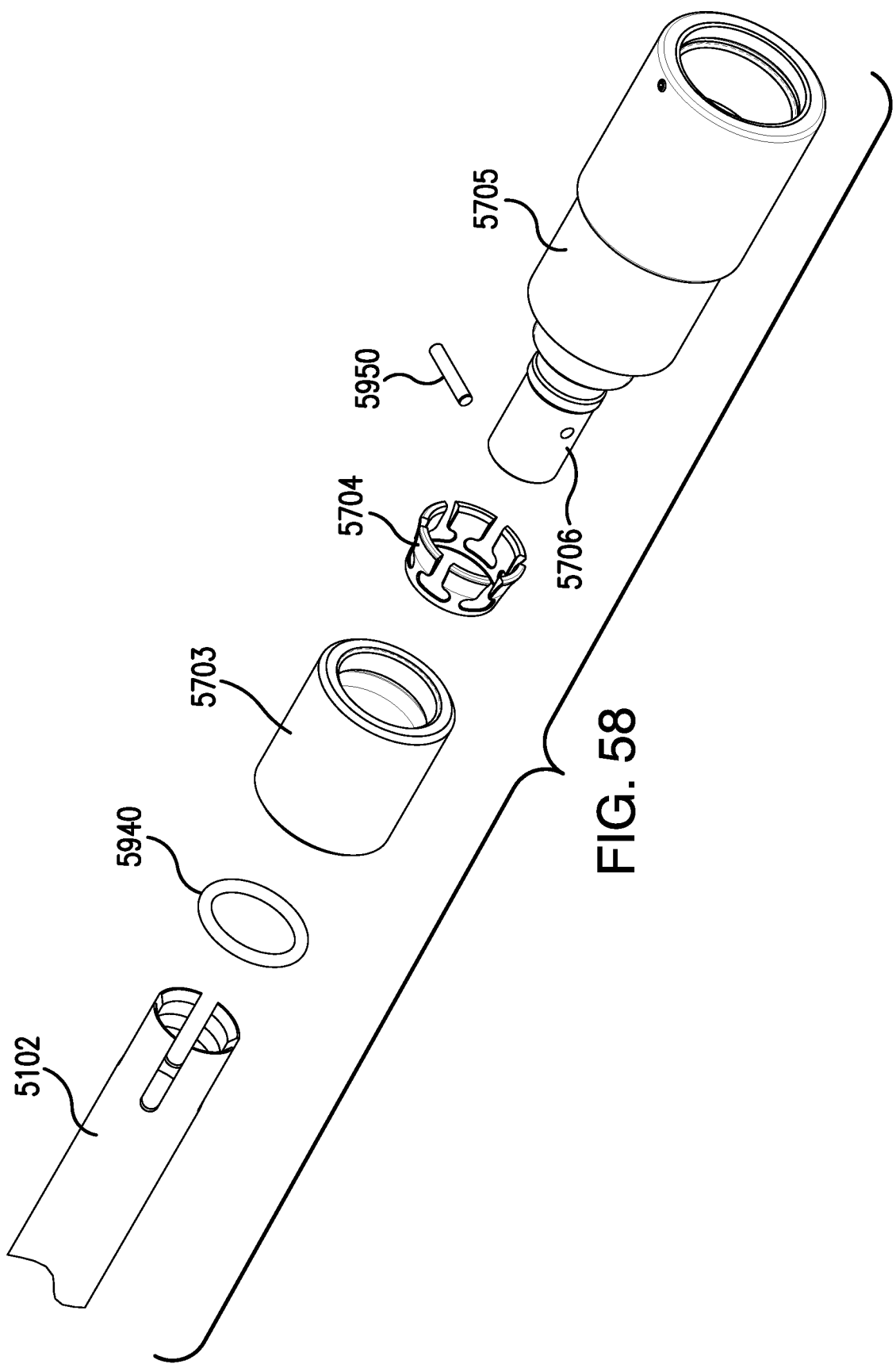
FIG. 58 is a side exploded view of a coupling for the long reach cable cutting tool according to the present disclosure.

FIG. 58 is an exploded view of a coupling for the long reach cable cutting tool 5100. The coupling includes a cylinder 5705 with matable collar, a collet 5704, and a retaining nut 5703. In the present embodiment, there is also an O-ring 5940 engaged between the pole 5102 and the retaining nut 5703. The O-ring 5940 is positioned within the retaining nut 5703 upon assembly and slides on the exterior of the pole 5102. The O-ring makes assembly easier and provides an improved fit between the pole 5102 and the retaining nut 5703. A pin 5950 may be used to secure the coupling from rotating about the pole 5102.

Figure 59A:
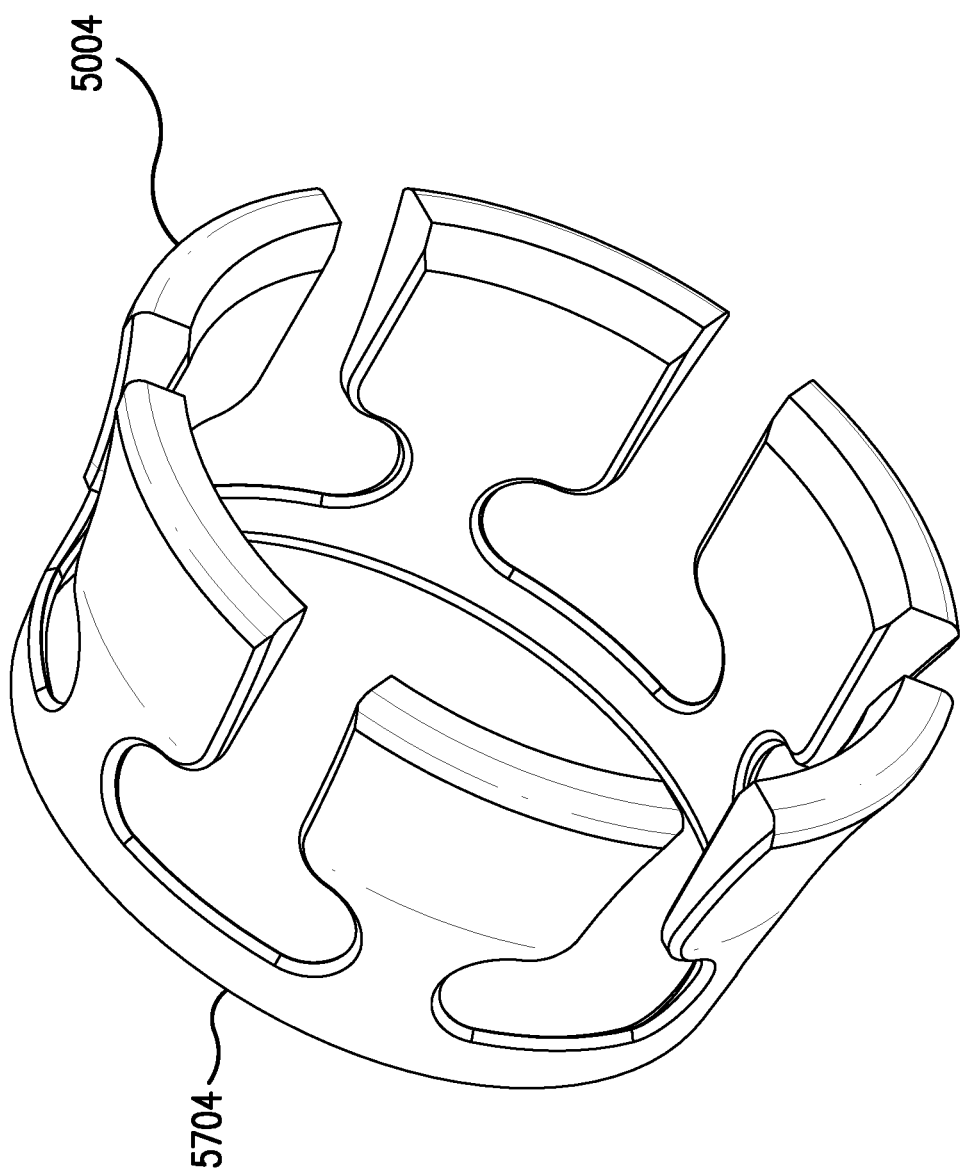
FIGS. 59A-59C illustrate a collet for a coupling for the long reach cable cutting tool according to the present disclosure, including perspective views in FIGS. 59A-59B and a cross sectional view in FIG. 59C.
Figure 59B:
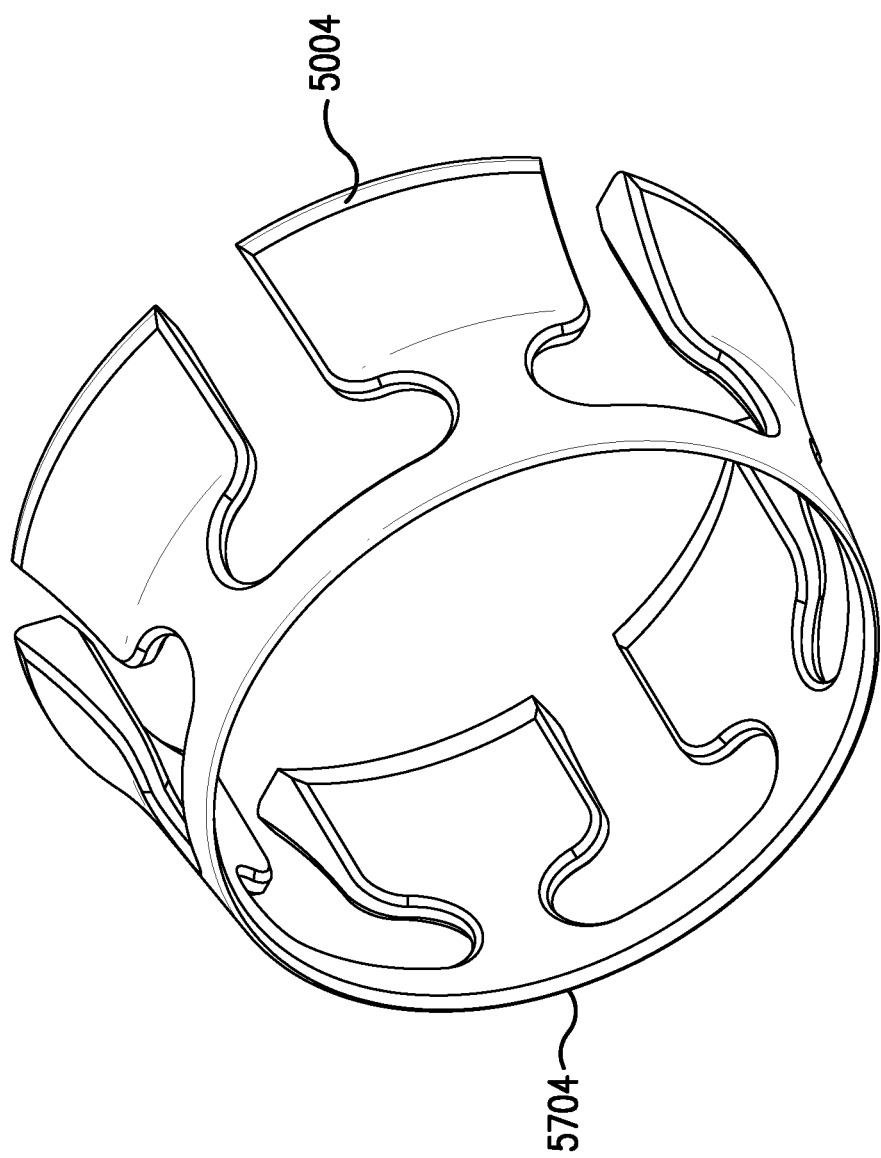
Figure 59C:
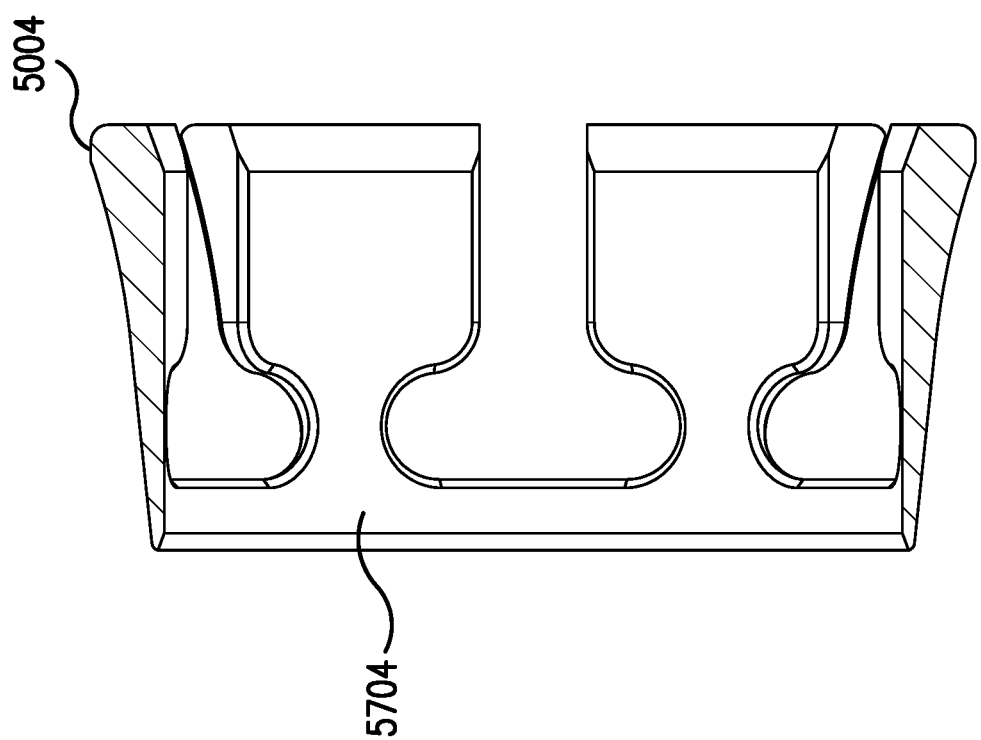
Figure 60A:
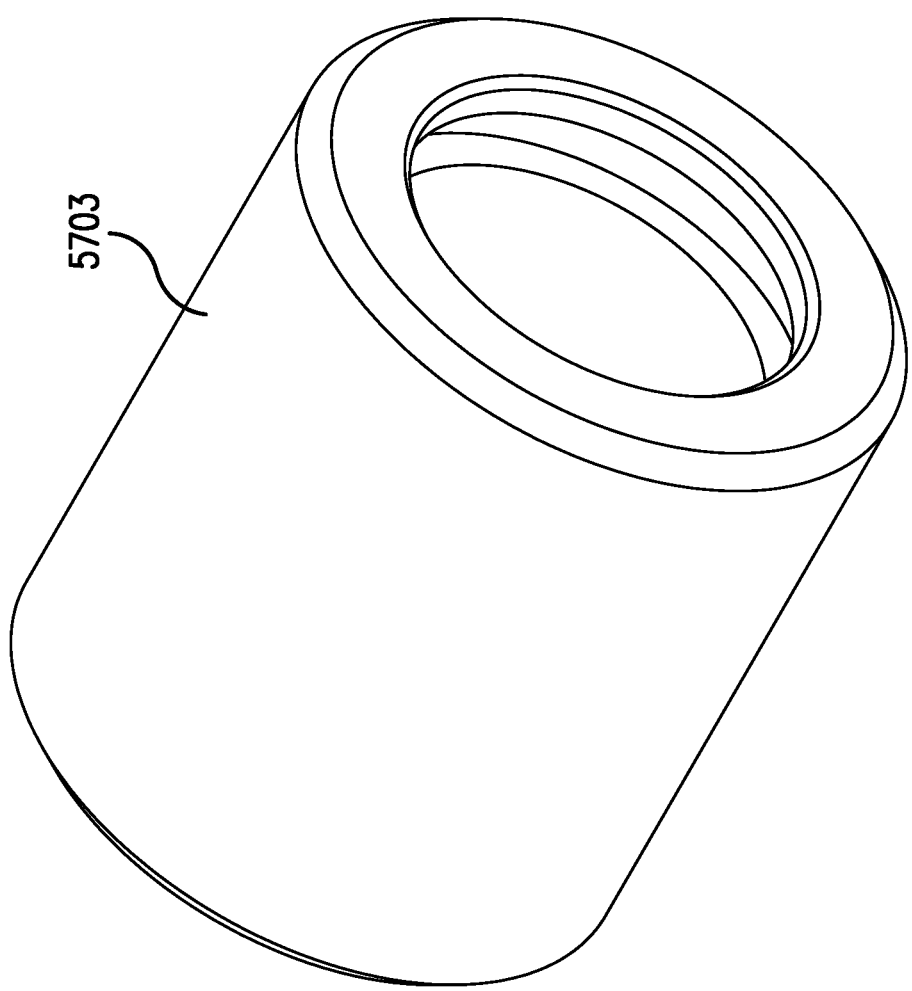
FIGS. 60A-60B are perspective and cross sectional views, respectively, of a retaining nut for a coupling for the long reach cable cutting tool according to the present disclosure.
Figure 60B:
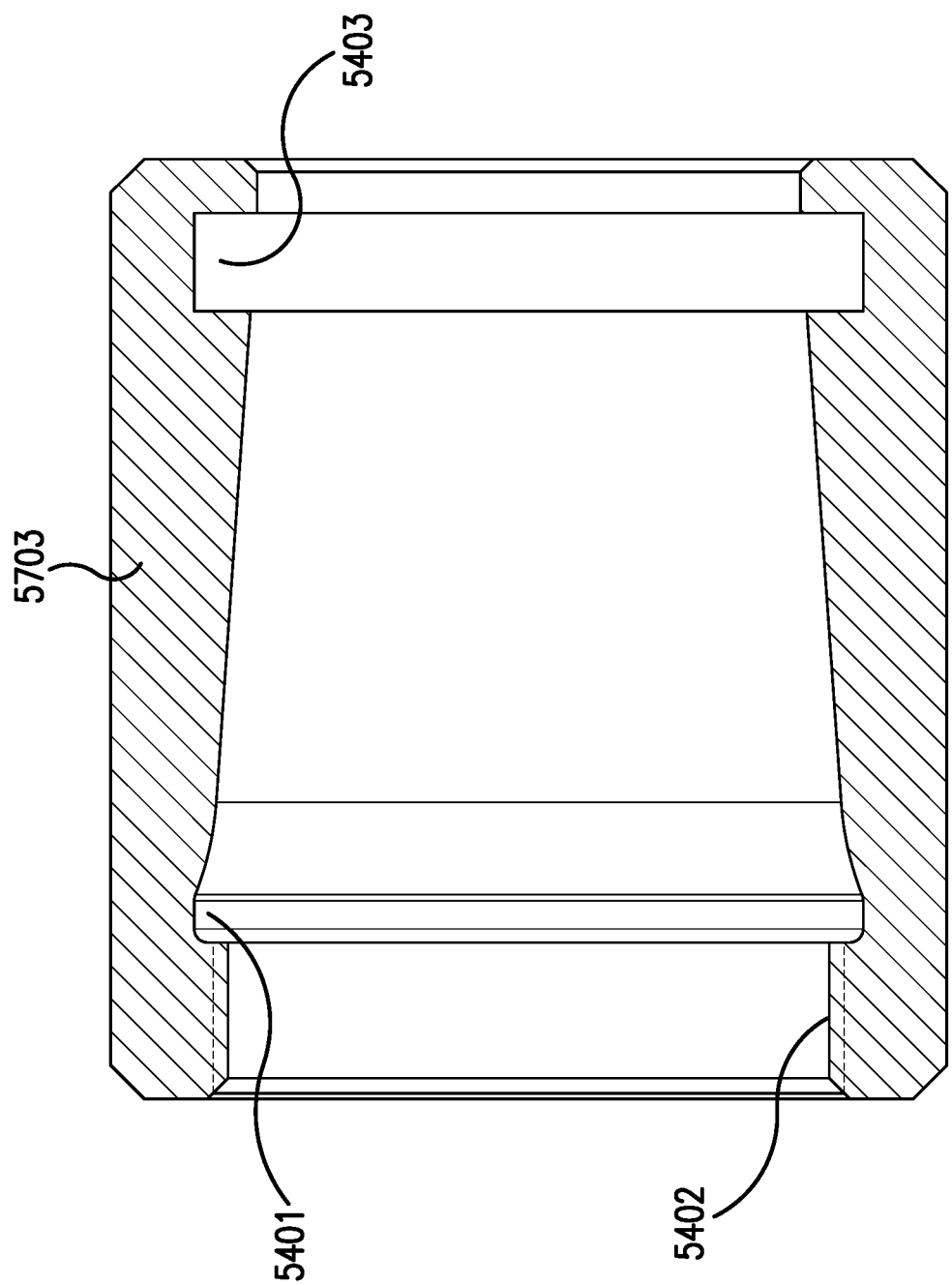

FIG. 59A-59C illustrate the collet 5704 according to the present embodiment. FIGS. 60A-60B illustrate the retaining nut 5703 according to the present embodiment. The collet 5704 is designed to slidably mate with the outer surface of the pole 5102. The collet 5704 has a plurality (e.g., six) of key-shaped cutouts to provide a springing action and securely hold onto pole 5102. A flange(s) 5004 is positioned on upper edge of each of the extensions formed by the cutouts for mating with a channel 5401 defined inside of the retaining nut 5703.

A distal end of the retaining nut 5703 has a diameter substantially equal to but less than the outer diameter of the pole 5102. The retaining nut 5703 includes threads 5402 on its leading edge to mate with threads on the cylinder 5705. The retaining nut 5703 further includes a groove 5403 for receiving the O-ring 5940. The retaining nut 5703 also defines the channel 5401 on the inside diameter of the retaining nut 5703 and set back from the threaded surface 5402. When assembled, the flange(s) 5004 on the collet 5704 mates with the channel 5401 and provides a removable connection between the two components.

The components described herein can be made from various materials, including, but not limited to, metals and plastics depending on the specific needs, tolerances, and requirements.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A long reach cable cutting tool, comprising:
   a handle;
   a motor positioned within the handle and electrically connectable to a battery;
   a trigger positioned on the handle and electrically connected to the motor to provide power from the battery to the motor when the trigger is activated;
   a pump positioned within the handle and connected to the motor, the pump being activated to displace a first fluid;
   a dual action hydraulic piston assembly positioned within the handle and connected to the pump, the dual action hydraulic piston assembly being moveable by the displacement of the first fluid to displace a second fluid;
   a pole having a first end and a second end, the pole connected to the handle at the first end; and
   a tool head connected to the pole at the second end, the tool head including a tool head hydraulic actuator hydraulically connected to the dual action hydraulic piston assembly, the tool head hydraulic actuator is moveable by the displacement of the second fluid to actuate the tool head,
   wherein the dual action hydraulic piston assembly comprises a cylinder having first and second inlet ports on a first end and an outlet port on a second end, a conduit fixed to and extending into the cylinder and connected to the first inlet port, an inner ram having an inner cavity slidably mated with an outer surface of the conduit, and an outer ram having an inner surface slidably mated with an outer surface of the inner ram and an outer surface slidably mated with an inner surface of the cylinder,
   wherein, in a fully retracted state, a proximate end of the inner ram and a proximate end of the outer ram are positioned adjacent to the first end of the cylinder, and a distal end of the inner ram and a distal end of the outer ram are positioned a distance from the second end of the cylinder defining a second fluid space,
   wherein the inner ram and outer ram are moveable by the first fluid being displaced into the inner cavity via the conduit to provide displacement through the outlet port of the second fluid contained in the second fluid space at a first flow rate and a first pressure, and
   wherein the outer ram is moveable by the first fluid being displaced via the second inlet port, into a first fluid space between the first end of the cylinder and the proximate ends of the inner and outer rams, to provide displacement through the outlet port of the second fluid contained in the second fluid space at a second flow rate less than the first flow rate and a second pressure greater than the first pressure.

2. The long reach cable cutting tool of claim 1, wherein the battery is mechanically connectable to the handle.

3. The long reach cable cutting tool of claim 1, wherein the inner ram and the outer ram are moveable, by the first fluid being displaced into the inner cavity via the conduit, at a first advance rate of at least 1 in/s, and the outer ram is moveable, by the first fluid displaced into the first fluid space via the second inlet port, at a second advance rate of at least 0.2 in/s.

4. The long reach cable cutting tool of claim 1, wherein the outer ram is moveable, by the first fluid displaced into the first fluid space via the second inlet port, at a second advance rate that is at least three times that of a first advance rate that the inner ram and the outer ram are moveable by the first fluid displaced into the inner cavity via the conduit.

5. The long reach cable cutting tool of claim 1, wherein the dual action hydraulic piston assembly further comprises a spring circumscribing the outer surface of the inner ram, the spring acting between the inner ram and the outer ram, the spring having a first end adjacent to the distal end of the outer ram and a second end adjacent to the distal end of the inner ram.

6. The long reach cable cutting tool of claim 1, wherein the tool head is one of a crimper or a cutter.

7. The long reach cable cutting tool of claim 1, wherein the handle is connected to the pole via a releasable connector, the releasable connector comprising:
   the pole defining a plurality of separated arcuate members extending from the first end of the pole, each arcuate member defining a channel extending across an inner surface of a respective arcuate member;
   a collar having a first end and a second end, the first end attached to the handle, the collar including a ridge positioned circumferentially around the collar and a distance from the second end of the collar, wherein said channel mates with said ridge when the pole is engaged onto the collar;
   a collet slidably positionable about the pole in proximity to the channel; and a retaining nut slidably positionable about the pole and collet, and connectable with the collar.

8. The long reach cable cutting tool of claim 1, wherein the tool head is connected to the pole via a releasable connector, the releasable connector comprising:
the pole defining a plurality of separated arcuate members extending from the second end of the pole, each arcuate member defining a channel extending across an inner surface of a respective arcuate member;
a collar having a first end and a second end, the first end attached to the tool head, the collar including a ridge positioned circumferentially around the collar and a distance from the second end of the collar, wherein said channel mates with said ridge when the pole is engaged onto the collar;
a collet slidably positionable about the pole in proximity to the channel; and
a retaining nut slidably positionable about the pole and collet, and connectable with the collar.

9. The long reach cable cutting tool of claim 1, wherein the pole is made from a non-conductive material and includes a portion filled with a foam material.

10. The long reach cable cutting tool of claim 1, the tool head having a housing, a fixed distal cutting portion, a movable proximal cutting portion, a catch fastened adjacent to the distal cutting portion, and a retainer fastened between the catch and the housing.

11. The long reach cable cutting tool of claim 1, further comprising a second handle mounted on the pole between the first end and the second end.

12. A long reach cable cutting tool, comprising:
a handle including a trigger;
a pump activated by the trigger to displace a first fluid; and
a dual action hydraulic piston assembly within the handle and hydraulically connected to the pump, the dual action hydraulic piston assembly being moveable by the displacement of the first fluid to displace a second fluid;
a tool head connected to the handle via a pole and actuated in response to the displacement of the second fluid;
wherein the dual action hydraulic piston assembly includes a cylinder having first and second inlet ports on a first end and an outlet port on a second end, a conduit connected to the first inlet port and extending into the cylinder, an inner ram slidable along an outer surface of the conduit, and an outer ram slidable between an outer surface of the inner ram and an inner surface of the cylinder,
wherein the inner ram and outer ram and configured to move together toward the second end of the cylinder, in response to the first fluid being displaced via the first inlet port into the conduit, to displace the second fluid through the outlet port at a first flow rate,
wherein the outer ram is configured to move toward the second end of the cylinder, in response to the first fluid being displaced via the second inlet port, to displace the second fluid through the outlet port at a second flow rate less than the first flow rate.

13. The long reach cable cutting tool of claim 12, wherein the inner ram and outer ram moving together toward the second end of the cylinder, in response to the first fluid being displaced via the first inlet port into the conduit, displace the second fluid through the outlet port at a first pressure, and the outer ram moving toward the second end of the cylinder, in response to the first fluid being displaced via the second inlet port, displaces the second fluid through the outlet port at second pressure greater than the first pressure.

14. The long reach cable cutting tool of claim 12, wherein the dual action hydraulic piston assembly is operable between a fully retracted state in which a proximate end of the inner ram and a proximate end of the outer ram are positioned adjacent to the first end of the cylinder, and a distal end of the inner ram and a distal end of the outer ram are positioned a distance from the second end of the cylinder defining a second fluid space, and a fully advanced state in which the distal end of the inner ram and the distal end of the outer ram are adjacent to the second end of the cylinder.

15. The long reach cable cutting tool of claim 12, wherein the inner ram and the outer ram are moveable together, by the first fluid being displaced via the first inlet port into the conduit, at a first advance rate of at least 1 in/s, and the outer ram is moveable, by the first fluid being displaced via the second inlet port, at a second advance rate of at least 0.2 in/s.

16. The long reach cable cutting tool of claim 12, wherein the outer ram is moveable, by the first fluid being displaced via the second inlet port, at a second advance rate that is at least three times that of a first advance rate that the inner ram and the outer ram are moveable together by the first fluid being displaced via the first inlet port into the conduit.

17. The long reach cable cutting tool of claim 12, wherein the dual action hydraulic piston assembly further comprises a spring circumscribing the outer surface of the inner ram, the spring acting between the inner ram and the outer ram, the spring having a first end adjacent to a distal end of the outer ram and a second end adjacent to a distal end of the inner ram.

18. The long reach cable cutting tool of claim 12, wherein the tool head is one of a crimper or a cutter.

19. The long reach cable cutting tool of claim 12, wherein the handle is connected to the pole via a first releasable connector and the tool head is connected to the pole via a second releasable connector.

20. The long reach cable cutting tool of claim 12, the tool head having a housing, a fixed distal cutting portion, a movable proximal cutting portion, a catch fastened adjacent to the distal cutting portion, and a retainer fastened between the catch and the housing.

21. The long reach cable cutting tool of claim 12, wherein the inner ram has a recess than extends across a distal end of the inner ram configured to provide a fluid path for the second fluid to be displaced through the outlet port when the distal end of the inner ram is adjacent to the second end of the cylinder.

22. The long reach cable cutting tool of claim 12, further comprising a flange on a proximate end of the inner ram, the flange configured to engage into an inner recess in a proximate end of the outer ram to facilitate the inner ram and the outer ram moving together toward the second end of the cylinder in response to the first fluid being displaced via the first inlet port into the conduit.

23. The long reach cable cutting tool of claim 12, further comprising a motor configured to drive the pump and a battery for supplying power to the motor.

* * * * *